(12) United States Patent
Breed

(10) Patent No.: US 8,014,789 B2
(45) Date of Patent: Sep. 6, 2011

(54) MONITORING USING CELLULAR PHONES

(75) Inventor: David S. Breed, Miami Beach, FL (US)

(73) Assignee: Intelligent Technologies International, Inc., Denville, NJ (US)

( * ) Notice: Subject to any disclaimer, the term of this patent is extended or adjusted under 35 U.S.C. 154(b) by 871 days.

(21) Appl. No.: 11/928,442

(22) Filed: Oct. 30, 2007

(65) Prior Publication Data

US 2008/0064413 A1 Mar. 13, 2008

Related U.S. Application Data

(63) Continuation-in-part of application No. 10/940,881, filed on Sep. 13, 2004, now Pat. No. 7,663,502, which is a continuation-in-part of application No. 10/457,238, filed on Jun. 9, 2003, now Pat. No. 6,919,803, said application No. 10/940,881 is a continuation-in-part of application No. 10/931,288, filed on Aug. 31, 2004, now Pat. No. 7,164,117, which is a continuation-in-part of application No. 11/278,979, filed on Apr. 7, 2006, now Pat. No. 7,386,372, and a continuation-in-part of application No. 11/380,574, filed on Apr. 27, 2006, which is a continuation-in-part of application No. 10/931,288, filed on Aug. 31, 2004, now Pat. No. 7,164,117, application No. 11/928,442, which is a continuation-in-part of application No. 11/619,863, filed on Jan. 4, 2007, which is a continuation-in-part of application No. 10/931,288, filed on Aug. 31, 2004, now Pat. No. 7,164,117, application No. 11/928,442, which is a continuation-in-part of application No. 11/755,199, filed on May 30, 2007, now Pat. No. 7,911,324, and a continuation-in-part of application No. 11/843,932, filed on Aug. 23, 2007, and a continuation-in-part of application No. 11/865,363, filed on Oct. 1, 2007, now Pat. No. 7,819,003, said application No. 11/278,979 is a continuation-in-part of application No. 10/931,288, filed on Aug. 31, 2004, now Pat. No. 7,164,117.

(60) Provisional application No. 60/387,792, filed on Jun. 11, 2002.

(51) Int. Cl.
    *H04W 4/00* (2009.01)

(52) U.S. Cl. ............... 455/456.1; 455/410; 455/423; 455/426.1; 455/506; 340/853.1; 340/514

(58) Field of Classification Search ............ 701/32, 701/216, 217; 380/270, 247; 455/456.6, 455/456.1, 410, 423, 426.1, 506; 340/853.1, 340/514

See application file for complete search history.

(56) References Cited

U.S. PATENT DOCUMENTS

| | | | | |
|---|---|---|---|---|
| 5,555,286 A | * | 9/1996 | Tendler | 455/404.2 |
| 5,798,458 A | * | 8/1998 | Monroe | 73/587 |
| 5,990,801 A | * | 11/1999 | Kyouno et al. | 340/691.1 |

(Continued)

*Primary Examiner* — Pierre-Louis Desir
(74) *Attorney, Agent, or Firm* — Brian Roffe

(57) ABSTRACT

Method for locating a cell phone or PDA, e.g., arranged in or on a movable asset, includes obtaining information at the cell phone or PDA relating to reception of signals, transmitting the information from the cell phone or PDA to a remote facility and determining the location of the cell phone or PDA from the information at the remote facility. The cell phone or PDA may obtain DGPS signals and transmit them to the remote facility. In this manner, the location of the cell phone and the asset in or on which it is arranged, or the person carrying the cell phone can be determined at the remote location.

17 Claims, 18 Drawing Sheets

U.S. PATENT DOCUMENTS

| | | | |
|---|---|---|---|
| 6,011,973 A * | 1/2000 | Valentine et al. | 455/456.6 |
| 6,029,072 A | 2/2000 | Barber | |
| 6,031,454 A * | 2/2000 | Lovejoy et al. | 340/539.29 |
| 6,148,212 A | 11/2000 | Park et al. | |
| 6,298,229 B1 * | 10/2001 | Tomlinson et al. | 455/404.2 |
| 6,349,266 B1 | 2/2002 | Lysaght et al. | |
| 6,430,416 B1 * | 8/2002 | Loomis | 455/456.1 |
| 6,701,776 B2 | 3/2004 | Stetter | |
| 7,027,834 B2 | 4/2006 | Soini et al. | |
| 2002/0198640 A1 * | 12/2002 | Gehlot et al. | 701/35 |
| 2003/0125853 A1 * | 7/2003 | Takagi et al. | 701/35 |
| 2008/0088441 A1 | 4/2008 | Breed | |
| 2008/0088462 A1 * | 4/2008 | Breed | 340/573.1 |
| 2008/0108372 A1 | 5/2008 | Breed | |
| 2008/0272906 A1 | 11/2008 | Breed | |

* cited by examiner

MONITORING USING CELLULAR PHONES

CROSS REFERENCE TO RELATED APPLICATIONS

This application is:
1. a continuation-in-part (CIP) of U.S. patent application Ser. No. 10/940,881 filed Sep. 3, 2004, now U.S. Pat. No. 7,663,502, which is:
   A. a CIP of U.S. patent application Ser. No. 10/457,238 filed Jun. 9, 2003, now U.S. Pat. No. 6,919,803 which claims priority under 35 U.S.C. §119(e) of U.S. provisional patent application Ser. No. 60/387,792 filed Jun. 11, 2002;
   B. a CIP of U.S. patent application Ser. No. 10/931,288 filed Aug. 31, 2004, now U.S. Pat. No. 7,164,117;
2. a CIP of U.S. patent application Ser. No. 11/278,979 filed Apr. 7, 2006, now U.S. Pat. No. 7,386,372, which is a CIP of U.S. patent application Ser. No. 10/931,288 filed Aug. 31, 2004, now U.S. Pat. No. 7,164,117;
3. a CIP of U.S. patent application Ser. No. 11/380,574 filed Apr. 27, 2006 which is a CIP of U.S. patent application Ser. No. 10/931,288 filed Aug. 31, 2004, now U.S. Pat. No. 7,164,117;
4. a CIP of U.S. patent application Ser. No. 11/619,838 11/619,863 filed Jan. 4, 2007 which is a CIP of U.S. patent application Ser. No. 10/931,288 filed Aug. 31, 2004, now U.S. Pat. No. 7,164,117;
5. a CIP of U.S. patent application Ser. No. 11/755,199 filed May 30, 2007;
6. a CIP of U.S. patent application Ser. No. 11/843,932 filed Aug. 23, 2007; and
7. a CIP of U.S. patent application Ser. No. 11/865,363 filed Oct. 1, 2007.

All of the foregoing patent application and all references, patents and patent applications that are referred to below are incorporated by reference in their entirety as if they had each been set forth herein in full.

FIELD OF THE INVENTION

The present invention relates generally to methods and systems for obtaining information about objects using cell phones.

BACKGROUND OF THE INVENTION

Background of the invention is found in U.S. Pat. No. 6,919,803.

Definitions in the Background of the Invention section of any of the above-mentioned applications are also generally, but not restrictively, applicable herein.

OBJECTS AND SUMMARY OF THE INVENTION

It is an object of the present invention to provide new and improved systems for obtaining information about objects using cell phones or similar electronic devices.

In order to achieve this object and possibly others, a method of locating a cell phone or PDA in accordance with the invention includes obtaining information at the cell phone or PDA relating to reception of signals, transmitting the information from the cell phone or PDA to a remote facility, and determining the location of the cell phone or PDA from the information at the remote facility. The cell phone or PDA may obtain and transmit DGPS signals, but does not determine its location thereat, but rather, provides the minimum information needed to enable its location to be determined at the remote facility.

A system in a vehicle in accordance with the invention includes a cell phone or PDA arranged to generate information based on signal reception and transmit the information to a remote facility to enable the remote facility to determine the location of the cell phone or PDA. The remote facility can analyze DGPS signals in order to determine the location of the cell phone or PDA.

The cell phone or PDA may be arranged to send a signal to a remote location when its battery is low. It can establish communications between the cell phone or PDA and a remote location to provide information obtained via the cell phone or PDA to the remote location. The cell phone or PDA can monitor received sounds at the cell phone or PDA, e.g., via one or more microphones, and analyze the received sounds and transmit a signal indicative of the received sounds to a remote facility. The cell phone or PDA may be trained to recognize the sounds of accidents and transmit an accident indication signal to the remote facility. The provided information may be location of the cell phone or PDA, obtained via a cell phone or PDA-resident location determining or GPS system. The provided information may be information about an environment around the cell phone or PDA.

When the cell phone or PDA includes a chemical sensor, the information may be about chemicals around the cell phone or PDA. An energy harvesting system may be arranged in connection with the cell phone or PDA to generate energy to power the cell phone or PDA, or various sensors associated therewith, during movement of the vehicle.

The information may be information about a person carrying the cell phone or PDA.

Sensors arranged in association with the cell phone or PDA may be one or more of a temperature sensor, radiation sensor, optical sensor, humidity sensor, chemical sensor, biochemical sensor, biological sensor, acceleration sensor, velocity sensors, displacement sensor, location sensor, vibration sensor, acoustic sensor and pressure sensor.

BRIEF DESCRIPTION OF THE DRAWINGS

The following drawings are illustrative of embodiments of the system developed or adapted using the teachings of at least one of the inventions disclosed herein and are not meant to limit the scope of the invention as encompassed by the claims.

DETAILED DESCRIPTION OF THE INVENTION

Although many of the examples below relate to a cargo space in an asset, the invention is not limited to any particular space in any particular asset and is thus applicable to all types of assets including vehicles, shipping containers and truck trailers and to all spaces or compartments of a vehicle including, for example, the passenger compartment and the trunk of an automobile or truck.

Figure 7:
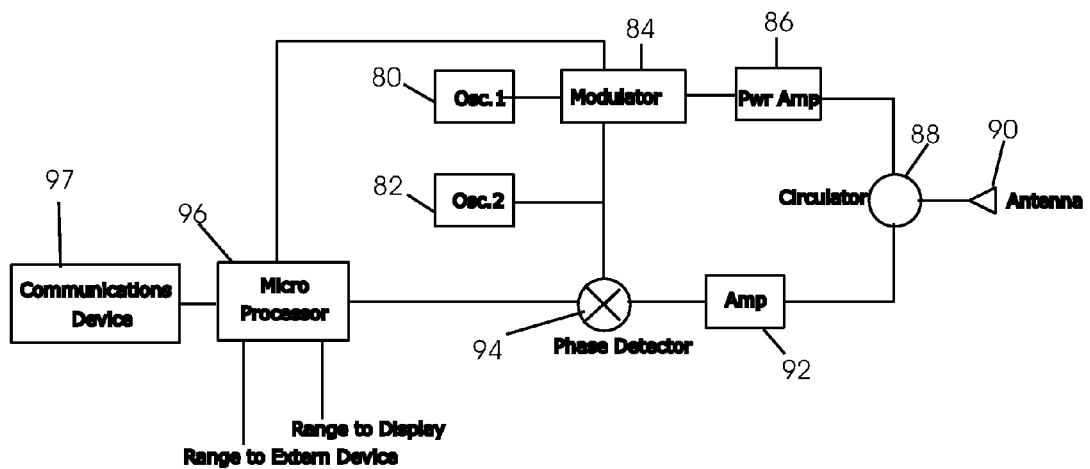
Figure 8:
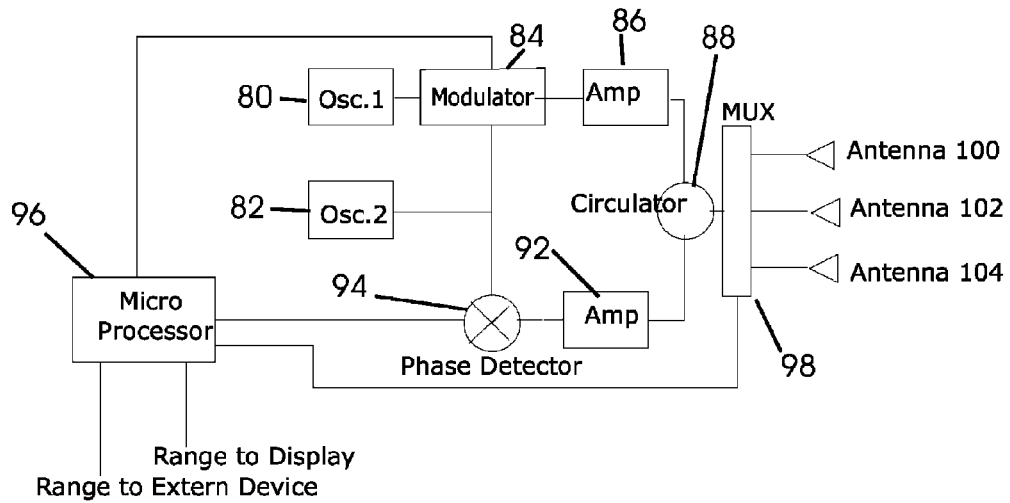
FIG. 8 is a block diagram of an interrogator with multiple antennas which may be used in the invention.
Figure 9:
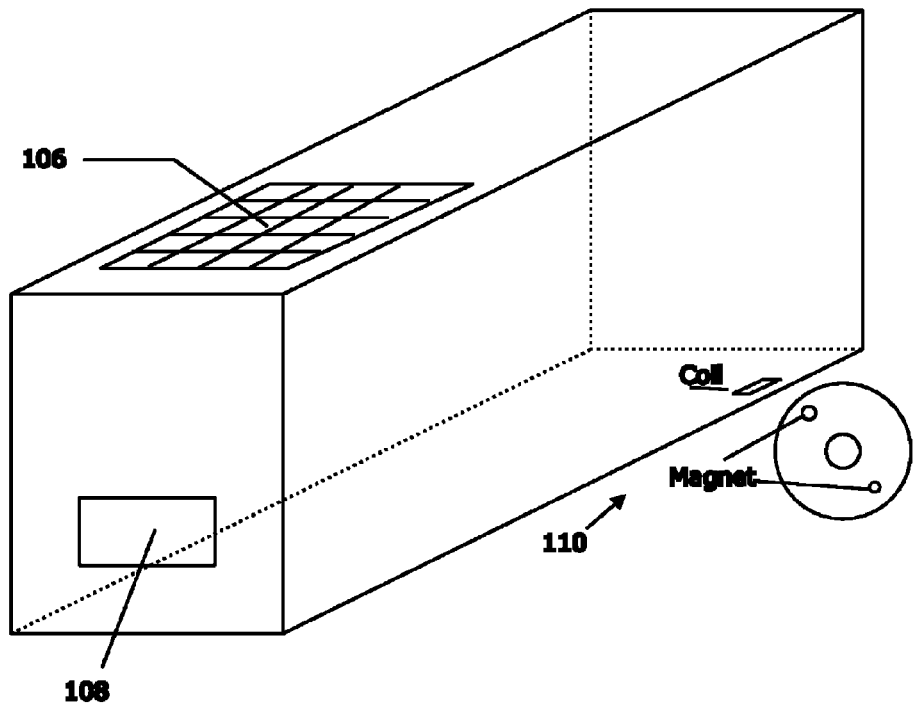
FIG. 9 illustrates systems for deriving or harvesting electrical power for use in the invention.

Referring to the accompanying drawings, FIGS. 1-10 illustrate a method and system for identifying and locating an RFID-tagged article inside a cargo space defined by a frame. The RFID tags can be active, passive or a combination of both, or MIR transmitters, or devices providing backscatter. The system can employ multiple antennas inside a cargo space, truck trailer or other vehicle cargo space as illustrated in FIGS. 1-6. The system is preferably designed for a low power battery operation when the cargo space is not tethered to a power source. Some energy harvesting methods for powering the system are shown in FIG. 9. The system requires little power and has a low duty cycle when not connected to a power source thus the system will provide RFID tag identification for many years with internal battery power.

A passive RFID tag can operate at about 915 MHz (ISM band) complying with FCC rule 15, for example, or other rules that may apply either in the US or other countries. The frequency can be any frequency permitted under these rules.

Figure 1:
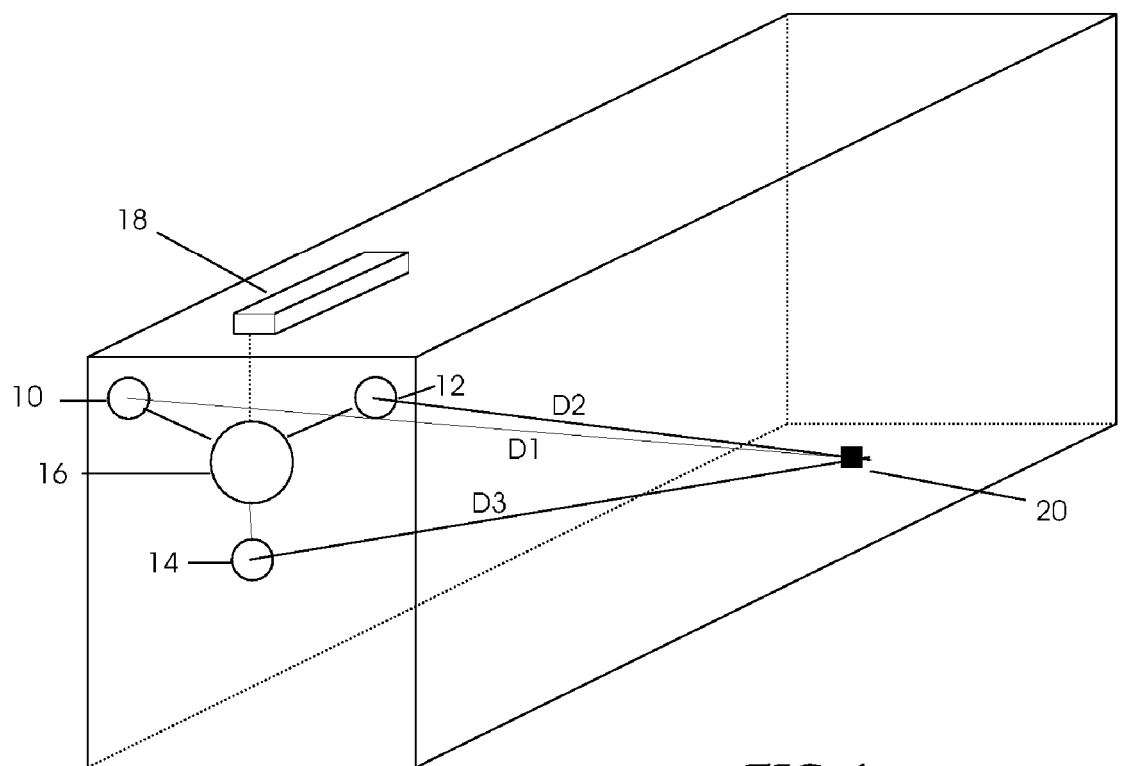
FIG. 1 illustrates a first embodiment of a cargo space equipped with a system in accordance with the invention for obtaining information from a tagged object in the cargo space.

FIG. 1 illustrates an embodiment of a cargo space with three antennas 10, 12, 14 spaced in a triangular fashion and connected to an interrogator 16 internal to the cargo space with the antennas 10, 12, 14 shown in one possible configuration arranged on a common wall of the cargo space. The internal arrangement of the interrogator 16 to the cargo space means that the interrogator is arranged on one or more of the walls defining the cargo space, inside or within one or more of the walls defined the cargo space and/or within the space defined by the walls of the cargo space. Specifically, for the shipping container shown in FIG. 1 having a pair of opposed side walls, a pair of opposed front and rear walls, a roof and a floor, the antennas 10, 12, 14 are arranged in the front wall. This wall may the fixed wall opposite the door of the shipping container. In other embodiments, the antennas 10, 12, 14 are arranged in the other walls of the container.

The interrogator 16 may be arranged within the triangle defined by the antennas 10, 12, 14, for example, at or about the approximate center of the triangle. In other embodiments with multiple antennas, the interrogator may be situated to be equidistant from all of them. Nevertheless, the location of the interrogator relative to the antennas is not critical to the practice of the invention and the interrogator may be placed anywhere on the asset defining the cargo space, or even separate and apart from the asset, as described below. The interrogator 16 may be connected to the antennas 10, 12, 14 using wires or wirelessly.

The interrogator 16 can be connected to a satellite or other communication unit 18 from the interior of the cargo space using a wire or wirelessly using an antenna. As shown, communication unit 18 is arranged on a roof of the asset. The satellite or other communication unit 18 can have an external antenna and can be used to send tag information to a remote site. The distances from each antenna 10, 12, 14 to an RFID device or tag 20 are shown as D1, D2 and D3. These distances can be measured by an interrogator 16 shown schematically in FIG. 8, or by a processor associated with or resident within the interrogator 16 or separate therefrom. The processor could also process the distances to derive other information about the RFID device 20 or an object in connection with which the RFID device 20 is mounted. For example, such a processor can also derive additional or alternative information about the RFID device 20, such as motion thereof or its identification if it is designed to generate a return signal with identification data.

There are known arrangements of or programming for interrogator 16, or the processor associated therewith, to measure or otherwise determine distances D1, D2 and D3 based on the return signals. However, in one particular embodiment, RFID devices 20 are used which have the capability of returning a signal at a precise time with this knowledge being used to determine the distance between the RFID device or object in connection therewith and the antennas 10, 12, 14. To achieve this, the interrogator 16 and RFID device 20 are each provided with a clock, and the RFID device 20 synchronizes its clock upon reception of any signal from any of the antennas 10, 12, 14 relative to the interrogator's clock returns a signal, if it receives any signal from any of the antennas 10, 12, 14, only after synchronization of its clock to the interrogator's clock. The interrogator 16, or processor associated therewith, is arranged or programmed to predict a transmit time at which the RFID device 20 will return a signal after reception of a signal whose transmission is controlled by the interrogator 16. The actual arrival time of the return signal from the RFID device 20 is analyzed relative to the predicted transmit time (the time the return signal was transmitted by the RFID device 20), e.g., compared thereto, to enable a measurement of a distance between the RFID device 20 and the antennas 10, 12, 14 to be determined. Thus, in this embodiment, the RFID device 20 returns a signal at a specific time after receipt of an interrogation signal or pulse from one or more of the antennas 10, 12, 14, at a specific time after the signal or pulse was sent by one or more of the antennas 10, 12, 14 or at an appointed or predesignated time. In the latter case, predesignation of times might entail creating a specific formula for determining the predesignated times.

In one embodiment when the interrogator 16 causes transmission of signals from multiple antennas 10, 12, 14, the RFID 20 when receiving signals from one or more of these antennas 10, 12, 14 may be arranged or programmed to provide information in the return signal indicative of a phase or relative time of reception of signals from the multiple antennas. The processor associated with the interrogator 16 would analyze the return signals and, from the phase or time reception information, derive information about the RFID device 20 or object to which it is mounted, such as distance information or motion information.

Figure 2:
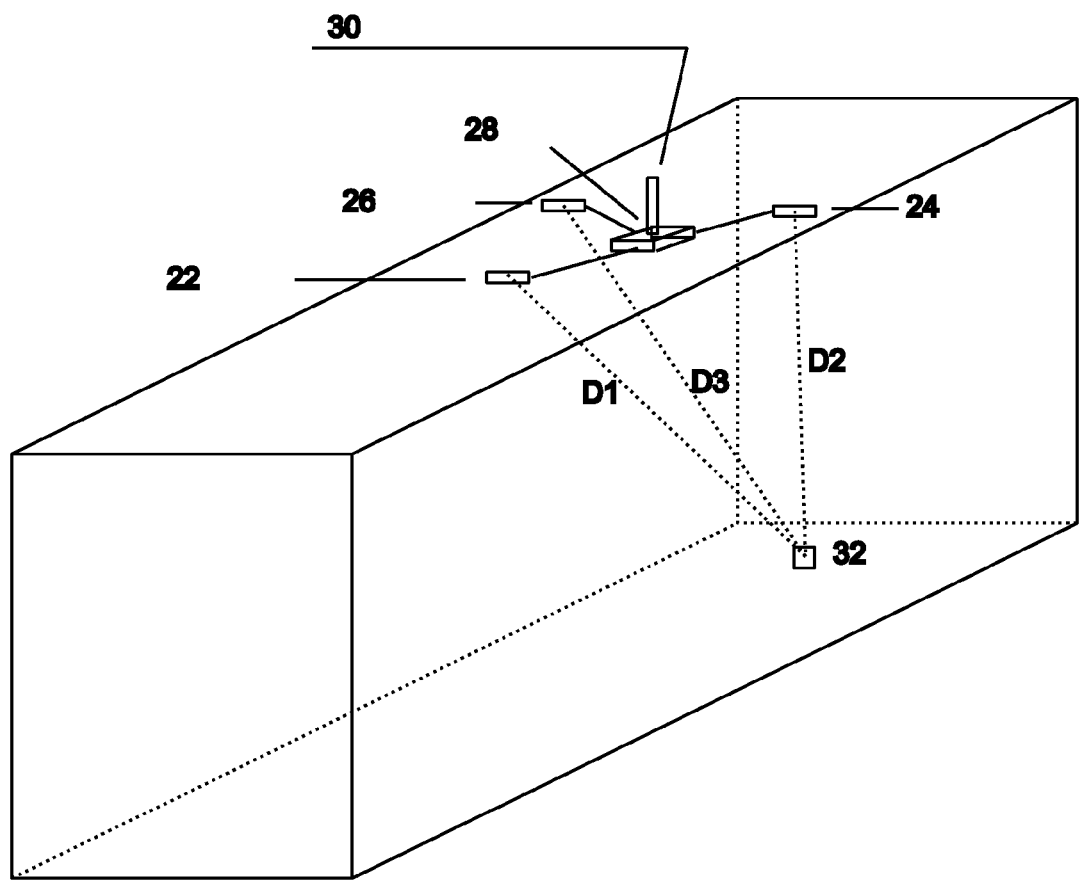
FIG. 2 illustrates a second embodiment of a cargo space equipped with a system in accordance with the invention for obtaining information from a tagged object in the cargo space.

FIG. 2 illustrates an embodiment of a cargo space with three antennas 22, 24, 26 spaced in a triangular fashion located on the roof, ceiling or top of the shipping container defining the cargo space and connected to an interrogator 28 internal to the cargo space. The interrogator 28 is connected to an external antenna 30 and can also be connected to a satellite or other communication unit as in FIG. 1. The distances from each antenna 22, 24, 26 to the RFID device or tag 32 are shown as D1, D2 and D3. The interrogator 28 may be arranged within the triangle defined by the antennas 22, 24, 26 or elsewhere. The variations described for the embodiment shown in FIG. 1 are equally applicable to this embodiment.

Mounting of the antennas 22, 24, 26, or possibly any other type of electromagnetic energy transmitter, on the roof of the shipping container is advantageous in that is it very unlikely to interfere with the maximum use of the cargo space provided by the shipping container.

Figure 3:
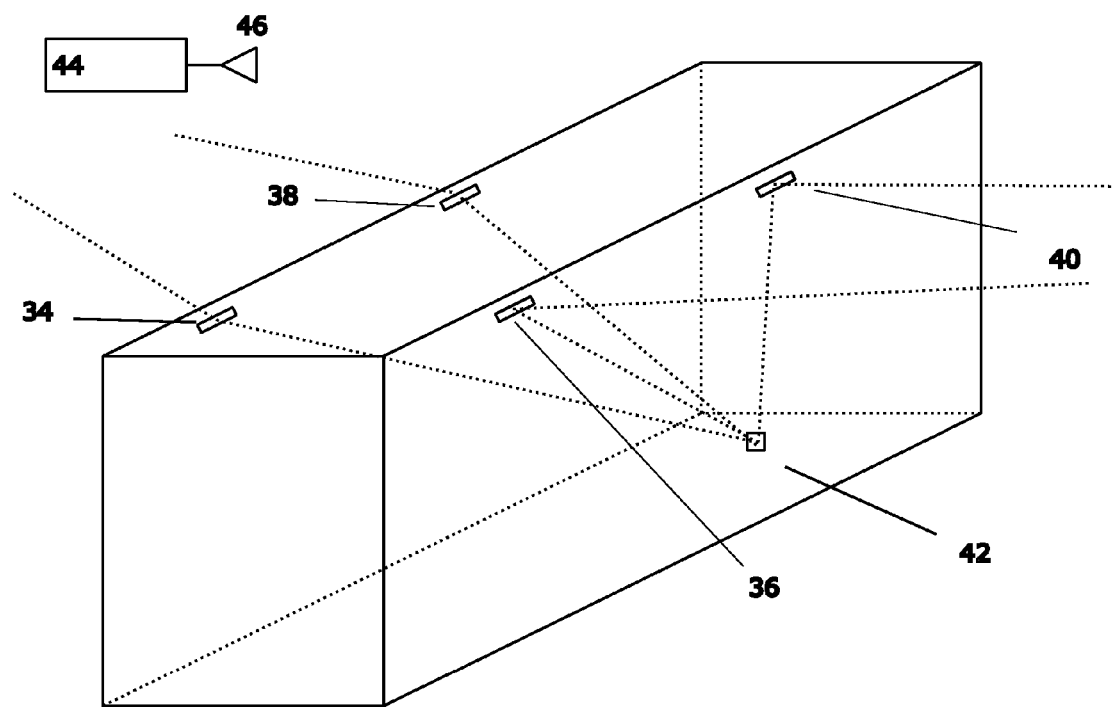
FIG. 3 illustrates an embodiment of a cargo space with RF windows.

FIG. 3 illustrates an embodiment of a shipping container defining a cargo space with multiple RF windows 34, 36, 38, 40 in the frame of the container. The windows 34, 36, 38, 40 allow for the signal to and from one or more RFID devices or tags 42 in the cargo space to transmit and receive signals from an interrogator 44 such as shown schematically in FIG. 6 which can be located outside of the cargo space. This embodiment therefore enables an interrogator 44 to obtain signals via antenna 46 from an RFID device or tag 42 within a cargo space while the interrogator 44 is separate and apart from the cargo space. Such RF windows would be needed anytime the frame is interposed between the interrogator and its antenna, and the space defined by the frame. It is thus conceivable that the interrogator and its antenna may even be arranged on the frame yet require one or more RF windows to enable signals from the antenna to pass into the space and return signals from any RFID devices in the space to pass out of the space to be received by the antenna.

The size, location and number of RF windows in an asset, such as the shipping container defining the cargo space shown in FIG. 3, can vary depending on, for example, the expected and possible locations of RFID devices or tags in the cargo space or other space defined by the asset, the dimensions of the cargo space or other space defined by the asset, and the expected relative position between the antenna of the interrogator and the RFID devices. It is possible that one or more RF windows be situated at the same location on a particular type of shipping container and that a scanning system being provided for use with such shipping containers which is designed to accept one or more shipping containers in a position in which the RF windows are automatically properly aligned with an antenna of an interrogator of the scanning system. This will simplify the scanning of the shipping containers.

Figure 4:
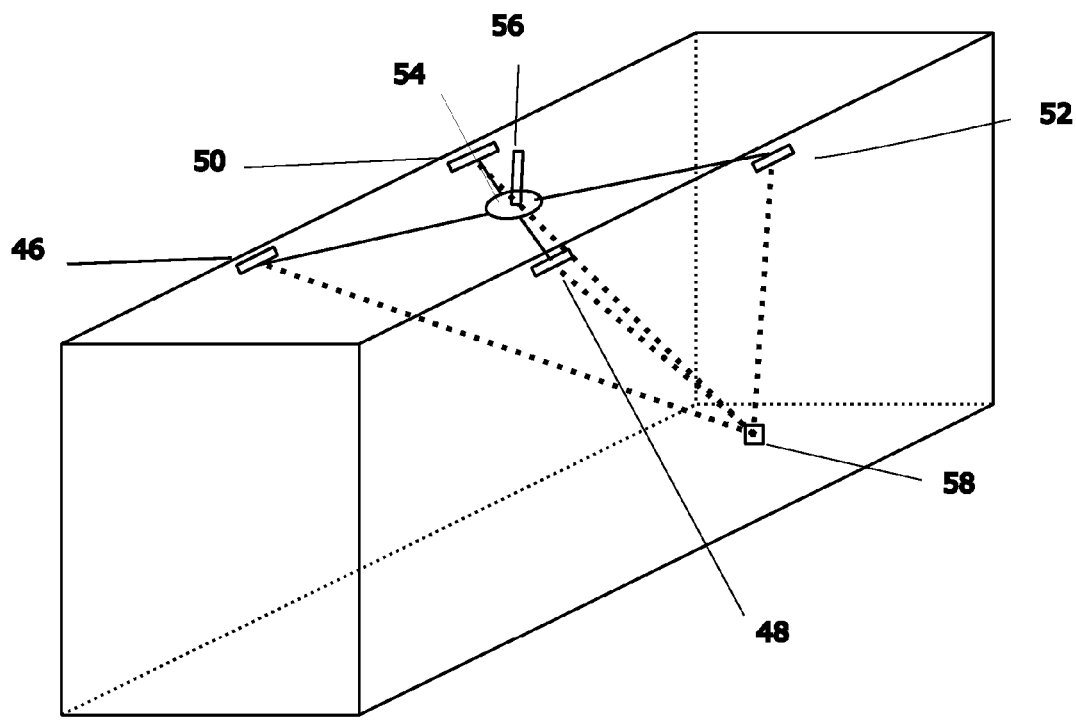
FIG. 4 illustrates an embodiment of a cargo space with an antenna multiplexer arrangement.

FIG. 4 illustrates an embodiment of a cargo space with a multiple of internal antennas 46, 48, 50, 52 connected to an antenna multiplexer 54 (such as a PE4261 SP4T RF UltraCMOS™ Flip Chip Switch manufactured by Peregrine Semiconductor). As shown, antennas 46, 48, 50, 52 are all arranged at the top of the shipping container defining the cargo space.

Figure 6:
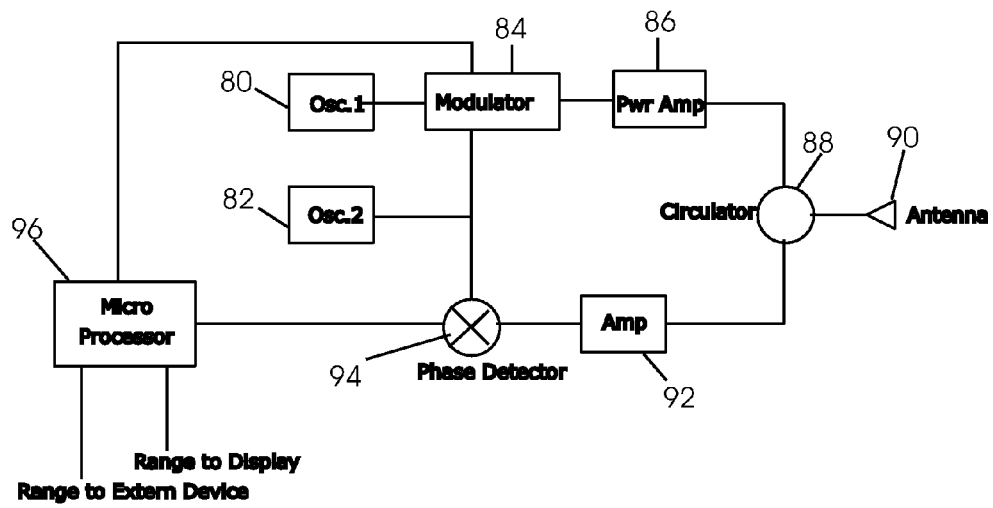
FIGS. 6 and 7 are block diagrams of an interrogator with a single antenna which may be used in the invention.

The multiplexer 54 may be connected to an antenna 56 outside of the cargo space (an external antenna, yet one which is still mounted on or attached to the frame defining the cargo space) for communications with an external interrogator such as illustrated in FIG. 6. A transceiver may be connected between the multiplexer 54 and the external antenna 56 in order to increase the signal strength of the signals from the RFID device 58 which is internal to the shipping container defining the cargo space. The external antenna 56 is sued to communicate with an interrogator and its antenna which is used to control the transmissions of signals by the antennas 46, 48, 50, 52 and process signals received by the antennas into information about the RFID device 58 or an object on or to which the RFID device is mounted to attached. A processor may be used for this purpose and may either be part of the interrogator or separate therefrom.

Figure 10:
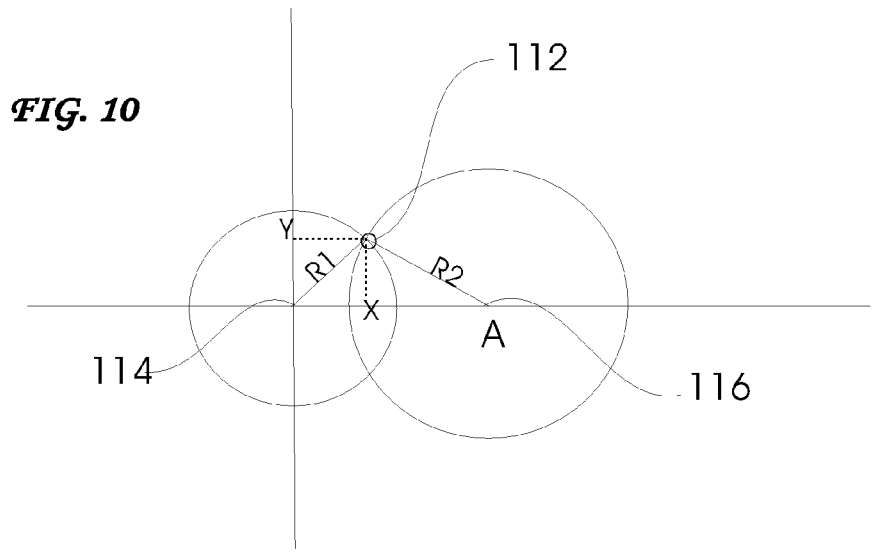
FIG. 10 illustrates a method of using triangulation to determine the location of a tag within a cargo space in accordance with the invention.

The RFID device location in the cargo space may be determined by measuring the distances from the RFID device 58 to each of the internal antennas 46, 48, 50, 52 by triangulation as illustrated in FIG. 10 and described below. Triangulation may be used in the same manner whenever there are at least three antennas which receive signals generated by the presence of an RFID device in a monitored cargo space.

Figure 5:
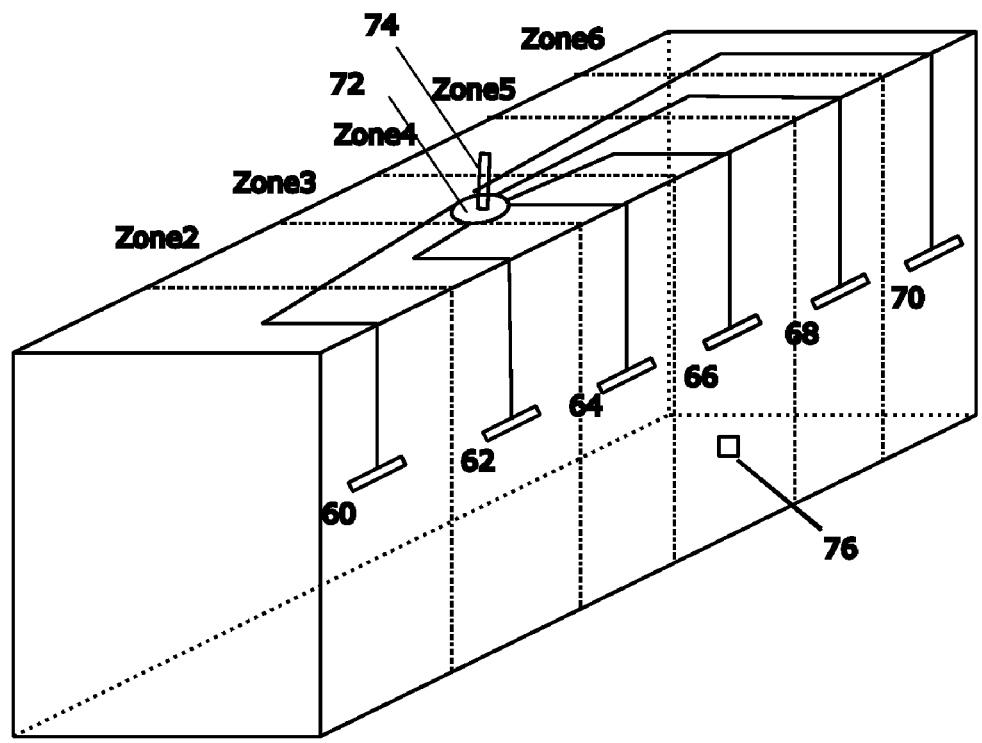
FIG. 5 illustrates an embodiment of a cargo space with multiple antennas which enable the position of a tag to be determined based on reception of signals by the antennas.

FIG. 5 illustrates an embodiment of a cargo space with multiple internal antennas 60, 62, 64, 66, 68, 70 connected to an antenna multiplexer 72 (such as the PE4261). The multiplexer 72 may be connected to an external antenna 74 outside of the cargo space for communications with an external interrogator such as illustrated in FIG. 6. As in the embodiment of FIG. 4, a transceiver may be connected between the multiplexer 72 and the outside antenna 74 for increasing the signal strength of the signals from the RFID device 76 or RFID devices which are within the cargo space. The RFID device location in the cargo space may be determined by measuring the signal strengths from the internal antennas 60, 62, 64, 66, 68, 70, whereby the antenna closest to the RFID device 76 will have the largest or strongest signal therefore the zone where the RFID device 76 is located in the cargo space may be determined.

When using multiple antennas on an asset and deriving the general location of area of the RFID device or RFID-device equipped object based on the signal strength, the antennas can be distributed or spaced apart along any single dimension of the asset, e.g., longitudinally for the shipping container as shown in FIG. 5. In this manner, the approximate longitudinal location of the RFID device or object equipped therewith could be determined. Of course, when two antennas provide signals having equal strength, it could be derived that the RFID device is situated exactly between the antenna locations.

In one embodiment, the antennas are arranged along a longitudinal center line of the cargo space, e.g., down the center of a shipping trailer or container.

FIG. 6 illustrates a block diagram of an interrogator with a single antenna which may be used in the embodiments herein. Information from this interrogator may be displayed locally or sent over a communications link, such as a satellite, cell phone, internet or equivalent link, to a remote location for processing, logging, re-transmission or for any other purpose.

The interrogator 78 includes a pair of oscillators 80, 82, a modulator 84 processing the output from oscillators 80, 82 and providing output to a power amplifier 86, a circulator 88 connected to the power amplifier 86 and providing a signal for transmission by the antenna 90 with a signal being received by antenna 90 being directed through the circulator 88 to an amplifier 92, and a phase detector 94 connected to the oscillator 82, modulator 84 and amplifier 92 and performing a phase comparison between the signals transmitted and received via antenna 90. A microprocessor 96 is coupled to the modulator 84 and phase detector 94 and analyzes the phase comparison to determine information about a RFID device which returns a signal to the antenna 90. This information may be distance or range information, which may be provided to an external device or a display. Additionally or alternatively, if may be identification information or motion information.

The information may be derived using the known speed of the waves and the time for travel of the waves, since the distance between the antenna and the RFID-device is equal to one-half the speed multiplied by the total travel time. The frequency can be calculated from the determined time and the range of the phase detector is radians.

FIG. 7 illustrates a block diagram of an interrogator with a single antenna similar to that shown in FIG. 6. Information from this interrogator may be displayed locally or sent over a communications link via a communications device 97 to a remote location as above. This embodiment of an interrogator shows a method for measuring the distance from the interrogator antenna to the antenna of an RFID device. The modulation used may be either amplitude or frequency; the phase detector may be of the phase/frequency type. An exemplifying calculations for amplitude modulation would involve determining the time for travel of the waves, which is equal to twice the distance between the antenna and the RFID-device (having a set maximum of 5 meters) divided by the speed of light. The frequency can be calculated from the determined time and the range of the phase detector is radians.

FIG. 8 illustrates a block diagram of an interrogator with multiple antennas which may be used in embodiments herein. The block diagram is similar to that shown in FIG. 6 and the same reference numerals designate the same elements. However, in this embodiment, individual antennas are selected by a MUX 98 (which may be one designated in the field as a PE4261). The MUX 98 controls the transmission and reception of signals via antennas 100, 102, 104. Any number of antennas may be provided, and using the PE4261, up to six antennas may be used. Control of the MUX 98 may be achieved using the microprocessor 96 which is coupled thereto.

Information from this interrogator may be displayed locally or sent over a communications link to a remote location as described above. This embodiment of an interrogator shows a method for measuring the distance from the selected interrogator antenna to a tag antenna. The modulation may be either amplitude or frequency; the phase detector may be of the phase/frequency type. Example calculations are shown for amplitude modulation. By using the distances from the antennas 100, 102, 104 to a tag, the location of the tag can be calculated by triangulation as shown in FIG. 10 and described below.

FIG. 9 illustrates three exemplary methods for deriving or harvesting electrical power for the operation of interrogators, multiplexers and/or transceivers/transmitters, as well as any other electricity consuming devices on the cargo container needed for the operation or purpose of gathering information about a tagged object in the cargo space, whether situated within or in the cargo space or within, in or on the structure defining the cargo space. These include solar panels 106 (shown in the top of the cargo container), a vibration to voltage generator 108 (shown on a side of the container) and a magnetic field variation device 110 which generates electrical power based on variations in a magnetic field caused by movement of the container.

FIG. 10 illustrates a method of using triangulation to determine the location of a typical tag 112 within a cargo space, which may be used in embodiments described herein. The exemplary tag location determination by triangulation is shown for two dimensions in the x, y plane but may be readily extended to a three-dimensional x, y, z space.

Let:
R1=The measured range from Antenna 114 to the tag 112.
R2=The measured range from Antenna 116($a$,0) to the tag 112.
a=known distance between antennas $$R1^2 := x^2 + y^2 \qquad \text{Eq (1)}$$

$$y^2 := R1^2 - x^2$$

$$R2 := (x+a)^2 + y^2 \qquad \text{Eq (2)}$$

substituting:

$$R2^2 := (x+a)^2 + R1^2 - x^2$$

$$R2^2 - R1^2 := x^2 + 2a \cdot x + a^2 - x^2$$

$$2 \cdot a \cdot x := R2^2 - R1^2 - a^2$$

R1 and R2 are measured values and a is known by the distance between the antennas 114, 116 therefore; x can be computed. Once x is computed y can be found by substituting x into equation 1.

$$x := \frac{(R2^2 - R1^2 - a^2)}{2 \cdot a}$$

The location of the tag 112 in three dimensions can now be easily found by those skilled in the art.

The above analysis has been based on the time of arrival of a signal from a tag at the various antennas. Other methods based on the angle of arrival can permit vectors to be drawn that pass through the tag location and then based on the calculation of the intersection of these vectors, the location of the tag can be found. Information about this technique is disclosed, for example, in Z. Wen, L. Li, and P. Wei "Fast Direction Using Modified Pseudocovariance Matrix", IEEE Transactions on Antennas and Propagation, Vol 54, No. 12, December 2006, and articles referenced therein.

An alternate approach would be for the antennas to send short pulses which all of the tags would hear and record the times of arrival. This recording would then be sent back to the interrogator from which the interrogator circuitry could determine the location of a tag based on the pattern of signals that the tag heard. Each antenna could append an ID so that the tag could record the tag signal correspondence. These techniques can be based on relative times or on absolute time. The latter could be determined by a variety of methods including syncing the clock on each tag with the interrogator clock.

Another method of determining the location of a tag is to enable the tag to either receive or transmit ultrasound. In the latter case, the tag would emit an ultrasonic pulse when it receives an RF pulse and listeners distributed around the cargo space would receive each ultrasonic pulse at a different time and thereby know, or enable a determination of, the distance to the tag. If there are three listeners, then the tag location is known based on the known location of the listeners.

The methods and systems described above for interacting with RFID devices or tags are equally applicable for other types of tags or responsive devices including but not limited to various SAW devices, resonators and reflectors (e.g., dihedral reflectors), such as disclosed in the applications listed above. The information obtained by the methods and system in accordance with the invention which interact with these devices may be identification information and/or positional information. In the latter case, when tags are installed onto fixed components of assets, such as a seat or door in a vehicle, their presence, positions and/or orientations can be determined and used to control other systems, such as vehicular systems having output which varying as a function of the presence, position and/or orientation of the components (which may correlate to the presence, position and/or orientation of human occupants of the vehicles).

The methods and system in accordance with the invention can be used to interrogate multiple RFID devices or similar tags. In this case, the identification, location and/or motion of multiple RFID devices or objects associated therewith can be determined.

In a preferred embodiment, the asset is a vehicle and one or more components are equipped with RFID devices. The interrogator controls transmission of RF signals from the antennas to cause these RFID devices to generate return signals. Analysis of these return signals by a processor associated with the interrogator can be used to derive information about the components. In this regard, reference is made to the disclosure of U.S. Pat. No. 6,820,897 which is directed to, among other things, use of resonators arranged on vehicular components.

Additional variations of any of the embodiments of the method and system described above include the ability of the interrogator or antenna multiplexer to transmit signals from the RFID devices or information derived from the RFID devices to one or more locations or sites remote from the asset containing the RFID device. This allows remote monitoring of assets.

The presence of an interrogator on the same frame or structure which defines a space into which RFID devices or objects equipped with RFID devices greatly simplifies the ability to scan spaces of these frames or structures. The objects equipped with the RFID devices may be sensors. In addition, such sensors may be arranged to be independently interrogated by the interrogator which would thus interrogate the RFID devices and the sensors. These sensors may be temperature, optical, flow, humidity, chemical, biochemical, current, voltage, magnetic field, electric field, force, acceleration, velocity, displacement, a position, vibration, acoustic, radiation, charge, viscosity, density, electrical resistance, electrical impedance, electrical capacitance, electrical inductance and pressure sensors.

The presence and identification of people can be derived using RFID devices, via analysis of information from RFID devices mounted to the vehicle's structure such as seats, and then transmitted off of the vehicle. This concept is disclosed in U.S. Pat. No. 5,829,782, along with the presence of tags and tag monitors inside a vehicle.

The methods and systems described above could also be used to determine the location of RFID devices exterior of a cargo space, yet still within proximity to, on or in a vehicle containing the interrogator.

The power generated by the antennas may be higher in view of the direction of the radio frequency signals into a closed cargo space. In this regard, transmission rules by the FCC may not apply within an enclosed volume with regard to frequencies or power.

The invention is also applicable to the placement of RFID device on luggage or baggage which is placed on airplanes. In this case, a passenger and others can always locate their baggage, provided they have an interrogator or an interrogator is used to determine the location of each passenger's luggage. The system can thus detect and locate luggage and baggage, or other objects, after it is in a vehicle equipped with an interrogator.

Another feature of the invention is the use of smart antennas and a single interrogator or reader for use in determining the location of an RFID device or object equipped therewith. Ideally, the method and system would use minimal energy to achieve this location-determination.

The RFID devices in any of the embodiments herein may utilize and an RFID switch, or other techniques, to limit transmissions. MIR may be used to interrogate the RFID devices.

In one embodiment, transmission via the antennas is based on the location of the antennas. Thus, the interrogator can control the antennas to transmit as a function of the location which is known to the interrogator, or the processor which controls the interrogator.

For an RFID device or other device which can transmit or generate a return signal at two or more frequencies, it is conceivable that the distance to the RFID device from the antenna can be determined applying a known phase relationship. With multiple antennas, the ability of an RFID device to transmit at two or more frequencies can be used to remove integer ambiguity and thereby get a more accurate distance measurement.

Since the best position to place antennas on a shipping container or frame of another asset including an interior, object-receiving space, is not always known in advance, a process can be implemented to find the best location for the antennas. This process may entail arranging a large number of antennas on the asset and conducting tests to determining the position of RFID devices in the space. Antennas are removed in stages and more tests conducted until the optimum number and position of antennas for the space which provides an acceptable accuracy is determined.

RFID devices can be used in combination with SAW devices and other wireless sensors. Many sensors are now in vehicles and many more will be installed in vehicles. The following disclosure is primarily concerned with wireless sensors which can be based on MEMS, SAW and/or RFID technologies. Vehicle sensors include tire pressure, temperature and acceleration monitoring sensors; weight or load measuring sensors; switches; vehicle temperature, acceleration, angular position, angular rate, angular acceleration sensors; proximity; rollover; occupant presence; humidity; presence of fluids or gases; strain; road condition and friction, chemical sensors and other similar sensors providing information to a vehicle system, vehicle operator or external site. The sensors can provide information about the vehicle and/or its interior or exterior environment, about individual components, systems, vehicle occupants, subsystems, and/or about the roadway, ambient atmosphere, travel conditions and external objects.

For wireless sensors, one or more interrogators can be used each having one or more antennas that transmit energy at radio frequency, or other electromagnetic frequencies, to the sensors and receive modulated frequency signals from the sensors containing sensor and/or identification information. One interrogator can be used for sensing multiple switches or other devices. For example, an interrogator may transmit a chirp form of energy at 905 MHz to 925 MHz to a variety of sensors located within and/or in the vicinity of the vehicle. These sensors may be of the RFID electronic type and/or of the surface acoustic wave (SAW) type or a combination thereof. In the electronic type, information can be returned immediately to the interrogator in the form of a modulated backscatter RF signal. In the case of SAW devices, the information can be returned after a delay. RFID tags may also exhibit a delay due to the charging of the energy storage device. One sensor can respond in both the electronic (either RFID or backscatter) and SAW-delayed modes.

When multiple sensors are interrogated using the same technology, the returned signals from the various sensors can be time, code, space or frequency multiplexed. For example, for the case of the SAW technology, each sensor can be provided with a different delay or a different code. Alternately, each sensor can be designed to respond only to a single frequency or several frequencies. The radio frequency can be amplitude, code or frequency modulated. Space multiplexing can be achieved through the use of two or more antennas and correlating the received signals to isolate signals based on direction.

In many cases, the sensors will respond with an identification signal followed by or preceded by information relating to the sensed value, state and/or property. In the case of a SAW-based or RFID-based switch, for example, the returned signal may indicate that the switch is either on or off or, in some cases, an intermediate state can be provided signifying that a light should be dimmed, rather than or on or off, for example. Alternately or additionally, an RFID based switch can be associated with a sensor and turned on or off based on an identification code or a frequency sent from the interrogator permitting a particular sensor or class of sensors to be selected.

SAW devices have been used for sensing many parameters including devices for chemical and biological sensing and materials characterization in both the gas and liquid phase. They also are used for measuring pressure, strain, temperature, acceleration, angular rate and other physical states of the environment.

Economies are achieved by using a single interrogator or even a small number of interrogators to interrogate many types of devices. For example, a single interrogator may monitor tire pressure and temperature, the weight of an occupying item of the seat, the position of the seat and seatback, as well as a variety of switches controlling windows, door locks, seat position, etc. in a vehicle. Such an interrogator may use one or multiple antennas and when multiple antennas are used, may switch between the antennas depending on what is being monitored.

Similarly, the same or a different interrogator can be used to monitor various components of the vehicle's safety system including occupant position sensors, vehicle acceleration sensors, vehicle angular position, velocity and acceleration sensors, related to both frontal, side or rear impacts as well as rollover conditions. The interrogator could also be used in conjunction with other detection devices such as weight sensors, temperature sensors, accelerometers which are associated with various systems in the vehicle to enable such systems to be controlled or affected based on the measured state.

Some specific examples of the use of interrogators and responsive devices will now be described.

The antennas used for interrogating the vehicle tire pressure transducers can be located outside of the vehicle passenger compartment. For many other transducers to be sensed the antennas can be located at various positions within passenger compartment. At least one invention herein contemplates, therefore, a series of different antenna systems, which can be electronically switched by the interrogator circuitry. Alternately, in some cases, all of the antennas can be left connected and total transmitted power increased.

There are several applications for weight or load measuring devices in a vehicle including the vehicle suspension system and seat weight sensors for use with automobile safety systems. As described in U.S. Pat. Nos. 4,096,740, 4,623,813, 5,585,571, 5,663,531, 5,821,425 and 5,910,647 and International Publication No. WO 00/65320(A1), SAW devices are appropriate candidates for such weight measurement systems, although in some cases RFID systems can also be used with an associated sensor such as a strain gage. In this case, the surface acoustic wave on the lithium niobate, or other piezoelectric material, is modified in delay time, resonant frequency, amplitude and/or phase based on strain of the member upon which the SAW device is mounted. For example, the conventional bolt that is typically used to connect the passenger seat to the seat adjustment slide mechanism can be replaced with a stud which is threaded on both ends. A SAW or other strain device can be mounted to the center unthreaded section of the stud and the stud can be attached to both the seat and the slide mechanism using appropriate threaded nuts. Based on the particular geometry of the SAW device used, the stud can result in as little as a 3 mm upward displacement of the seat compared to a normal bolt mounting system. No wires are required to attach the SAW device to the stud other than for an antenna.

In use, the interrogator transmits a radio frequency pulse at, for example, 925 MHz that excites antenna on the SAW strain measuring system. After a delay caused by the time required for the wave to travel the length of the SAW device, a modified wave is re-transmitted to the interrogator providing an indication of the strain of the stud with the weight of an object occupying the seat corresponding to the strain. For a seat that is normally bolted to the slide mechanism with four bolts, at least four SAW strain sensors could be used. Since the individual SAW devices are very small, multiple devices can be placed on a stud to provide multiple redundant measurements, or permit bending and twisting strains to be determined, and/or to permit the stud to be arbitrarily located with at least one SAW device always within direct view of the interrogator antenna. In some cases, the bolt or stud will be made on non-conductive material to limit the blockage of the RF signal. In other cases, it will be insulated from the slide (mechanism) and used as an antenna.

If two longitudinally spaced apart antennas are used to receive the SAW or RFID transmissions from the seat weight sensors, one antenna in front of the seat and the other behind the seat, then the position of the seat can be determined eliminating the need for current seat position sensors. A similar system can be used for other seat and seatback position measurements.

For strain gage weight sensing, the frequency of interrogation can be considerably higher than that of the tire monitor, for example. However, if the seat is unoccupied, then the frequency of interrogation can be substantially reduced. For an occupied seat, information as to the identity and/or category and position of an occupying item of the seat can be obtained through the multiple weight sensors described. For this reason, and due to the fact that during the pre-crash event, the position of an occupying item of the seat may be changing rapidly, interrogations as frequently as once every 10 milliseconds or faster can be desirable. This would also enable a distribution of the weight being applied to the seat to be obtained which provides an estimation of the center of pressure and thus the position of the object occupying the seat. Using pattern recognition technology, e.g., a trained neural network, sensor fusion, fuzzy logic, etc., an identification of the object can be ascertained based on the determined weight and/or determined weight distribution.

There are many other methods by which SAW devices can be used to determine the weight and/or weight distribution of an occupying item other than the method described above and all such uses of SAW strain sensors for determining the weight and weight distribution of an occupant are contemplated. For example, SAW devices with appropriate straps can be used to measure the deflection of the seat cushion top or bottom caused by an occupying item, or if placed on the seat belts, the load on the belts can determined wirelessly and powerlessly. Geometries similar to those disclosed in U.S. Pat. No. 6,242,701 (which discloses multiple strain gage geometries) using SAW strain-measuring devices can also be constructed, e.g., any of the multiple strain gage geometries shown therein.

Generally there is an RFID implementation that corresponds to each SAW implementation. Therefore, where SAW is used herein the equivalent RFID design will also be meant where appropriate.

Although a preferred method for using the invention is to interrogate each SAW device using wireless mechanisms, in some cases, it may be desirable to supply power to and/or obtain information from one or more of the SAW devices using wires. As such, the wires would be an optional feature.

One advantage of the weight sensors of this invention along with the geometries disclosed in the '701 patent and herein below, is that in addition to the axial stress in the seat support, the bending moments in the structure can be readily determined. For example, if a seat is supported by four "legs", it is possible to determine the state of stress, assuming that axial twisting can be ignored, using four strain gages on each leg support for a total of 16 such gages. If the seat is supported by three legs, then this can be reduced to 12 gages. A three-legged support is preferable to four since with four legs, the seat support is over-determined which severely complicates the determination of the stress caused by an object on the seat. Even with three supports, stresses can be introduced depending on the nature of the support at the seat rails or other floor-mounted supporting structure. If simple supports are used that do not introduce bending moments into the structure, then the number of gages per seat can be reduced to three, provided a good model of the seat structure is available. Unfortunately, this is usually not the case and most seats have four supports and the attachments to the vehicle not only introduce bending moments into the structure but these moments vary from one position to another and with temperature. The SAW strain gages of this invention lend themselves to the placement of multiple gages onto each support as needed to approximately determine the state of stress and thus the weight of the occupant depending on the particular vehicle application. Furthermore, the wireless nature of these gages greatly simplifies the placement of such gages at those locations that are most appropriate.

An additional point should be mentioned. In many cases, the determination of the weight of an occupant from the static strain gage readings yields inaccurate results due to the indeterminate stress state in the support structure. However, the dynamic stresses to a first order are independent of the residual stress state. Thus, the change in stress that occurs as a vehicle travels down a roadway caused by dips in the roadway can provide an accurate measurement of the weight of an object in a seat. This is especially true if an accelerometer is used to measure the vertical excitation provided to the seat.

Some vehicle models provide load leveling and ride control functions that depend on the magnitude and distribution of load carried by the vehicle suspension. Frequently, wire strain gage technology is used for these functions. That is, the wire strain gages are used to sense the load and/or load distribution of the vehicle on the vehicle suspension system. Such strain gages can be advantageously replaced with strain gages based on SAW technology with the significant advantages in terms of cost, wireless monitoring, dynamic range, and signal level. In addition, SAW strain gage systems can be more accurate than wire strain gage systems.

A strain detector in accordance with this invention can convert mechanical strain to variations in electrical signal frequency with a large dynamic range and high accuracy even for very small displacements. The frequency variation is produced through use of a surface acoustic wave (SAW) delay line as the frequency control element of an oscillator. A SAW delay line comprises a transducer deposited on a piezoelectric material such as quartz or lithium niobate which is arranged so as to be deformed by strain in the member which is to be monitored. Deformation of the piezoelectric substrate changes the frequency control characteristics of the surface acoustic wave delay line, thereby changing the frequency of the oscillator. Consequently, the oscillator frequency change is a measure of the strain in the member being monitored and thus the weight applied to the seat. A SAW strain transducer can be more accurate than a conventional resistive strain gage.

Other applications of weight measuring systems for an automobile include measuring the weight of the fuel tank or other containers of fluid to determine the quantity of fluid contained therein.

One problem with SAW devices is that if they are designed to operate at the GHz frequency, the feature sizes become exceeding small and the devices are difficult to manufacture, although techniques are now available for making SAW devices in the tens of GHz range. On the other hand, if the frequencies are considerably lower, for example, in the tens of megahertz range, then the antenna sizes become excessive. It is also more difficult to obtain antenna gain at the lower frequencies. This is also related to antenna size. One method of solving this problem is to transmit an interrogation signal in the high GHz range which is modulated at the hundred MHz range. At the SAW transducer, the transducer is tuned to the modulated frequency. Using a nonlinear device such as a Shocky diode, the modified signal can be mixed with the incoming high frequency signal and re-transmitted through the same antenna. For this case, the interrogator can continuously broadcast the carrier frequency.

Devices based on RFID or SAW technology can be used as switches in a vehicle as described in U.S. Pat. Nos. 6,078,252, 6,144,288 and 6,748,797. There are many ways that this can be accomplished. A switch can be used to connect an antenna to either an RFID electronic device or to a SAW device. This requires contacts to be closed by the switch activation. An alternate approach is to use pressure from an occupant's finger, for example, to alter the properties of the acoustic wave on the SAW material much as in a SAW touch screen. The properties that can be modified include the amplitude of the acoustic wave, and its phase, and/or the time delay or an external impedance connected to one of the SAW reflectors as disclosed in U.S. Pat. No. 6,084,503. In this implementation, the SAW transducer can contain two sections, one which is modified by the occupant and the other which serves as a reference. A combined signal is sent to the interrogator that decodes the signal to determine that the switch has been activated. By any of these technologies, switches can be arbitrarily placed within the interior of an automobile, for example, without the need for wires. Since wires and connectors are the cause of most warranty repairs in an automobile, not only is the cost of switches substantially reduced but also the reliability of the vehicle electrical system is substantially improved.

The interrogation of switches can take place with moderate frequency such as once every 100 milliseconds. Either through the use of different frequencies or different delays, a large number of switches can be time, code, space and/or frequency multiplexed to permit separation of the signals obtained by the interrogator. Alternately, an RF activated switch on some or all of the sensors can be used as discussed below.

Another approach is to attach a variable impedance device across one of the reflectors on the SAW device. The impedance can therefore be used to determine the relative reflection from the reflector compared to other reflectors on the SAW device. In this manner, the magnitude as well as the presence of a force exerted by an occupant's finger, for example, can be used to provide a rate sensitivity to the desired function. In an alternate design, as shown in U.S. Pat. No. 6,144,288, the switch is used to connect the antenna to the SAW device. In this case, the interrogator will not get a return from the SAW switch unless it is depressed.

Temperature measurement is another field in which SAW technology can be applied and the invention encompasses several embodiments of SAW temperature sensors.

U.S. Pat. No. 4,249,418 is one of many examples of prior art SAW temperature sensors. Temperature sensors are commonly used within vehicles and many more applications might exist if a low cost wireless temperature sensor is available such as disclosed herein. The SAW technology can be used for such temperature sensing tasks. These tasks include measuring the vehicle coolant temperature, air temperature within passenger compartment at multiple locations, seat temperature for use in conjunction with seat warming and cooling systems, outside temperatures and perhaps tire surface temperatures to provide early warning to operators of road freezing conditions. One example, is to provide air temperature sensors in the passenger compartment in the vicinity of ultrasonic transducers used in occupant sensing systems as described in U.S. Pat. No. 5,943,295, since the speed of sound in the air varies by approximately 20% from −40° C. to 85° C. Current ultrasonic occupant sensor systems do not measure or compensate for this change in the speed of sound with the effect of reducing the accuracy of the systems at the temperature extremes. Through the judicious placement of SAW temperature sensors in the vehicle, the passenger compartment air temperature can be accurately estimated and the information provided wirelessly to the ultrasonic occupant sensor system thereby permitting corrections to be made for the change in the speed of sound.

Since the road can be either a source or a sink of thermal energy, strategically placed sensors that measure the surface temperature of a tire can also be used to provide an estimate of road temperature.

Acceleration sensing is another field in which SAW technology can be applied and the invention encompasses several embodiments of SAW accelerometers.

U.S. Pat. Nos. 4,199,990, 4,306,456 and 4,549,436 are examples of prior art SAW accelerometers. Airbag crash sensors for determining whether the vehicle is experiencing a frontal or side impact often use micromachined accelerometers. These accelerometers are usually based on the deflection of a mass which is sensed using either capacitive or piezoresistive technologies. SAW technology has previously not been used as a vehicle accelerometer or for vehicle crash sensing. Due to the importance of this function, at least one interrogator could be dedicated to this critical function. Acceleration signals from the crash sensors should be reported at least preferably every 100 microseconds. In this case, the dedicated interrogator would send an interrogation pulse to all crash sensor accelerometers every 100 microseconds and receive staggered acceleration responses from each SAW accelerometer wirelessly. This technology permits the placement of multiple low-cost accelerometers at ideal locations for crash sensing including inside the vehicle side doors, in the passenger compartment and in the frontal crush zone. Additionally, crash sensors can now be located in the rear of the vehicle in the crush zone to sense rear impacts. Since the acceleration data is transmitted wirelessly, concern about the detachment or cutting of wires from the sensors disappears. One of the main concerns, for example, of placing crash sensors in the vehicle doors where they most appropriately can sense vehicle side impacts, is the fear that an impact into the A-pillar of the automobile would sever the wires from the door-mounted crash sensor before the crash was sensed. This problem disappears with the wireless technology of this invention. If two accelerometers are placed at some distance from each other, the roll acceleration of the vehicle can be determined and thus the tendency of the vehicle to rollover can be predicted in time to automatically take corrective action and/or deploy a curtain airbag or other airbag(s). Other types of sensors such as crash sensors based on pressure measurements, such as supplied by Siemens, can also now be wireless.

Although the sensitivity of measurement is considerably greater than that obtained with conventional piezo-electric or micromachined accelerometers, the frequency deviation of SAW devices remains low (in absolute value). Accordingly, the frequency drift of thermal origin should be made as low as possible by selecting a suitable cut of the piezoelectric material. The resulting accuracy is impressive as presented in U.S. Pat. No. 4,549,436, which discloses an angular accelerometer with a dynamic a range of 1 temperature coefficient of 0.005%/deg F., an accuracy of 1 microradian/sec$^2$, a power consumption of 1 milliwatt, a drift of 0.01% per year, a volume of 1 cc/axis and a frequency response of 0 to 1000 Hz. The subject matter of the '436 patent is hereby included in the invention to constitute a part of the invention. A similar design can be used for acceleration sensing.

In a similar manner as the polymer-coated SAW device is used to measure pressure, a device wherein a seismic mass is attached to a SAW device through a polymer interface can be made to sense acceleration. This geometry has a particular advantage for sensing accelerations below 1 G, which has proved to be very difficult for conventional micro-machined accelerometers due to their inability to both measure low accelerations and withstand high acceleration shocks.

Gyroscopes are another field in which SAW technology can be applied and the inventions herein encompass several embodiments of SAW gyroscopes.

SAW technology is particularly applicable for gyroscopes as described in International Publication No. WO 00/79217A2. The output of such gyroscopes can be determined with an interrogator that is also used for the crash sensor accelerometers, or a dedicated interrogator can be used. Gyroscopes having an accuracy of approximately 1 degree per second have many applications in a vehicle including skid control and other dynamic stability functions. Additionally, gyroscopes of similar accuracy can be used to sense impending vehicle rollover situations in time to take corrective action.

The inventor has represented that SAW gyroscopes of the type described in WO 00/79217A2 have the capability of achieving accuracies approaching about 3 degrees per hour. This high accuracy permits use of such gyroscopes in an inertial measuring unit (IMU) that can be used with accurate vehicle navigation systems and autonomous vehicle control based on differential GPS corrections. Such a system is described in U.S. Pat. No. 6,370,475. An alternate preferred technology for an IMU is described in U.S. Pat. No. 4,711,125. Such navigation systems depend on the availability of four or more GPS satellites and an accurate differential correction signal such as provided by the OmniStar Corporation, NASA or through the National Differential GPS system now being deployed. The availability of these signals degrades in urban canyon environments, in tunnels and on highways when the vehicle is in the vicinity of large trucks. For this application, an IMU system should be able to accurately control the vehicle for perhaps 15 seconds and preferably for up to five minutes. IMUs based on SAW technology, the technology of U.S. Pat. No. 4,549,436 or of U.S. Pat. No. 4,711,125 are the best-known devices capable of providing sufficient accuracies for this application at a reasonable cost. Other accurate gyroscope technologies such as fiber optic systems are more accurate but can be cost-prohibitive, although analysis has indicated that such gyroscopes can eventually be made cost-competitive. In high volume production, an IMU of the required accuracy based on SAW technology is estimated to cost less than about $100. A cost competing technology is that disclosed in U.S. Pat. No. 4,711,125 which does not use SAW technology.

What follows is a discussion of the Morrison Cube of U.S. Pat. No. 4,711,125 known as the QUBIK™. Typical problems that are encountered with sensors that try to measure multiple physical quantities at the same time and how the QUBIK solves these problems are set forth below.

1. Problem: Errors of measurement of the linear accelerations and angular speed are mutually correlated. Even if every one of the errors, taken separately, does not accumulate with integration (the inertial system's algorithm does that), the cross-coupled multiplication (such as one during re-projecting the linear accelerations from one coordinate system to another) will have these errors detected and will make them a systematic error similar to a sensor's bias.

Solution: The QUBIK IMU is calibrated and compensated for any cross axis sensitivity. For example: if one of the angular accelerometer channels has a sensitivity to any of the three of linear accelerations, then the linear accelerations are buffered and scaled down and summed with the buffered angular accelerometer output to cancel out all linear acceleration sensitivity on all three angular accelerometer channels. This is important to detect pure angular rate signals. This is a very common practice throughout the U.S. aerospace industry to make navigation grade IMU's. Even when individual gyroscopes and accelerometers are used in navigation, they have their outputs scaled and summed together to cancel out these cross axis errors. Note that competitive MEMS products have orders of magnitude higher cross axis sensitivities when compared to navigation grade sensors and they will undoubtedly have to use this practice to improve performance. MEMS angular rate sensors are advertised in degrees per second and navigation angular rate sensors are advertised in degrees per hour. MEMS angular rate sensors have high linear acceleration errors that must be compensated for at the IMU level.

2. Problem: The gyroscope and accelerometer channels require settings to be made that contradict one another physically. For example, a gap between the cube and the housing for the capacitive sensors (that measure the displacements of the cube) is not to exceed 50 to 100 microns. On the other hand, the gyroscope channels require, in order to enhance a Coriolis effect used to measure the angular speed, that the amplitude and the linear speed of vibrations are as big as possible. To do this, the gap and the frequency of oscillations should be increased. A greater frequency of oscillations in the nearly resonant mode requires the stiffness of the electromagnetic suspension to be increased, too, which leads to a worse measurement of the linear accelerations because the latter require that the rigidity of the suspension be minimal when there is a closed feedback.

Solution: The capacitive gap all around the levitated inner cube of the QUBIK is nominally 0.010 inches. The variable capacitance plates are excited by a 1.5 MHz 25 volt peak to peak signal. The signal coming out is so strong (five volts) that there is no preamp required. Diode detectors are mounted directly above the capacitive plates. There is no performance change in the linear accelerometer channels when the angular accelerometer channels are being dithered or rotated back and forth about an axis. This was discovered by having a ground plane around the electromagnets that eliminated transformer coupling. Dithering or driving the angular accelerometer which rotates the inner cube proof mass is a gyroscopic displacement and not a linear displacement and has no effect on the linear channels. Another very important point to make is the servo loops measure the force required to keep the inner cube at its null and the servo loops are integrated to prevent any displacements. The linear accelerometer servo loops are not being exercised to dither the inner cube. The angular accelerometer servo loop is being exercised. The linear and angular channels have their own separate set of capacitance detectors and electromagnets. Driving the angular channels has no effect on the linear ones.

The rigidity of an integrated closed loop servo is infinite at DC and rolls off at higher frequencies. The QUBIK IMU measures the force being applied to the inner cube and not the displacement to measure angular rate. There is a force generated on the inner cube when it is being rotated and the servo will not allow any displacement by applying equal and opposite forces on the inner cube to keep it at null. The servo readout is a direct measurement of the gyroscopic forces on the inner cube and not the displacement.

The servo gain is so high at the null position that one will not see the null displacement but will see a current level equivalent to the force on the cube. This is why integrated closed loop servos are so good. They measure the force required to keep the inner cube at null and not the displacement. The angular accelerometer channel that is being dithered will have a noticeable displacement at its null. The sensor does not have to be driven at its resonance. Driving the angular accelerometer at resonance will run the risk of overdriving the inner cube to the point where it will bottom out and bang around inside its cavity. There is an active gain control circuit to keep the alternating momentum constant.

Note that competitive MEMS based sensors are open loop and allow displacements which increase cross axis errors. MEMS sensors must have displacements to work and do not measure the Coriolis force, they measure displacement which results in huge cross axis sensitivity issues.

3. Problem: As the electromagnetic suspension is used, the sensor is going to be sensitive to external constant and variable (alternating) fields. Its errors will vary with its position, for example, with respect to the Earth's magnetic field or other magnetic sources.

Solution: The earths magnetic field varies from −0.0 to +0.3 gauss and the magnets have gauss levels over 10,000. The earth field can be shielded if necessary.

4. Problem: The QUBIT sensing element is relatively heavy so the sensor is likely to be sensitive to angular accelerations and impacts. Also, the temperature of the environment can affect the micron-sized gaps, magnetic fields of the permanent magnets, the resistance of the inductance coils etc., which will eventually increase the sensor errors.

Solution: The inner cube has a gap of 0.010 inches and does not change significantly over temperature.

The resistance of the coils is not a factor in the active closed loop servo. Anybody who make this statement does not know what they are talking about. There is a stable one PPM/C current readout resistor in series with the coil that measures the current passing through the coil which eliminates the temperature sensitivity of the coil resistance.

Permanent magnets have already proven themselves to be very stable over temperature when used in active servo loops used in navigation gyroscopes and accelerometers.

Note that the sensitivity that the QUBIK IMU has achieved 0.01 degrees per hour.

5. Problem: High Cost. To produce the QUBIK, one may need to maintain micron-sized gaps and highly clean surfaces for capacitive sensors; the devices must be assembled in a dust-free room, and the device itself must be hermetic (otherwise dust or moisture will put the capacitive sensor and the electromagnetic suspension out of operation), the permanent magnets must have a very stable performance because they're going to work in a feedback circuit, and so on. In our opinion, all these issues make the technology overly complex and expensive, so an additional metrological control will be required and no full automation can be ever done.

Solution: The sensor does not have micron size gaps and does not need to be hermetic unless the sensor is submerged in water! Most of the QUBIK IMU sensor is a cut out PCB's that can certainly be automated. The PCB design can keep dust out and does not need to be hermetic. Humidity is not a problem unless the sensor is submerged in water. The permanent magnets achieve parts per million stability at a cost of $0.05 each for a per system cost of under one dollar. There are may navigation grade gyroscopes and accelerometers that use permanent magnets.

Competitive MEMS sensors can have process contamination problems. To my knowledge, there are no MEMS angular rate sensors that do not require human labor and/or calibration. The QUBIK IMU can instead use programmable potentiometers at calibration instead of human labor.

Once an IMU of the accuracy described above is available in the vehicle, this same device can be used to provide significant improvements to vehicle stability control and rollover prediction systems.

Keyless entry systems are another field in which SAW technology can be applied and the invention encompasses several embodiments of access control systems using SAW devices.

A common use of SAW or RFID technology is for access control to buildings however, the range of electronic unpowered RFID technology is usually limited to one meter or less. In contrast, the SAW technology, when powered or boosted, can permit sensing up to about 30 meters. As a keyless entry system, an automobile can be configured such that the doors unlock as the holder of a card containing the SAW ID system approaches the vehicle and similarly, the vehicle doors can be automatically locked when the occupant with the card travels beyond a certain distance from the vehicle. When the occupant enters the vehicle, the doors can again automatically lock either through logic or through a current system wherein doors automatically lock when the vehicle is placed in gear. An occupant with such a card would also not need to have an ignition key. The vehicle would recognize that the SAW-based card was inside vehicle and then permit the vehicle to be started by issuing an oral command if a voice recognition system is present or by depressing a button, for example, without the need for an ignition key.

SAW sensors operating in the wireless mode can also be used to sense for ice on the windshield or other exterior surfaces of the vehicle, condensation on the inside of the windshield or other interior surfaces, rain sensing, heat-load sensing and many other automotive sensing functions. They can also be used to sense outside environmental properties and states including temperature, humidity, etc.

SAW sensors can be economically used to measure the temperature and humidity at numerous places both inside and outside of a vehicle. When used to measure humidity inside the vehicle, a source of water vapor can be activated to increase the humidity when desirable and the air conditioning system can be activated to reduce the humidity when necessary or desirable. Temperature and humidity measurements outside of the vehicle can be an indication of potential road icing problems. Such information can be used to provide early warning to a driver of potentially dangerous conditions. Although the invention described herein is related to land vehicles, many of these advances are equally applicable to other vehicles such as airplanes and even, in some cases, homes and buildings. The invention disclosed herein, therefore, is not limited to automobiles or other land vehicles.

Road condition sensing is another field in which SAW technology can be applied and the invention encompasses several embodiments of SAW road condition sensors.

The temperature and moisture content of the surface of a roadway are critical parameters in determining the icing state of the roadway. Attempts have been made to measure the coefficient of friction between a tire and the roadway by placing strain gages in the tire tread. Such strain gages are ideal for the application of SAW technology especially since they can be interrogated wirelessly from a distance and they require no power for operation. As discussed herein, SAW accelerometers can also perform this function. Measurement of the friction coefficient, however, is not predictive and the vehicle operator is only able to ascertain the condition after the fact. Boosted SAW or RFID based transducers have the capability of being interrogated as much as 100 feet from the interrogator. Therefore, judicious placement of low-cost powerless SAW or RFID temperature and humidity sensors in and/or on the roadway at critical positions can provide an advance warning to vehicle operators that the road ahead is slippery. Such devices are very inexpensive and therefore could be placed at frequent intervals along a highway.

An infrared sensor that looks down the highway in front of the vehicle can actually measure the road temperature prior to the vehicle traveling on that part of the roadway. This system also would not give sufficient warning if the operator waited for the occurrence of a frozen roadway. The probability of the roadway becoming frozen, on the other hand, can be predicted long before it occurs, in most cases, by watching the trend in the temperature. Once vehicle-to-vehicle communications are common, roadway icing conditions can be communicated between vehicles.

Some lateral control of the vehicle can also be obtained from SAW transducers or electronic RFID tags placed down the center of the lane, either above the vehicles and/or in the roadway, for example. A vehicle having two receiving antennas, for example, approaching such devices, through triangulation or direct proportion, is able to determine the lateral location of the vehicle relative to these SAW devices. If the vehicle also has an accurate map of the roadway, the identification number associated with each such device can be used to obtain highly accurate longitudinal position determinations. Ultimately, the SAW devices can be placed on structures beside the road and perhaps on every mile or tenth of a mile marker. If three antennas are used, as discussed herein, the distances from the vehicle to the SAW device can be determined. These SAW devices can be powered in order to stay below current FCC power transmission limits. Such power can be supplied by a photocell, energy harvesting where applicable, by a battery or power connection.

Electronic RFID tags are also suitable for lateral and longitudinal positioning purposes, however, the range available for current electronic RFID systems can be less than that of SAW-based systems unless either are powered. On the other hand, as disclosed in U.S. Pat. No. 6,748,797, the time-of-flight of the RFID system can be used to determine the distance from the vehicle to the RFID tag. Because of the inherent delay in the SAW devices and its variation with temperature, accurate distance measurement is probably not practical based on time-of-flight but somewhat less accurate distance measurements based on relative time-of-arrival can be made. Even if the exact delay imposed by the SAW device was accurately known at one temperature, such devices are usually reasonably sensitive to changes in temperature, hence they make good temperature sensors, and thus the accuracy of the delay in the SAW device is more difficult to maintain. An interesting variation of an electronic RFID that is particularly applicable to this and other applications of this invention is described in A. Pohl, L. Reindl, "New passive sensors", Proc. 16th IEEE Instrumentation and Measurement Technology Conf., IMTC/99, 1999, pp. 1251-1255.

Many SAW devices are based on lithium niobate or similar strong piezoelectric materials. Such materials have high thermal expansion coefficients. An alternate material is quartz that has a very low thermal expansion coefficient. However, its piezoelectric properties are inferior to lithium niobate. One solution to this problem is to use lithium niobate as the coupling system between the antenna and the material or substrate upon which the surface acoustic wave travels. In this manner, the advantages of a low thermal expansion coefficient material can be obtained while using the lithium niobate for its strong piezoelectric properties. Other useful materials such as Langasite™ have properties that are intermediate between lithium niobate and quartz.

The use of SAW tags as an accurate precise positioning system as described above would be applicable for accurate vehicle location, as discussed in U.S. Pat. No. 6,370,475, for lanes in tunnels, for example, or other cases where loss of satellite lock, and thus the primary vehicle location system, is common.

The various technologies discussed above can be used in combination. The electronic RFID tag can be incorporated into a SAW tag providing a single device that provides both a quick reflection of the radio frequency waves as well as a re-transmission at a later time. This marriage of the two technologies permits the strengths of each technology to be exploited in the same device. For most of the applications described herein, the cost of mounting such a tag in a vehicle or on the roadway far exceeds the cost of the tag itself. Therefore, combining the two technologies does not significantly affect the cost of implementing tags onto vehicles or roadways or side highway structures.

A variation of this design is to use an RF circuit such as in an RFID to serve as an energy source. One design could be for the RFID to operate with directional antennas at a relatively high frequency such as 2.4 GHz. This can be primarily used to charge a capacitor to provide the energy for boosting the signal from the SAW sensor using circuitry such as a circulator discussed below. The SAW sensor can operate at a lower frequency, such as 400 MHz, permitting it to not interfere with the energy transfer to the RF circuit and also permit the signal to travel better to the receiver since it will be difficult to align the antenna at all times with the interrogator. Also, by monitoring the reception of the RF signal, the angular position of the tire can be determined and the SAW circuit designed so that it only transmits when the antennas are aligned or when the vehicle is stationary. Many other opportunities now present themselves with the RF circuit operating at a different frequency from the SAW circuit which will now be obvious to one skilled in the art.

An alternate method to the electronic RFID tag is to simply use a radar or lidar reflector and measure the time-of-flight to the reflector and back. The reflector can even be made of a series of reflecting surfaces displaced from each other to achieve some simple coding. It should be understood that RFID antennas can be similarly configured. An improvement would be to polarize the radiation and use a reflector that rotates the polarization angle allowing the reflector to be more easily found among other reflecting objects.

Figure 11:
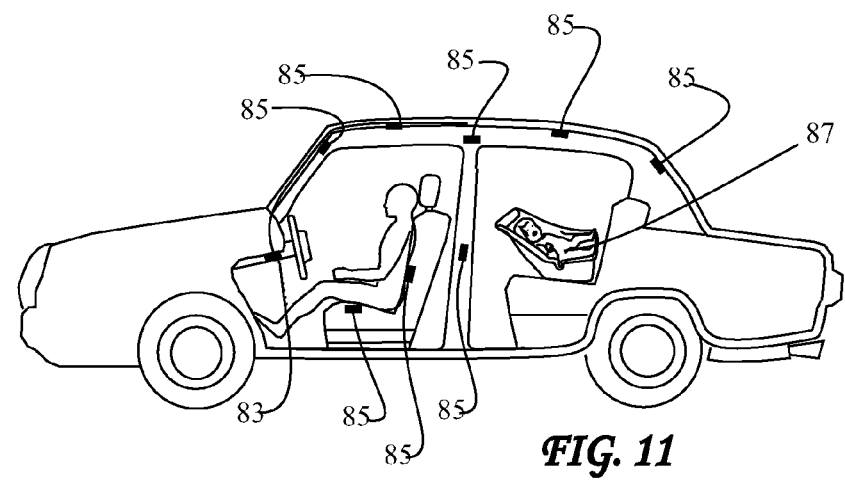
FIG. 11 is a cutaway view of a vehicle showing possible mounting locations for vehicle interior temperature, humidity, carbon dioxide, carbon monoxide, alcohol or other chemical or physical property measuring sensors.

FIG. 11 illustrates a vehicle passenger compartment, and the engine compartment, with multiple SAW or RFID temperature sensors 85. SAW temperature sensors can be distributed throughout the passenger compartment, such as on the A-pillar, on the B-pillar, on the steering wheel, on the seat, on the ceiling, on the headliner, and on the windshield, rear and side windows and generally in the engine compartment.

These sensors, which can be independently coded with different IDs and/or different delays, can provide an accurate measurement of the temperature distribution within the vehicle interior. RFID switches can also be used to isolate one device from another. Such a system can be used to tailor the heating and air conditioning system based on the temperature at a particular location in the passenger compartment. If this system is augmented with occupant sensors, then the temperature can be controlled based on seat occupancy and the temperature at that location. If the occupant sensor system is based on ultrasonics, then the temperature measurement system can be used to correct the ultrasonic occupant sensor system for the speed of sound within the passenger compartment. Without such a correction, the error in the sensing system can be as large as about 20 percent.

The SAW temperature sensors 85 provide the temperature at their mounting location to a processor unit 83 via an interrogator with the processor unit 83 including appropriate control algorithms for controlling the heating and air conditioning system based on the detected temperatures. The processor unit 83 can control, e.g., which vents in the vehicle are open and closed, the flow rate through vents and the temperature of air passing through the vents. In general, the processor unit 83 can control whatever adjustable components are present or form part of the heating and air conditioning system.

All of the elements of the system which adjusts or controls the vehicle components in any of the embodiments described herein, i.e., the sensors, processing unit and reactive system which is controlled by the processing unit based on the data sensed by the sensors, can be arranged within the vehicle. They could be fixed to the frame of the vehicle, and/or arranged in an interior defined by the frame, with the sensor assemblies (the sensor and wireless transmission component associated therewith) fixed relative to the processor unit or receiver which contains the antenna capable of receiving the signals being transmitted wirelessly from the wireless transmission component of the sensor assemblies. In some embodiments, the sensor assemblies are arranged on parts of the vehicle which are not fixed to the frame or fixed relative to the processor unit or receiver, such as on the tires, but in other embodiments, the sensor assemblies are arranged only on parts fixed to the frame. This fixed relationship between the sensor assemblies and the receiver(s) associated with the processing unit allows for proper positioning of the receivers to communicate with all designated sensor assemblies.

In FIG. 11, a child seat 87 is illustrated on the rear vehicle seat. The child seat 87 can be fabricated with one or more RFID tags or SAW tags (not shown). The RFID and SAW tag(s) can be constructed to provide information on the occupancy of the child seat, i.e., whether a child is present, based on the weight, temperature, and/or any other measurable parameter. Also, the mere transmission of waves from the RFID or SAW tag(s) on the child seat 87 would be indicative of the presence of a child seat. The RFID and SAW tag(s) can also be constructed to provide information about the orientation of the child seat 87, i.e., whether it is facing rearward or forward. Such information about the presence and occupancy of the child seat and its orientation can be used in the control of vehicular systems, such as the vehicle airbag system or heating or air conditioning system, especially useful when a child is left in a vehicle. In this case, a processor would control the airbag or HVAC system and would receive information from the RFID and SAW tag(s) via an interrogator.

SAW sensors also have applicability to various other sectors of the vehicle, including the powertrain, chassis, and occupant comfort and convenience. For example, SAW and RFID sensors have applicability to sensors for the powertrain area including oxygen sensors, gear-tooth Hall effect sensors, variable reluctance sensors, digital speed and position sensors, oil condition sensors, rotary position sensors, low pressure sensors, manifold absolute pressure/manifold air temperature (MAP/MAT) sensors, medium pressure sensors, turbo pressure sensors, knock sensors, coolant/fluid temperature sensors, and transmission temperature sensors.

SAW sensors for chassis applications include gear-tooth Hall effect sensors, variable reluctance sensors, digital speed and position sensors, rotary position sensors, non-contact steering position sensors, and digital ABS (anti-lock braking system) sensors. In one implementation, a Hall Effect tire pressure monitor comprises a magnet that rotates with a vehicle wheel and is sensed by a Hall Effect device which is attached to a SAW or RFID device that is wirelessly interrogated. This arrangement eliminates the need to run a wire into each wheel well.

Figure 12:
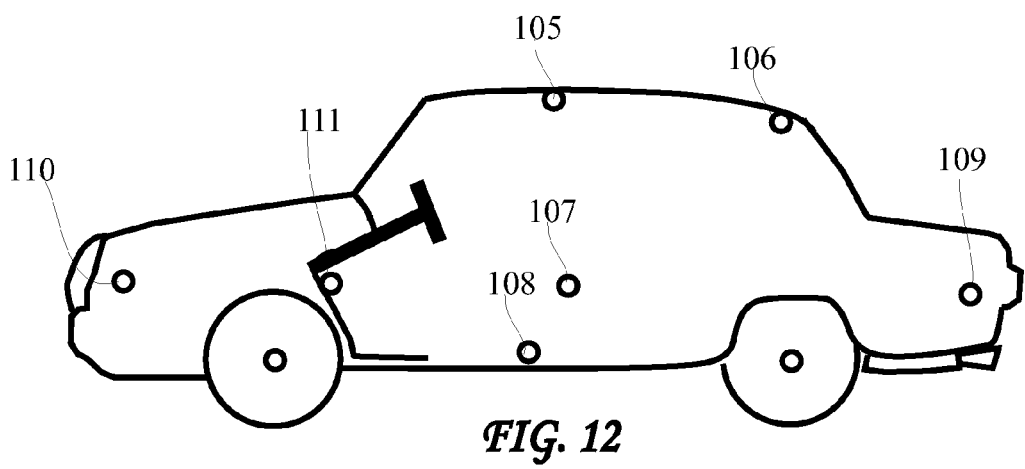
FIG. 12 is a schematic of a vehicle with several accelerometers and/or gyroscopes at preferred locations in the vehicle.

FIG. 12 illustrates the placement of a variety of sensors, primarily accelerometers and/or gyroscopes, which can be used to diagnose the state of the vehicle itself. Sensor 105 can be located in the headliner or attached to the vehicle roof above the side door. Typically, there can be two such sensors one on either side of the vehicle. Sensor 106 is shown in a typical mounting location midway between the sides of the vehicle attached to or near the vehicle roof above the rear window. Sensor 109 is shown in a typical mounting location in the vehicle trunk adjacent the rear of the vehicle. One, two or three such sensors can be used depending on the application. If three such sensors are used, preferably one would be adjacent each side of vehicle and one in the center. Sensor 107 is shown in a typical mounting location in the vehicle door and sensor 108 is shown in a typical mounting location on the sill or floor below the door. Sensor 110, which can be also multiple sensors, is shown in a typical mounting location forward in the crush zone of the vehicle. Finally, sensor 111 can measure the acceleration of the firewall or instrument panel and is located thereon generally midway between the two sides of the vehicle. If three such sensors are used, one would be adjacent each vehicle side and one in the center. An IMU would serve basically the same functions.

In general, sensors 105-111 provide a measurement of the state of the vehicle, such as its velocity, acceleration, angular orientation or temperature, or a state of the location at which the sensor is mounted. Thus, measurements related to the state of the sensor would include measurements of the acceleration of the sensor, measurements of the temperature of the mounting location as well as changes in the state of the sensor and rates of changes of the state of the sensor. As such, any described use or function of the sensors 105-111 above is merely exemplary and is not intended to limit the form of the sensor or its function. Thus, these sensors may or may not be SAW or RFID sensors and may be powered or unpowered and may transmit their information through a wire harness, a safety or other bus or wirelessly.

Each sensor 105-111 may be single axis, double axis or triaxial accelerometers and/or gyroscopes typically of the MEMS type. One or more can be IMUs. These sensors 105-111 can either be wired to the central control module or processor directly wherein they would receive power and transmit information, or they could be connected onto the vehicle bus or, in some cases, using RFID, SAW or similar technology, the sensors can be wireless and would receive their power through RF from one or more interrogators located in the vehicle. In this case, the interrogators can be connected either to the vehicle bus or directly to control module. Alternately, an inductive or capacitive power and/or information transfer system can be used.

Figure 13:
FIG. 13 illustrates a driver with a timed RFID standing with groceries by a closed trunk.
Figure 14:
FIG. 14 illustrates the driver with the timed RFID 5 seconds after the trunk has been opened.

The driver can be provided with a keyless entry device, other RFID tag, smart card or cell phone with an RF transponder that can be powerless in the form of an RFID or similar device, which can also be boosted as described herein. Generally, such keyless entry devices can be considered a portable identification device. The interrogator, or a processing unit associated therewith, determines the proximity of the driver to the vehicle door or other similar object such as a building or house door or vehicle trunk. As shown in FIG. 13, if a driver 118 remains within a certain distance, 1 meter for example, from the door or trunk lid 116, for example, for a certain time period such as 5 seconds, then the door or trunk lid 116 can automatically unlock and ever open in some implementations. The distance and time period can be selected or determined as desired. Thus, as the driver 118 approaches the trunk with his or her arms filled with packages 117 and pauses, the trunk can automatically open (see FIG. 14). Such a system would be especially valuable for older people. This system can also be used for other systems in addition to vehicle doors and trunk lids.

Figure 15:
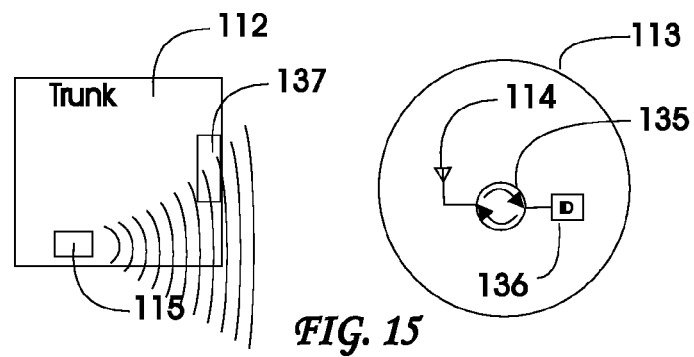
FIG. 15 illustrates a trunk opening arrangement for a vehicle in accordance with the invention.

As shown in FIG. 15, an interrogator 115 is placed on the vehicle, e.g., in the trunk 112 as shown, and transmits waves. When the keyless entry device 113, which contains an antenna 114 and a circuit including a circulator 135 and a memory containing a unique ID code 136, is a set distance from the interrogator 115 for a certain duration of time, the interrogator 115 directs a trunk opening device 137 to open the trunk lid 116. The duration of time is determined from the continuous reception by the interrogator 115 of the ID code 136 from the keyless entry device 113.

Figure 16A:
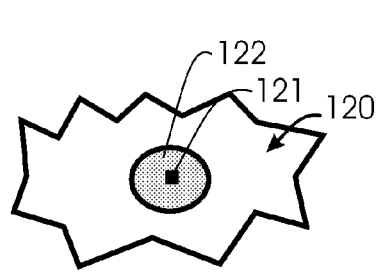
FIG. 16A is a view of a SAW switch sensor for mounting on or within a surface such as a vehicle armrest.
Figure 16B:
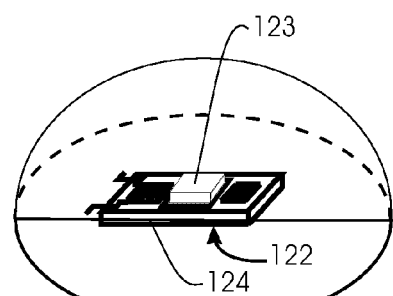
FIG. 16B is a perspective view of the device of FIG. 16A with the force-transmitting member rendered transparent.

A SAW device can also be used as a wireless switch as shown in FIGS. 16A and 16B. FIG. 16A illustrates a surface 120 containing a projection 122 on top of a SAW device 121. Surface material 120 could be, for example, the armrest of an automobile, the steering wheel airbag cover, or any other surface within the passenger compartment of an automobile or elsewhere. Projection 122 will typically be a material capable of transmitting force to the surface of SAW device 121. As shown in FIG. 16B, a projection 123 may be placed on top of the SAW device 124. This projection 123 permits force exerted on the projection 122 to create a pressure on the SAW device 124. This increased pressure changes the time delay or natural frequency of the SAW wave traveling on the surface of material. Alternately, it can affect the magnitude of the returned signal. The projection 123 is typically held slightly out of contact with the surface until forced into contact with it.

Figure 16C:
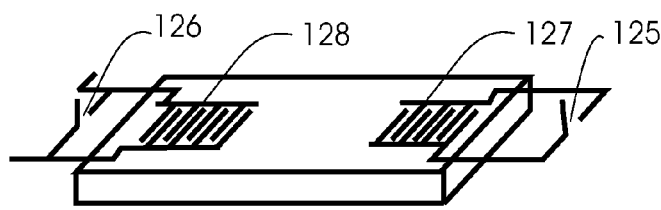
FIG. 16C is a perspective view of an alternate SAW device for use in FIGS. 16A and 16B showing the use of one of two possible switches, one that activates the SAW and the other that suppresses the SAW.

An alternate approach is to place a switch across the IDT 127 as shown in FIG. 16C. If switch 125 is open, then the device will not return a signal to the interrogator. If it is closed, than the IDT 127 will act as a reflector sending a signal back to IDT 128 and thus to the interrogator. Alternately, a switch 126 can be placed across the SAW device. In this case, a switch closure shorts the SAW device and no signal is returned to the interrogator. For the embodiment of FIG. 16C, using switch 126 instead of switch 125, a standard reflector IDT would be used in place of the IDT 127.

Figure 16D:
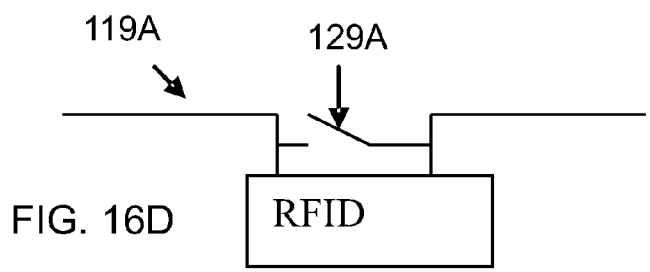
FIG. 16D is a schematic of a RFID controlled by a switch.

FIG. 16D shows an embodiment wherein a radio-frequency identification device (RFID) is controlled by a switch 129A, and may be one of the wireless transmission components of a switch assembly. The switch 129A may be a conventional, mechanical switch such as a push button, toggle and the like. A switch assembly would therefore comprise the RFID, the switch 129A and an antenna 119A which may constitute another wireless transmission component. In this case, when the user presses on an exposed surface of the passenger compartment, he or she would close the switch 129A and thereby short the RFID so that it would be inoperative. That is, the RFID would not respond when interrogated. Instead of a switch, a variable impedance could also be provided which would modify the output of the RFID based on the magnitude of pressure to the exposed surface. Instead of using the switch or variable impedance, another control mechanism for causing variation in the transmission by the wireless transmission components of the switch assembly can be provided. In this embodiment, as well as the other embodiments herein wherein an RFID is provided, the RFID can be either a passive RFID or an active RFID. In the latter case, the RFID is supplied with power from a power source on the vehicle, such as the vehicle's battery, a local battery, photo cell, or a local energy generator or harvester.

FIGS. 16C and 16D are examples of manually activated RFID switch assemblies which could be used in a vehicular component control system to adjust various components based on user action. For example, each switch assembly could control a respective component with a processor unit of the control system being coupled to or included within an interrogator arranged to transmit RF signals having identification data associated with the RFID switch assemblies such that upon transmission of each RF signal, any RFID switch assemblies with matching identification data would be capable of providing responsive signals. In particular, the RFID switch assemblies provide output based on pressure applied by the occupant of the vehicle to an exposed surface and includes an RF transmission component arranged to wirelessly transmit an indication of the application of pressure to the exposed surface. This indication may be the magnitude of the pressure being applied (e.g., via the switch assembly of FIG. 16C) or the absence of a signal (e.g., via the short-circuited RFID of FIG. 16D). Other input devices for use in the same component control system include those described elsewhere herein, for example, an RFID assembly including a sensor and an RFID switch which could receive an RF signal from the same interrogator and upon receipt of a signal containing its identification, enable transmission of a signal from the sensor from which a property being monitored by the sensor is determinable. Another input device is an RFID assembly including a sensor and an RFID switch which is arranged to receive an RF signal from the same interrogator and upon receipt of a signal not containing its identification, disable transmission of an RF signal from the interrogator to the sensor for its excitation, from which sensor a property being monitored by the sensor is determinable.

Figure 16E:
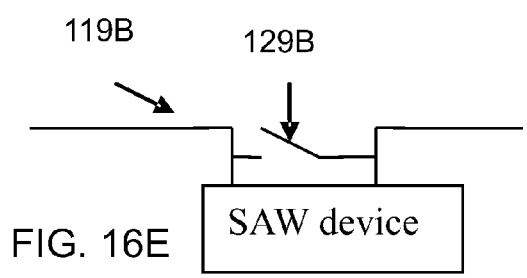
FIG. 16E is a schematic of a SAW device controlled by a switch.
Figure 16F:
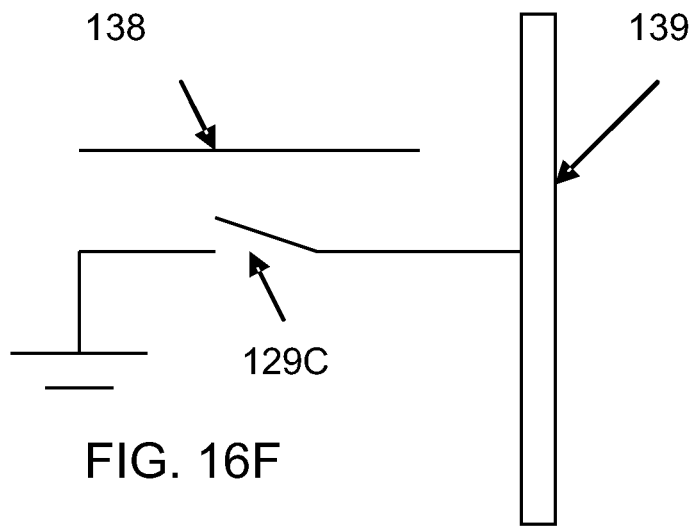
FIG. 16F is a schematic of a backscatter antenna which is controlled by a switch.
Figure 16G:
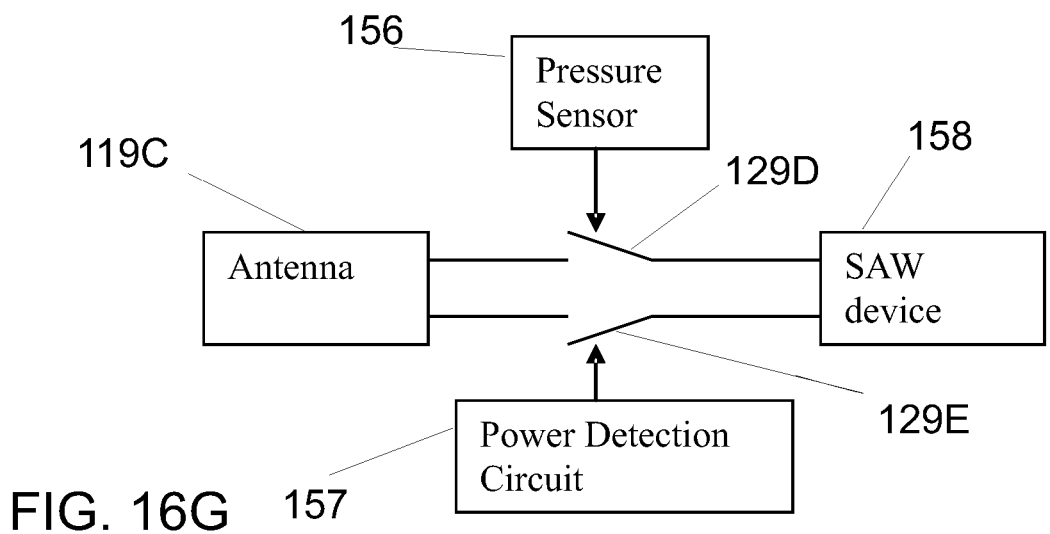
FIG. 16G is a schematic of circuit for a monitoring system in accordance with the invention which has two switches.
Figure 16H:
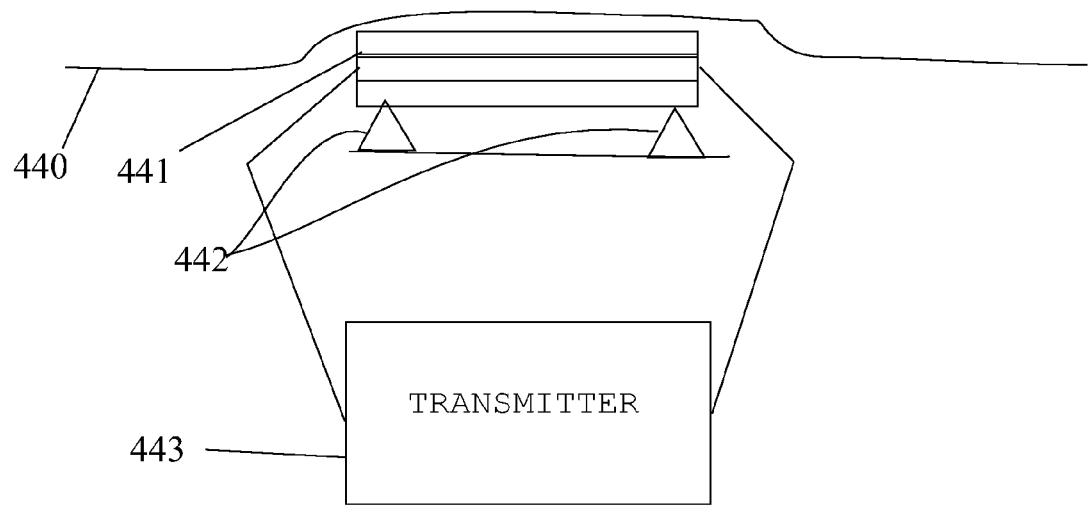
FIG. 16H illustrates one embodiment of a switch whereby activation of the switch provides the energy necessary to power an RFID.

FIG. 16H shows another switch assembly for controlling a component which includes an energy storage and/or transmission component 443 which may comprise an RFID so that when the switch assembly is activated, the RFID 443 is able to respond to an interrogation signal from an interrogator associated with the component control system. The RFID switch assembly includes a piezoelectric energy generator switch 441 underlying an exposed surface 440 of the vehicle and formed by a plurality of sheets of a piezoelectric material, such as polyvinylidene fluoride (PVDF), and generates power upon application of pressure to the exposed surface 440. The generated power is usable to power the transmission component, i.e., the RFID. The stack of PVDF sheets are placed over supports 442 and can include a snap action mechanism, not shown, to provide a snap action switch.

PVDF is a known inexpensive material capable of use in vehicles. PVDF is also usable as a SAW-type device and would be especially applicable where there is external power provided. The presence of available energy could lead to certain advantages of the use of PVDF such as for chemical sensing since it could be much larger than other sensing equivalents, such as lithium Niobate, and therefore more likely to capture the chemical. As an energy generator, PVDF has much more applicability since a number of layers can be stacked thereby multiplying its energy output. The switch shown in FIG. 16H can be made, for example, so that it gets its power from someone snapping the stack of PVDF sheets 441 between supports 442 in a snap action switch. The power generated could send a signal to a receiver or alternatively, it could be used to power the RFID 443 thereby giving an ID transmission relating to the switching action which is indicative of a desired action by the occupant of the vehicle and thus could be used to control an adjustable component.

Such a PVDF switch could be used in those cases where a switching or sensing function covering a broad area is desired. The sensing of the contact of the head with a headrest would be one example. In this case, the stack of PVDF sheets is arranged in the headrest below the covering of the headrest and when an occupant rests his or her head against the headrest, the PVDF sheets are compressed thereby generating power for an RFID to respond to an interrogator signal. The return signal to the interrogator would therefore be indicative of the presence of an occupant, or other object, resting against the headrest. Of course, many other arrangements will be obvious to one skilled in the art.

FIG. 16E shows an embodiment wherein a surface-acoustic-wave (SAW) device is controlled by a switch 129B, and may be one of the wireless transmission components of a switch assembly. The switch 129B may be a conventional, mechanical switch such as a push button, toggle and the like. A switch assembly would therefore comprise the SAW device, the switch 129B and an antenna 119B which may constitute another a wireless transmission component. In this case, when the user presses on an exposed surface of the passenger compartment, he or she would close the switch 129B and thereby prevent the SAW device from receiving a signal so that it would be inoperative. Instead of a switch, a variable impedance could also be provided which would modify the output of the SAW device based on the magnitude of pressure to the exposed surface. Instead of using the switch or variable impedance, another control mechanism for causing variation in the transmission buy the wireless transmission components of the switch assembly can be provided. In this embodiment, as well as the other embodiments herein wherein a SAW device is provided, the SAW device can be either a passive SAW device or an active SAW device. In the latter case, the SAW device is supplied with power from a power source on the vehicle, such as the vehicle's battery, a local battery or a local energy generator or harvester.

A variable impedance is used as the control mechanism for situations when variations in the operation of a vehicular component are desired. For example, if a light is capable of being dimmed, then the variable impedance would be useful to control the dimming of the light. It is also useful to control adjustment of the volume of a sound system in the vehicle, as well as other analogue functions.

Referring now to FIG. 16F, another embodiment of the invention using a control mechanism, i.e., a switch or variable impedance, is an antenna 139 capable of reflecting an interrogating signal, and even which slightly modifies the interrogating signal (reflection from such an antenna being termed backscatter). The modification to the interrogating signal can be correlated to the desired manner for controlling the vehicular component. In this case, a lead is connected to an intermediate location on the antenna 139, e.g., the middle of the antenna 139, and a switch or variable impedance (a switch 129C is shown) is placed between the lead and ground. In the embodiment having a switch 129C, when the switch 129C is open, the antenna 139 will reflect at a particular frequency based on its length (for a simple dipole antenna). When the switch 129C is closed by the application of pressure to the exposed surface 138 of the passenger compartment, the antenna 139 will short and thereby effectively reduce the length of the antenna 139 and alter the resonant frequency of the antenna 139. A lead placed at the middle of the antenna 139 would, when connected to a closed switch 129C leading to ground, cause the resonant frequency to approximately double. In the embodiment having variable impedance, the antenna would be provided with a variable effect depending on the pressure exerted on the exposed surface or otherwise controlling the variable impedance.

Referring now to FIG. 16G, in another embodiment of a SAW sensor assembly in accordance with the invention, the circuit of the SAW sensor assembly has both an active mode and a passive mode depending on the presence of sufficient power in the energy storage device and whether the substrate to which the SAW sensor assembly is associated with is moving and thereby generates energy (for example, the energy may be generated using the power generating system described with reference to FIG. 9 herein and FIGS. 36, 36A and 98 of U.S. patent application Ser. No. 11/681,834 incorporated by reference herein). That is, the SAW sensor assembly circuit is provided with a passive mode, which is used when power is not provided to the SAW device 158 by either an energy harvester or energy generating system and the substrate (tire) is not moving, and an active mode when power is provided or available to the SAW device 158, e.g., provided by an energy harvester or energy generating system upon rotation of the tire or from an energy storage device. In the active mode (when the tire is rotating or there is sufficient power in the energy storage device to power the SAW device 158), a power detection circuit 157 detects power and closes a switch 129E thereby connecting the SAW device 158 to the antenna 119C. Power detection circuit 157 may be integrated into the SAW sensor assembly circuit so that whenever there is sufficient power being generated or available, the switch 129E is automatically closed. On the other hand, when energy for the SAW device 158 is not provided by an energy storage device and the tire is not rotating, switch 129E is open so as to avoid providing unnecessary signals from the SAW device 158 to the interrogator via the antenna 119C, the interrogator being used to obtain the signals from the SAW device 158 and process them into a meaningful reading of whatever property or properties is/are being monitored by the SAW device 158. However, since it is desirable to provide signals from the SAW device 158 for certain conditions of the property being monitored by the SAW device 158, e.g., the property is below a threshold, a sensor 156 is provided and controls a second switch 129D between the antenna 119C and the SAW device 158. Sensor 156 is designed to close the switch when one or more conditions relating to the property are satisfied to thereby enable a transmission from the antenna 119C to the SAW device 158 and a modified signal to be provided from the SAW device 158 to the antenna 119C for transmission to the interrogator.

For example, if sensor 156 is a pressure sensor and SAW assembly is being used to monitor tire pressure, then when the pressure is below a threshold as detected by sensor 156, switch 129D is closed and thereby allows the SAW device 158 to provide a modified signal. Sensor 156 should ideally be a sensor that does not require power (or requires minimal power) and can continually monitor the property, for example, a pressure sensing diaphragm could be used to and positioned relative to the switch 129D so that when the pressure is below a threshold, the diaphragm moves and causes closure of the switch 129D. Indeed, the switch 129D could even be attached to such a pressure sensing diaphragm. In this case, when the pressure is at or above the threshold, the pressure sensing diaphragm does not close switch 129D thereby conserving power. Switch 129D would therefore be in an open position whenever the pressure was at or above the design threshold. Instead of a fixed threshold, a variable threshold can be used based on any number of factors. Also, a temperature sensor could be used to close a switch if temperature is being monitored, e.g., a diaphragm which expands with temperature could be attached to the switch 129D or another thermal or temperature switch used in the circuit. Any other type of sensor which changes its state or condition and can cause closure of a switch based on a predetermined threshold, or switch which is activated based on a sensed property of the tire, could also be used in the invention.

The minimal transmission from the SAW device 158 is necessary in particular in a case where only one tire has a low pressure. One reason for this is because it is difficult to separate transmissions from more than one tire when operating in the passive mode.

Any of the disclosed applications can be interrogated by the central interrogator of this invention and can either be powered or operated powerlessly as described in general above. Block diagrams of three interrogators suitable for use in this invention are illustrated in FIGS. 19A-19C of the '834 application. FIG. 19A illustrates a super heterodyne circuit and FIG. 19B illustrates a dual super heterodyne circuit. FIG. 19C operates as follows. During the burst time two frequencies, F1 and F1+F2, are sent by the transmitter after being generated by mixing using oscillator Osc. The two frequencies are needed by the SAW transducer where they are mixed yielding F2 which is modulated by the SAW and contains the information. Frequency (F1+F2) is sent only during the burst time while frequency F1 remains on until the signal F2 returns from the SAW. This signal is used for mixing. The signal returned from the SAW transducer to the interrogator is F1+F2 where F2 has been modulated by the SAW transducer. It is expected that the mixing operations will result in about 12 db loss in signal strength.

As discussed elsewhere herein, the particular tire that is sending a signal can be determined if multiple antennas, such as three, each receive the signal. For a 500 MHz signal, for example, the wave length is about 60 cm. If the distance from a tire transmitter to each of three antennas is on the order of one meter, then the relative distance from each antenna to the transmitter can be determined to within a few centimeters and thus the location of the transmitter can be found by triangulation. If that location is not a possible location for a tire transmitter, then the data can be ignored thus solving the problem of a transmitter from an adjacent vehicle being read by the wrong vehicle interrogator. This will be discussed below with regard to solving the problem of a truck having 18 tires that all need to be monitored. Note also, each antenna can have associated with it some simple circuitry that permits it to receive a signal, amplify it, change its frequency and retransmit it either through a wire of through the air to the interrogator thus eliminating the need for long and expensive coax cables.

U.S. Pat. No. 6,622,567 describes a peak strain RFID technology based device with the novelty being the use of a mechanical device that records the peak strain experienced by the device. Like the system of the invention herein, the system does not require a battery and receives its power from the RFID circuit. The invention described herein includes use of RFID-based sensors either in a peak strain mode or in a preferred continuous strain mode. This invention is not limited to measuring strain as SAW and RFID based sensors can be used for measuring many other parameters including chemical vapor concentration, temperature, acceleration, angular velocity etc.

One aspect of at least one of the inventions disclosed herein is the use of an interrogator to wirelessly interrogate multiple sensing devices thereby reducing the cost of the system since such sensors are in general inexpensive compared to the interrogator. The sensing devices are preferably based on SAW and/or RFID technologies although other technologies are applicable.

Antenna Considerations

Antennas are a very important aspect to SAW and RFID wireless devices such as can be used in tire monitors, seat monitors, weight sensors, child seat monitors, fluid level sensors and similar devices or sensors which monitor, detect, measure, determine or derive physical properties or characteristics of a component in or on the vehicle or of an area near the vehicle. In many cases, the location of a SAW or RFID device needs to be determined such as when a device is used to locate the position of a movable item in or on a vehicle such as a seat. In other cases, the particular device from a plurality of similar devices, such as a tire pressure and/or temperature monitor that is reporting, needs to be identified. Thus, a combination of antennas can be used and the time or arrival, angle of arrival, multipath signature or similar method used to identify the reporting device. One preferred method is derived from the theory of smart antennas whereby the signals from multiple antennas are combined to improve the signal-to-noise ratio of the incoming or outgoing signal in the presence of multipath effects, for example.

Additionally, since the signal level from a SAW or RFID device is frequently low, various techniques can be used to improve the signal-to-noise ratio as described below. Finally, at the frequencies frequently used such as 433 MHz, the antennas can become large and methods are needed to reduce their size. These and other antenna considerations that can be used to improve the operation of SAW, RFID and similar wireless devices are described below.

Tire Information Determination

Figure 17:
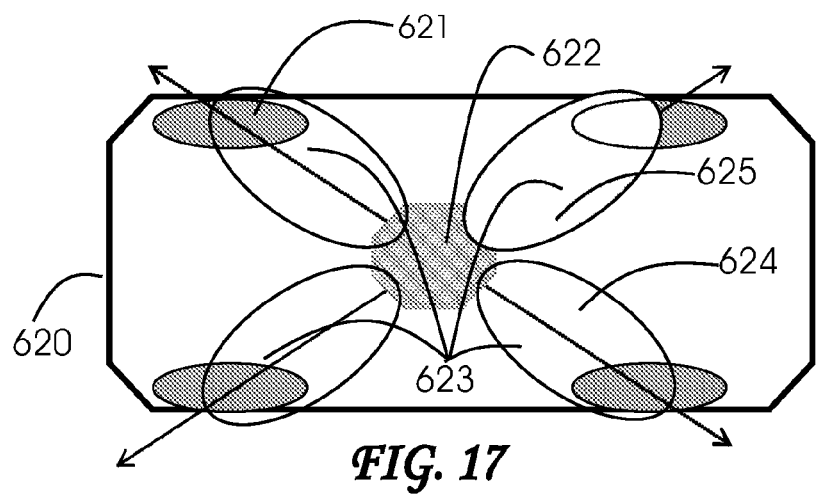
FIG. 17 is a top view of a system for obtaining information about a vehicle or a component therein, specifically information about the tires, such as pressure and/or temperature thereof.
Figure 18:
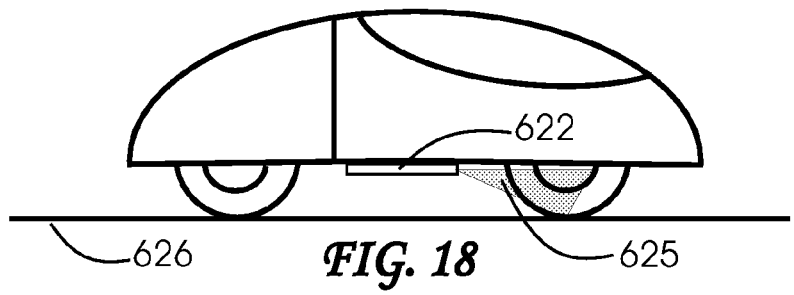
FIG. 18 is a side view of the vehicle shown in FIG. 17.

One method of maintaining a single central antenna assembly while interrogating all four tires on a conventional automobile, is illustrated in FIGS. 17 and 18. The same technique may be used in the invention when interrogating multiple components, RFID devices or RFID-equipped objects as disclosed herein.

An additional antenna can be located near the spare tire, which is not shown. It should be noted that the system described below is equally applicable for vehicles with more than four tires such as trucks.

A vehicle body is illustrated as 620 having four tires 621 and a centrally mounted four element, switchable directional antenna array 622. The four beams are shown schematically as 623 with an inactivated beam as 624 and the activated beam as 625. The road surface 626 supports the vehicle. An electronic control circuit, not shown, which may reside inside the antenna array housing 622 or elsewhere, alternately switches each of the four antennas of the array 622 which then sequentially, or in some other pattern, send RF signals to each of the four tires 621 and wait for the response from the RFID, SAW or similar tire pressure, temperature, ID, acceleration and/or other property monitor arranged in connection with or associated with the tire 621. This represents a time domain multiple access system.

The interrogator makes sequential interrogation of wheels as follows:

Stage 1. Interrogator radiates 8 RF pulses via the first RF port directed to the 1st wheel.
Pulse duration is about 0.8 µs.
Pulse repetition period is about 40 µs.
Pulse amplitude is about 8 V (peak to peak)
Carrier frequency is about 426.00 MHz.
(Between adjacent pulses, the receiver opens its input and receives four-pulses echoes from the transponder located in the first wheel).
Then, during a time of about 8 ms, the internal micro controller processes and stores received data.
Total duration of this stage is 32 µs+8 ms=8.032 ms.
Stage 2,3,4. Interrogator repeats operations as on stage 1 for $2^{nd}$, $3^{rd}$ and $4^{th}$ wheel sequentially via appropriate RF ports.
Stage 5. Interrogator stops radiating RF pulses and transfers data stored during stages 1-4 to the external PC for final processing and displaying. Then it returns to stage 1. The time interval for data transfer equals about 35 ms.
Some notes relative to FCC Regulations:
The total duration of interrogation cycle of four wheels is 8.032 ms*4+35 ms=67.12 ms.

Figure 20:
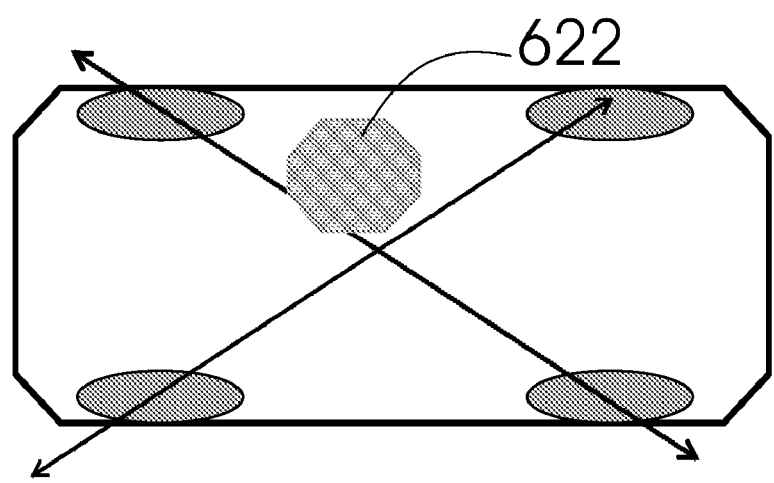
FIG. 20 is a top view of an alternate system for obtaining information about the tires of a vehicle.

During this time, interrogator radiates 8*4=32 pulses, each of 0.8 µs duration.
Thus, average period of pulse repetition is 67.12 ms/32=2.09 ms=2090 µs Assuming that duration of the interrogation pulse is 0.8 µs as mentioned, an average repetition rate is obtained 0.8 µs/2090 µs=0.38*10$^{-3}$ Finally, the radiated pulse power is $Pp=(4V)^2/(2*50\ Ohm)=0.16 W$ and the average radiated power is $Pave=0.16*0.38*10^{-3}=0.42*10^{-3} W$, or 0.42 mW In another application, the antennas of the array 622 transmit the RF signals simultaneously and space the returns through the use of a delay line in the circuitry from each antenna so that each return is spaced in time in a known manner without requiring that the antennas be switched. Another method is to offset the antenna array, as illustrated in FIG. 20, so that the returns naturally are spaced in time due to the different distances from the tires 621 to the antennas of the array 622. In this case, each signal will return with a different phase and can be separated by this difference in phase using methods known to those in the art.

In another application, not shown, two wide angle antennas can be used such that each receives any four signals but each antenna receives each signal at a slightly different time and different amplitude permitting each signal to be separated by looking at the return from both antennas since, each signal will be received differently based on its angle of arrival.

Additionally, each SAW or RFID device can be designed to operate on a slightly different frequency and the antennas of the array 622 can be designed to send a chirp signal and the returned signals will then be separated in frequency, permitting the four signals to be separated. Alternately, the four antennas of the array 622 can each transmit an identification signal to permit separation. This identification can be a numerical number or the length of the SAW substrate, for example, can be random so that each property monitor has a slightly different delay built in which permits signal separation. The identification number can be easily achieved in RFID systems and, with some difficulty and added expense, in SAW systems. Other methods of separating the signals from each of the tires 621 will now be apparent to those skilled in the art. One preferred method in particular will be discussed below and makes use of an RFID switch.

There are two parameters of SAW system, which has led to the choice of a four echo pulse system:
ITU frequency rules require that the radiated spectrum width be reduced to:
$\Delta\phi \leq 1.75$ MHz (in ISM band, F=433.92 MHz);
The range of temperature measurement should be from −40 F up to +260 F.
Therefore, burst (request) pulse duration should be not less than 0.6 microseconds.

$\tau_{bur.}=1/\Delta\phi \geq 0.6$ µs

This burst pulse travels to a SAW sensor and then it is returned by the SAW to the interrogator. The sensor's antenna, interdigital transducer (IDT), reflector and the interrogator are subsystems with a restricted frequency pass band. Therefore, an efficient pass band of all the subsystems $H(f)_\Sigma$ will be defined as product of the partial frequency characteristic of all components:

$H(f)=H(f)_1*H(f)_2*\ldots H(f)i$

On the other hand, the frequency $H(\phi)_\Sigma$ and a time $I(\tau)_\Sigma$ response of any system are interlinked to each other by Fourier's transform. Therefore, the shape and duration ($\tau_{echo\ puls}$) an echo signal on input to the quadrature demodulator will differ from an interrogation pulse.

In other words, duration an echo signal on input to the quadrature demodulator is defined as mathematical convolution of a burst signal $\tau_{bur.}$ and the total impulse response of the system $I(\tau)_\Sigma$.

$\tau_{echo}=\tau_{bur.} \circledast I(\tau)_\Sigma$

The task is to determine maximum pulse duration on input to the quadrature demodulator $\tau_{echo}$ under a burst pulse duration $\tau_{bur}$ of 0.6 microseconds. It is necessary to consider in time all echo signals. In addition, it is necessary to take into account the following:
each subsequent echo signal should not begin earlier than the completion of the previous echo pulse. Otherwise, the signals will interfere with each other, and measurement will not be correct;
for normal operation of available microcircuits, it is necessary that the signal has a flat apex with a duration not less than 0.25 microseconds ($\tau_{meg}$=t3−t2). The signal's phase will be constant only on this segment;
the total sensor's pass band (considering double transit IDT and its antenna as a reflector) constitutes 10 MHz;
the total pass band of the interrogator constitutes no more than 4 MHz.

Conducting the corresponding calculations yields the determination that duration of impulse front (t2−t1=t4−t3) constitutes about 0.35 microseconds. Therefore, total duration of one echo pulse is not less than:

$\tau_{echo.}=(t2-t1)+\tau_{meg.}+(t4-t3)=0.35+0.25+0.35=0.95$ µs

Hence, the arrival time of each following echo pulse should be not earlier than 1.0 microsecond. This conclusion is very important.

In Appendix 1 of the '139 application, it is shown that for correct temperature measuring in the required band it is necessary to meet the following conditions:

$(T2-T1)=1/(72*10-6\ 1/°\ K.*(125°\ C.-(-40°\ C.))$
$*434.92*106)=194$ ns

This condition is outrageous. If to execute ITU frequency rules, the band of correct temperature measuring will be reduced five times:

$(125°\ C.-(-40°\ C.)*194\ ns)/1000\ ns=32°\ C.=58°$ F.

This is the main reason that it is necessary to add the fourth echo pulse in a sensor. The principle purpose of the fourth echo pulse is to make the temperature measurement unambiguous in a wide interval of temperatures when a longer interrogation pulse is used (the respective time intervals between the sensor's echo pulses are also longer). A mathematical model of the processing of a four-pulse echo that explains these statements is presented in Appendix 3 of the '139 application.

The duration of the interrogation pulse and the time positions of the four pulses are calculated as:

$$T1 > 4*T_{echo} = 4.00 \text{ μs}$$

$$T2 = T1 + \tau_{echo} = 5.00 \text{ μs}$$

$$T3 = T2 + \tau_{echo} = 6.00 \text{ μs}$$

$$T4 = T3 + \tau_{echo} + 0.08 \text{ μs} = 7.08 \text{ μs}$$

Figure 25:
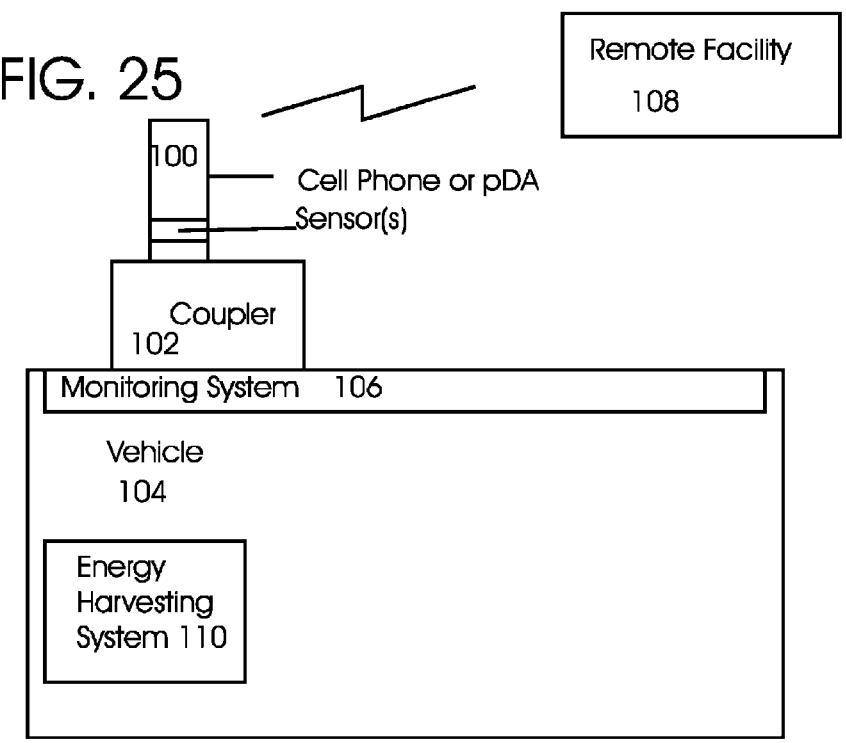
FIG. 25 is a schematic showing the use of a cell phone or PDA for monitoring a vehicle in accordance with the invention.
Figure 26:
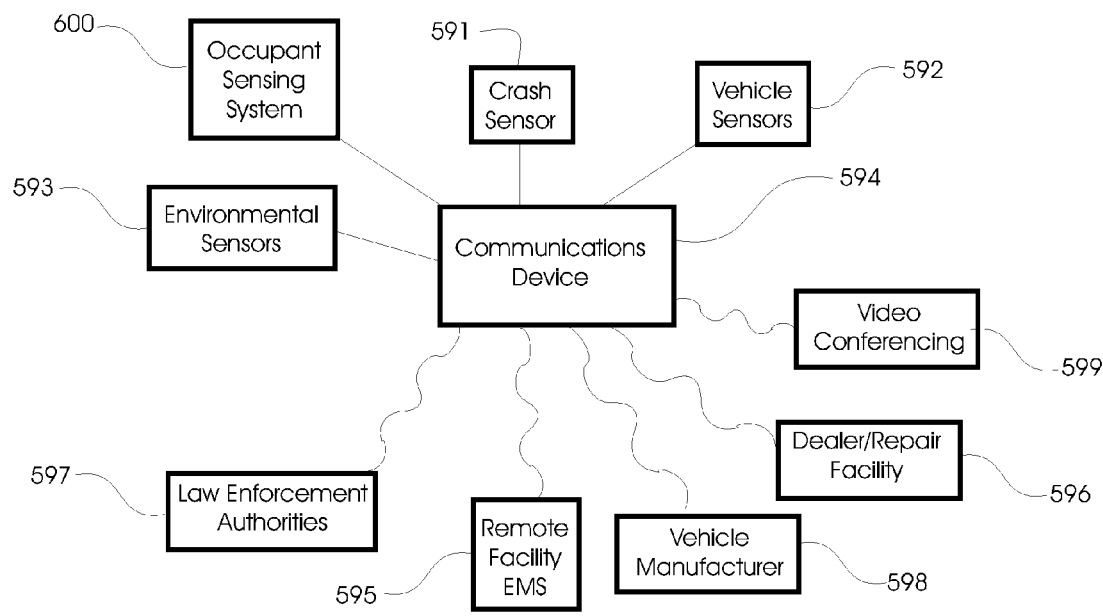
FIG. 26 is a schematic view of overall telematics system in accordance with the invention.

The sensor's design with four pulses is exhibited in FIGS. 25 and 26 of the =834 application.

| | |
|---|---|
| $\tau_{bur}$ | 0.60 μs |
| T1 | 4.00 μs |
| T2 | 5.00 μs |
| T3 | 6.00 μs |
| T4 | 7.08 μs |

The reason that such a design was selected is that this design provides three important conditions:

1. It has the minimum RF signal propagation loss. Both SAW waves use for measuring (which are propagated to the left and to the right from IDT).

2. All parasitic echo signals (signals of multiple transits) are eliminated after the fourth pulse. For example, the pulse is excited by the IDT, then it is reflected from a reflector No 1 and returns to the IDT. The pulse for the second time is re-emitted and it passes the second time on the same trajectory. The total time delay will be 8.0 microseconds in this case.

3. It has the minimum length.

Although the discussion herein concerns the determination of tire information, the same system can be used to determine the location of seats, the location of child seats when equipped with sensors, information about the presence of object or chemicals in vehicular compartments and the like.

Smart Antennas

Some of the shortcomings in today's wireless products can be overcome by using smart antenna technology. A smart antenna is a multi-element antenna that significantly improves reception by intelligently combining the signals received at each antenna element and adjusting the antenna characteristics to optimize performance as the transmitter or receiver moves and the environment changes.

Smart antennas can suppress interfering signals, combat signal fading and increase signal range thereby increasing the performance and capacity of wireless systems.

A method of separating signals from multiple tires, for example, is to use a smart antenna such as that manufactured by Motia. This particular Motia device is designed to operate at 433 MHz and to mitigate multipath signals at that frequency. The signals returning to the antennas from tires, for example, contain some multipath effects that, especially if the antennas are offset somewhat from the vehicle center, are different for each wheel. Since the adaptive formula will differ for each wheel, the signals can be separated (see "enhancing 802.11 WLANs through Smart Antennas", January 2004 available at motia.com). The following is taken from that paper.

"Antenna arrays can provide gain, combat multipath fading, and suppress interfering signals, thereby increasing both the performance and capacity of wireless systems. Smart antennas have been implemented in a wide variety of wireless systems, where they have been demonstrated to provide a large performance improvement. However, the various types of spatial processing techniques have different advantages and disadvantages in each type of system."

"This strategy permits the seamless integration of smart antenna technology with today's legacy WLAN chipset architecture. Since the 802.11 system uses time division duplexing (the same frequency is used for transmit and receive), smart antennas can be used for both transmit and receive, providing a gain on both uplink and downlink, using smart antennas on either the client or access point alone. Results show a 13 dB gain with a four element smart antenna over a single antenna system with the smart antenna on one side only, and an 18 dB gain with the smart antenna on both the client and access point. Thus, this "plug-and-play" adaptive array technology can provide greater range, average data rate increases per user, and better overall coverage.

"In the multibeam or phased array antenna, a beamformer forms several narrow beams, and a beam selector chooses the beam for reception that has the largest signal power. In the adaptive array, the signal is received by several antenna elements, each with similar antenna patterns, and the received signals are weighted and combined to form the output signal. The multibeam antenna is simpler to implement as the beamformer is fixed, with the beam selection only needed every few seconds for user movement, while the adaptive array must calculate the complex beamforming weights at least an order of magnitude faster than the fading rate, which can be several Hertz for pedestrian users."

"Finally, there is pattern diversity, the use of antenna elements with different patterns. The combination of these types of diversity permits the use of a large number of antennas even in a small form factor, such as a PCMCIA card or handset, with near ideal performance."

Through its adaptive beamforming technology, Motia has developed cost-effective smart antenna appliqués that vastly improve wireless performance in a wide variety of wireless applications including Wi-Fi that can be incorporated into wireless systems without major modifications to existing products. Although the Motia chipset has been applied to several communication applications, it has yet to be applied to all of the monitoring applications as disclosed in the current assignee's patents and pending patent applications, and in particular vehicular monitoring applications such as tire monitoring.

The smart antenna works by determining a set of factors or weights that are used to operate on the magnitude and/or phase of the signals from each antenna before the signals are combined. However, since the geometry of a vehicle tire relative to the centralized antenna array does not change much as the tire rotates, but is different for each wheel, the weights themselves contain the information as to which tire signal is being received. In fact, the weights can be chosen to optimize signal transmission from a particular tire thus providing a method of selectively interrogating each tire at the maximum antenna gain.

Distributed Load Monopole

Antenna developments in the physics department at the University of Rhode Island have resulted in a new antenna technology. The antennas developed called DLM's (Distributed loaded monopole) are small efficient, wide bandwidth antennas. The simple design exhibits 50-ohm impedance and is easy to implement. They require only a direct feed from a coax cable and require no elaborate matching networks.

The prime advantage to this technology is a substantial reduction of the size of an antenna. Typically, the DLM antenna is about ⅓ the size of a normal dipole with only minor loss in efficiency. This is especially important for vehicle applications where space is always at a premium. Such antennas can be used for a variety of vehicle radar and communication applications as well for the monitoring of RFID, SAW and similar devices on a vehicle and especially for tire pressure, temperature, and/or acceleration monitoring as well as other monitoring purposes. Such applications have not previously been disclosed.

Although the DLM is being applied to several communication applications, it has yet to be applied to all of the monitoring applications as disclosed in the current assignee's patents and pending patent applications. The antenna gain that results and the ability to pack several antennas into a small package are attractive features of this technology.

Plasma Antenna

The following disclosure was taken from "Markland Technologies—Gas Plasma": (www.marklandtech.com)

"Plasma antenna technology employs ionized gas enclosed in a tube (or other enclosure) as the conducting element of an antenna. This is a fundamental change from traditional antenna design that generally employs solid metal wires as the conducting element. Ionized gas is an efficient conducting element with a number of important advantages. Since the gas is ionized only for the time of transmission or reception, "ringing" and associated effects of solid wire antenna design are eliminated. The design allows for extremely short pulses, important to many forms of digital communication and radars. The design further provides the opportunity to construct an antenna that can be compact and dynamically reconfigured for frequency, direction, bandwidth, gain and beamwidth. Plasma antenna technology will enable antennas to be designed that are efficient, low in weight and smaller in size than traditional solid wire antennas."

"When gas is electrically charged, or ionized to a plasma state it becomes conductive, allowing radio frequency (RF) signals to be transmitted or received. We employ ionized gas enclosed in a tube as the conducting element of an antenna. When the gas is not ionized, the antenna element ceases to exist. This is a fundamental change from traditional antenna design that generally employs solid metal wires as the conducting element. We believe our plasma antenna offers numerous advantages including stealth for military applications and higher digital performance in commercial applications. We also believe our technology can compete in many metal antenna applications."

"Initial studies have concluded that a plasma antenna's performance is equal to a copper wire antenna in every respect. Plasma antennas can be used for any transmission and/or modulation technique: continuous wave (CW), phase modulation, impulse, AM, FM, chirp, spread spectrum or other digital techniques. And the plasma antenna can be used over a large frequency range up to 20 GHz and employ a wide variety of gases (for example neon, argon, helium, krypton, mercury vapor and xenon). The same is true as to its value as a receive antenna."

"Plasma antenna technology has the following additional attributes:

No antenna ringing provides an improved signal to noise ratio and reduces multipath signal distortion.

Reduced radar cross section provides stealth due to the non-metallic elements.

Changes in the ion density can result in instantaneous changes in bandwidth over wide dynamic ranges.

After the gas is ionized, the plasma antenna has virtually no noise floor.

While in operation, a plasma antenna with a low ionization level can be decoupled from an adjacent high-frequency transmitter.

A circular scan can be performed electronically with no moving parts at a higher speed than traditional mechanical antenna structures.

It has been mathematically illustrated that by selecting the gases and changing ion density that the electrical aperture (or apparent footprint) of a plasma antenna can be made to perform on par with a metal counterpart having a larger physical size.

Our plasma antenna can transmit and receive from the same aperture provided the frequencies are widely separated.

Plasma resonance, impedance and electron charge density are all dynamically reconfigurable. Ionized gas antenna elements can be constructed and configured into an array that is dynamically reconfigurable for frequency, beamwidth, power, gain, polarization and directionality—on the fly.

A single dynamic antenna structure can use time multiplexing so that many RF subsystems can share one antenna resource reducing the number and size of antenna structures."

Several of the characteristics discussed above are of particular usefulness for several of the inventions herein including the absence of ringing, the ability to turn the antenna off after transmission and then immediately back on for reception, the ability to send very short pulses, the ability to alter the directionality of the antenna and to sweep thereby allowing one antenna to service multiple devices such as tires and to know which tire is responding. Additional advantages include, smaller size, the ability to work with chirp, spread spectrum and other digital technologies, improved signal to noise ratio, wide dynamic range, circular scanning without moving parts, and antenna sharing over differing frequencies, among others.

Some of the applications disclosed herein can use ultra wideband transceivers. UWB transceivers radiate most of the energy with its frequency centered on the physical length of the antenna. With the UWB connected to a plasma antenna, the center frequency of the UWB transceiver could be hopped or swept simultaneously.

A plasma antenna can solve the problem of multiple antennas by changing its electrical characteristic to match the function required—Time domain multiplexed. It can be used for high-gain antennas such as phase array, parabolic focus steering, log periodic, yogi, patch quadrafiler, etc. One antenna can be used for GPS, ad-hoc (such as car-to-car) communication, collision avoidance, back up sensing, cruse control, radar, toll identification and data communications.

Although the plasma antennas are being applied to several communication applications, they have yet to be applied to the monitoring applications as disclosed herein. The many advantages that result and the ability to pack several antenna functions into a small package are attractive features of this technology. Patents and applications that discuss plasma antennas include: U.S. Pat. No. 6,710,746 and U.S. Pat. App. Pub Nos. 20030160742 and 20040130497.

Dielectric Antenna

A great deal of work is underway to make antennas from dielectric materials. In one case, the electric field that impinges on the dielectric is used to modulate a transverse electric light beam. In another case, the reduction of the speed of electro magnetic waves due to the dielectric constant is used to reduce the size of the antenna. It can be expected that developments in this area will affect the antennas used in cell phones as well as in RFID and SAW-based communication devices in the future. Thus, dielectric antennas can be advantageously used with some of the inventions disclosed herein.

Nanotube Antenna

Antennas made from carbon nanotubes are beginning to show promise of increasing the sensitivity of antennas and thus increasing the range for communication devices based on RFID, SAW or similar devices where the signal strength frequently limits the range of such devices. The use of these antennas is therefore contemplated herein for use in tire monitors and the other applications disclosed herein.

Combinations of the above antenna designs in many cases can benefit from the advantages of each type to add further improvements to the field. Thus the inventions herein are not limited to any one of the above concepts nor is it limited to their use alone. Where feasible, all combinations are contemplated herein.

Antenna Summary

Figure 19:
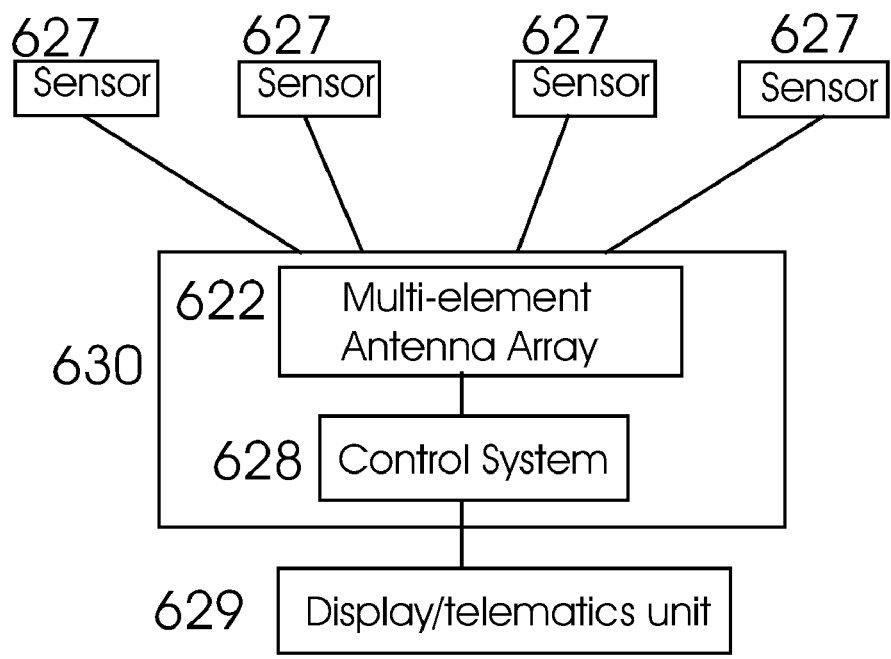
FIG. 19 is a schematic of the system shown in FIGS. 17 and 18.

A general system for obtaining information about a vehicle or a component thereof or therein is illustrated in FIG. 19 and includes multiple sensors 627 which may be arranged at specific locations on the vehicle, on specific components of the vehicle, on objects temporarily placed in the vehicle such as child seats, or on or in any other object in or on the vehicle or in its vicinity about which information is desired. The sensors 627 may be SAW or RFID sensors or other sensors which generate a return signal upon the detection of a transmitted radio frequency signal. A multi-element antenna array 622 is mounted on the vehicle, in either a central location as shown in FIG. 17 or in an offset location as shown in FIG. 20, to provide the radio frequency signals which cause the sensors 627 to generate the return signals.

A control system 628 is coupled to the antenna array 622 and controls the antennas in the array 622 to be operative as necessary to enable reception of return signals from the sensors 627. There are several ways for the control system 628 to control the array 622, including to cause the antennas to be alternately switched on in order to sequentially transmit the RF signals therefrom and receive the return signals from the sensors 627 and to cause the antennas to transmit the RF signals simultaneously and space the return signals from the sensors 627 via a delay line in circuitry from each antennas such that each return signal is spaced in time in a known manner without requiring switching of the antennas. The control system can also be used to control a smart antenna array.

The control system 628 also processes the return signals to provide information about the vehicle or the component. The processing of the return signals can be any known processing including the use of pattern recognition techniques, neural networks, fuzzy systems and the like.

The antenna array 622 and control system 628 can be housed in a common antenna array housing 630.

Once the information about the vehicle or the component is known, it is directed to a display/telematics/adjustment unit 629 where the information can be displayed on a display 629 to the driver, sent to a remote location for analysis via a telematics unit 629 and/or used to control or adjust a component on, in or near the vehicle. Although several of the figures illustrate applications of these technologies to tire monitoring, it is intended that the principles and devices disclosed can be applied to the monitoring of a wide variety of components on and off a vehicle.

In summary, the use of devices capable of reading or scanning RFID devices when situated in compartments or spaces defined by vehicles or other mobile assets provides significant advantages. Among other things, it allows for the determination of the identification and location of the RFID devices and thus objects equipped with such RFID devices, and with a communications or telematics unit coupled to the interrogator, it allows for communication of that information off of the vehicle, i.e., to one or more remote sites. The overall system identifies the RFID device if it generates a unique identification code, which is usually the case, and thus can generate a transmission to the remote site containing an identification of an object in a space of a mobile asset.

With the foregoing system, it is possible at the remote site to locate and monitor the RFID-equipped object.

Alternative or in addition to the communication to a remote site, the interrogator could also transmit or otherwise provide the signal with an identification of the object to another system on the vehicle itself. In this manner, someone looking for an RFID-equipped object in a space could easily determine its location, such as a package delivery driver looking for a specific package in a truck or an airline worker looking for a specific passenger's luggage.

Referring now to FIGS. 21-24, additional aspects of the monitoring of interior contents of a shipping container, trailer, boat, shed, etc. will now be described. Generally, these contents can be removed from the vehicle and thus are usually not directly attached to a frame of the vehicle which defines the object-containing interior. Such a frame may have the form of a truck, a truck trailer, a shipping container, a boat, an airplane or another vehicle.

Commercial systems are now available from companies such as Skybitz Inc. 45365 Vintage Park Plaza, Suite 210, Dulles, Va. 20166-6700, which will monitor the location of an asset anywhere on the surface of the earth. Each monitored asset contains a low cost GPS receiver and a satellite communication system. The system can be installed onto a truck, trailer, container, or other asset and it well periodically communicate with a low earth orbit (LEO) or a geostationary satellite providing the satellite with its location as determined by the GPS receiver or a similar system such as the Skybitz Global Locating System (GLS). The entire system operates off of a battery, for example, and if the system transmits information to the satellite once per day, the battery can last many years before requiring replacement. Thus, the system can monitor the location of a trailer, for example, once per day, which is sufficient if trailer is stationary. The interrogation rate can be automatically increased if the trailer begins moving. Such a system can last for 2 to 10 years without requiring maintenance depending on design, usage and the environment. Even longer periods are possible if power is periodically or occasionally available to recharge the battery such as by vibration energy harvesting, solar cells, capacitive coupling, inductive coupling, RF or vehicle power. In some cases, an ultracapacitor as discussed above can be used in place of a battery.

The Skybitz system by itself only provides information as to the location of a container and not information about its contents, environment, and/or other properties. At least one of the inventions disclosed herein disclosed here is intended to provide this additional information, which can be coded typically into a few bytes and sent to the satellite along with the container location information and identification. First, consider monitoring of the interior contents of a container. From here on, the terms "shipping container" or "container" will be used as a generic cargo holder and will include all cargo holders including standard and non-standard containers, boats, trucks, trailers, sheds, warehouses, storage facilities, tanks, buildings or any other such object that has space and can hold cargo. Most of these "containers" are also vehicles as defined above.

Consider now a standard shipping container that is used for shipping cargo by boat, trailer, or railroad, such cargo being usually inanimate, i.e., not alive. Such containers are nominally 8'w×8'h×20' or 40' long outside dimensions, however, a container 48' in length is also sometimes used. The inside dimensions are frequently around 4" less than the outside dimensions. In a simple interior container monitoring system, one or more ultrasonic transducers can be mounted on an interior part of the container adjacent the container's ceiling in a protective housing. Periodically, the ultrasonic transducers can emit a few cycles of ultrasound and receive reflected echoes of this ultrasound from walls and contents of the trailer. In some cases, especially for long containers, one or more transducers, typically at one end of the container, can send to one or more transducers located at, for example, the opposite end. Usually, however, the transmitters and receivers are located near each other. Due to the long distance that the ultrasound waves must travel especially in the 48 foot container, it is frequently desirable to repeat the send and receive sequence several times and to add or average the results. This has the effect of improving the signal to noise ratio. Note that the system disclosed herein and in the parent patents and applications is able to achieve such long sensing distances due to the principles disclosed herein. Competitive systems that are now beginning to enter the market have much shorter sensing distances and thus a key invention herein is the ability to achieve sensing distances in excess of 20 feet.

Note that in many cases several transducers are used for monitoring the vehicle such as a container that typically point in slightly different directions. This need not be the case and a movable mounting is also contemplated where the motion is accomplished by any convenient method such as a magnet, motor, etc.

Figure 21:
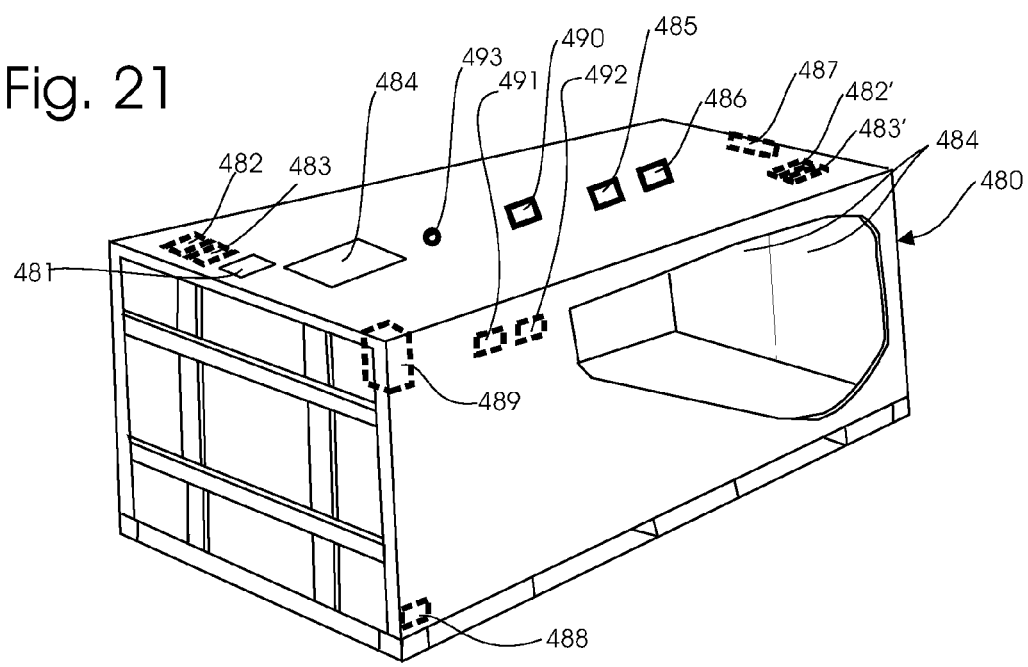
FIG. 21 is a perspective view showing a shipping container including one embodiment of the monitoring system in accordance with the present invention.

Referring to FIG. 21, a container 480 is shown including an interior sensor system 481 arranged to obtain information about contents in the interior of the container 480. The interior sensor system includes a wave transmitter 482 mounted at one end of the container 480 and which operatively transmits waves into the interior of the container 480 and a wave receiver 483 mounted adjacent the wave transmitter 482 and which operatively receives waves from the interior of the container 480. As shown, the transmitter 482 and receiver 483 are adjacent one another but such a positioning is not intended to limit the invention. The transmitter 482 and receiver 483 can be formed as a single transducer or may be spaced apart from one another. Multiple pairs of transmitter/receivers can also be provided, for example transmitter 482' and receiver 483' are located at an opposite end of the container 480 proximate the doors 484.

The interior sensor system 481 includes a processor coupled to the receiver 483, and optionally the transmitter 482, and which is resident on the container 480, for example, in the housing of the receiver 483 or in the housing of a communication system 485. The processor is programmed to compare waves received by each receiver 483, 483' at different times and analyze either the received waves individually or the received waves in comparison to or in relation to other received waves for the purpose of providing information about the contents in the interior of the container 480. The processor can employ pattern recognition techniques and as discussed more fully below, be designed to compensate for thermal gradients in the interior of the container 480. Information about the contents of the container 480 may comprise the presence or motion of objects in the interior. The processor may be associated with a memory unit which can store data on the location of the container 480 and the analysis of the data from the interior sensor system 481.

The container 480 also includes a location determining system 486 which monitors the location of the container 480. To this end, the location determining system can be any asset locator in the prior art, which typically include a GPS receiver, transmitter and appropriate electronic hardware and software to enable the position of the container 480 to be determined using GPS technology or other satellite or ground-based technology including those using the cell phone system or similar location based systems.

The communication system 485 is coupled to both the interior sensor system 481 and the location determining system 486 and transmits the information about the contents in the interior of the container 480 (obtained from the interior sensor system 481) and the location of the container 480 (obtained from the location determining system 486). This transmission may be to a remote facility wherein the information about the container 480 is stored, processed, counted, reviewed and/or monitored and/or retransmitted to another location, perhaps by way of the Internet.

Briefly, in this regard, transmission of the data about the container 480 and its contents, may be transmitted to the remote location via the Internet, e.g., the ubiquitous Internet. The transmission may include the location of the container 480 or sufficient information obtained from a data reception unit, e.g., in the cell phone or PDA (see the discussion about FIG. 25) to enable the location of the container 480 to be determined at the remote location. This data may be strengths of satellite signals being received at the container 480, or signals from wireless beacons having known positions. The teachings of U.S. Pat. No. 6,243,648 can be incorporated to enhance the location determination. The communication system 485 would determine the minimum time needed to get enough satellite information to allow the computer at the remote location to determine the location of the vehicle.

The container 480 also includes a door status sensor 487 arranged to detect when one or both doors 484 is/are opened or closed after having been opened. The door status sensor 487 may be an ultrasonic sensor which is positioned a fixed distance from the doors 484 and registers changes in the position of the doors 484. Alternately, other door status systems can be used such as those based on switches, magnetic sensors or other technologies. The door status sensor 487 can be programmed to associate an increase in the distance between the sensor 487 and each of the doors 484 and a subsequent decrease in the distance between the sensor 487 and that door 484 as an opening and subsequent closing of that door 484. In the alternative, a latching device can be provided to detect latching of each door 484 upon its closure. The door status sensor 487 is coupled to the interior sensor system 481, or at least to the transmitters 482,482' so that the transmitters 482,482' can be designed to transmit waves into the interior of the container 480 only when the door status sensor 487 detects when at least one door 484 is closed after having been opened. For other purposes, the ultrasonic sensors may be activated on opening of the door(s) in order to monitor the movement of objects into or out of the container, which might in turn be used to activate an RFID or bar code reading system or other object identification system.

When the ultrasonic transducers are first installed into the container 480 and the doors 484 closed, an initial pulse transmission can be initiated and the received signal stored to provide a vector of data that is representative of an empty container. To initiate the pulse transmission, an initiation device or function is provided in the interior sensor system 481, e.g., the door status sensor 487. At a subsequent time when contents have been added to the container (as possibly reflected in the opening and closing of the doors 484 as detected by the door status sensor 487), the ultrasonic transducers can be commanded to again issue a few cycles of ultrasound and record the reflections. If the second pattern is subtracted from the first pattern, or otherwise compared, in the processor the existence of additional contents in the container 480 will cause the signal to change, which thus causes the differential signal to change and the added contents detected. Vector as used herein with ultrasonic systems is a linear array of data values obtained by rectifying, taking the envelope and digitizing the returned signal as received by the transducer or other digital representation comprising at least a part of the returned signal.

Another use of the door status sensor 487 is to cause storage of data about the contents in the container 480 as a function of opening and closing of the doors 484. Thus, the memory unit would store data indicating each time the doors 484 are opened and closed and the contents of the container 480 before and after each opening and closing. This will provide information about the loading and unloading of the contents from the container 480. Data about the contents of the container 480 may be obtained in any of the ways described herein, including using sensor systems 491 placed on each object in the interior of the container 480.

When a container 480 is exposed to sunlight on its exterior top, a stable thermal gradient can occur inside the container 480 where the top of the container 480 near the ceiling is at a significantly higher temperature than the bottom of the container 480. This thermal gradient changes the density of the gas inside the container causing it to act as a lens to ultrasound that diffracts or bends the ultrasonic waves and can significantly affect the signals sensed by the receiver portions 483, 483' of the transducers. Thus, the vector of sensed data when the container is at a single uniform temperature will look significantly different from the vector of sensed data acquired within the same container when thermal gradients are present.

It is even possible for currents of heated air to occur within a container 480 if a side of the container is exposed to sunlight. Since these thermal gradients can substantially affect the vector, the system must be examined under a large variety of different thermal environments. This generally requires that the electronics be designed to mask somewhat the effects of the thermal gradients on the magnitude of the sensed waves while maintaining the positions of these waves in time. This can be accomplished as described in above-referenced patents and patent applications through the use, for example, of a logarithmic compression circuit. There are other methods of minimizing the effect on the reflected wave magnitudes that will accomplish substantially the same result some of which are disclosed elsewhere herein.

When the complicating aspects of thermal gradients are taken into account, in many cases a great deal of data must be taken with a large number of different occupancy situations to create a database of perhaps 10,000 to one million vectors each representing the different occupancy state of the container in a variety of thermal environments. This data can then be used to train a pattern recognition system such as a neural network, modular or combination neural network, cellular neural network, support vector machine, fuzzy logic system, Kalman filter system, sensor fusion system, data fusion system or other classification system. Since all containers of the type transported by ships, for example, are of standard sizes, only a few of these training exercises need to be conducted, typically one for each different geometry container. The process of adapting an ultrasonic occupancy monitoring system to a container or other space is described for automobile interior monitoring in above-referenced patents and patent applications, and therefore this process is not repeated here.

Other kinds of interior monitoring systems can be used to determine and characterize the contents of a space such as a container. One example uses a scanner and photocell 488, as in a laser radar system, and can be mounted near the floor of the container 480 and operated to scan the space above the floor in a plane located, for example, 10 cm above the floor. Since the distance to a reflecting wall of the container 480 can be determined and recorded for each angular position of the scanner, the distance to any occupying item will show up as a reflection from an object closer to the scanner and therefore a shadow graph of the contents of the container 10 cm above the floor can be obtained and used to partially categorize the contents of the container 480. Categorization of the contents of the container 480 may involve the use of pattern recognition technologies. Other locations of such a scanning system are possible.

In both of these examples, relatively little can be the about the contents of the container other then that something is present or that the container is empty. Frequently this is all that is required. A more sophisticated system can make use of one or more imagers (for example cameras) 489 mounted near the ceiling of the container, for example. Such imagers can be provided with a strobe flash and then commanded to make an image of the trailer interior at appropriate times. The output from such an imager 489 can also be analyzed by a pattern recognition system such as a neural network or equivalent, to reduce the information to a few bytes that can be sent to a central location via an LEO or geostationary satellite, for example. As with the above ultrasonic example, one image can be subtracted from the empty container image and if anything remains then that is a representation of the contents that have been placed in the container. Also, various images can be subtracted to determine the changes in container contents when the doors are opened and material is added or removed or to determine changes in position of the contents. Various derivatives of this information can be extracted and sent by the telematics system to the appropriate location for monitoring or other purposes.

Each of the systems mentioned above can also be used to determine whether there is motion of objects within the container relative to the container. Motion of objects within the container 480 would be reflected as differences between the waves received by the transducers (indicative of differences in distances between the transducer and the objects in the container) or images (indicative of differences between the position of objects in the images). Such motion can also aid in image segmentation which in turn can aid in the object identification process. This is particularly valuable if the container is occupied by life forms such as humans.

In the system of FIG. 21, wires (not shown) are used to connect the various sensors and devices. It is contemplated that all of the units in the monitoring system can be coupled together wirelessly, using for example the Bluetooth, WI-FI or other protocol. Thus, any type or form of wired, wireless or combination network can be used to connect the sensors and other parts of the monitoring arrangement together on the asset.

If an inertial device 490 is also incorporated, such as the MEMSIC dual axis accelerometer, which provides information as to the accelerations of the container 480, then this relative motion can be determined by the processor and it can be ascertained whether this relative motion is caused by acceleration of the container 480, which may indicate loose cargo, and/or whether the motion is caused by the sensed occupying item. In latter case, a conclusion can perhaps be reached that container is occupied by a life form such as an animal or human.

Additionally, it may be desirable to place sensors on an item of cargo itself since damage to the cargo could occur from excessive acceleration, shock, temperature, vibration, etc. regardless of whether the same stimulus was experienced by the entire container. A loose item of cargo, for example, may be impacting the monitored item of cargo and damaging it. Thus, any of the sensors described herein, e.g., chemical sensors, motion sensors and the like, can be placed on each item of cargo or object and connected by wires or wirelessly to a receiving unit which receives data obtained by such object-mounted sensors. Data obtained from the sensors may be communicated to a remote facility. Also, the obtaining of the data can be done periodically or triggered by any of the triggers described for obtaining data via the asset-mounted sensor systems.

Relative motion can also be sensed in some cases from outside of the container through the use of accelerometers, microphones or MIR (Micropower Impulse Radar). Note that all such sensors regardless of where they are placed are contemplated herein and are part of the present inventions.

Chemical sensors 491 based on surface acoustic wave (SAW) or other technology can in many cases be designed to sense the presence of certain vapors in the atmosphere and can do so at very low power. A properly designed SAW or equivalent sensing device, for example, can measure acceleration, angular rate, strain, temperature, pressure, carbon dioxide concentration, humidity, hydrocarbon concentration, and the presence or concentration of many other chemicals. A separate SAW or similar device may be needed for each chemical species (or in some cases each class of chemicals) where detection is desired. The devices, however, can be quite small and can be designed to use very little power. Such a system of SAW or equivalent devices can be used to measure the existence of certain chemical vapors in the atmosphere of the container, or the atmosphere around an object in the interior of a container, much like a low power electronic nose. In some cases, it can be used to determine whether a carbon dioxide source such as a human is in the container, or in the object. Such chemical sensing devices can also be designed, for example, to monitor for many other chemicals including some narcotics, hydrocarbons, mercury vapor, and other hazardous chemicals including some representative vapors of explosives or some weapons of mass destruction. With additional research, SAW or similar devices can also be designed or augmented to sense the presence of radioactive materials, and perhaps some biological materials such as smallpox or anthrax. In many cases, such SAW devices do not now exist, however, researchers believe that given the proper motivation that such devices can be created. Thus, although heretofore not appreciated, SAW or equivalent based systems can monitor a great many dangerous and hazardous materials that may be either legally or illegally occupying space within a container, for example. In particular, the existence of spills or leakages from the cargo can be detected in time to perhaps save damage to other cargo either within the container or in an adjacent container. Although SAW devices have in particular been described, other low power devices using battery or RF power can also be used where necessary. Note, the use of any of the afore mentioned SAW devices in connection within or on a vehicle for any purpose other than tire pressure and temperature monitoring or torque monitoring is new and contemplated by the inventions disclosed herein. Only a small number of examples are presented of the general application of the SAW, or RFID, technology to vehicles.

Other sensors that can be designed to operate under very low power levels include microphones 492 and light sensors 493 or sensors sensitive to other frequencies in the electromagnetic spectrum as the need arises. The light sensors 493 could be designed to cause activation of the interior sensor system 481 when the container is being switched from a dark condition (normally closed) to a light situation (when the door or other aperture is opened). A flashlight could also activate the light sensor 493.

Instead of one or more batteries providing power to the interior sensor system 481, the communication system 485 and the location determining system 486, solar power can be used. In this case, one or more solar panels 494 are attached to the upper wall of the container 480 (see FIG. 57) and electrically coupled to the various power-requiring components of the monitoring system. A battery can thus be eliminated. In the alternative, since the solar panel(s) 494 will not always be exposed to sunlight, a rechargeable battery can be provided which is charged by the solar panel 494 when the solar panels are exposed to sunlight. A battery could also be provided in the event that the solar panel 494 does not receive sufficient light to power the components of the monitoring system. In a similar manner, power can temporarily be supplied by a vehicle such as a tractor either by a direct connection to the tractor power or though capacitive, inductive or RF coupling power transmission systems. As above an ultracapacitor can be used instead of a battery and energy harvesting can be used if there is a source of energy such as light or vibration in the environment.

In some cases, a container is thought to be empty when in fact it is being surreptitiously used for purposes beyond the desires of the container owner or law enforcement authorities. The various transducers that can be used to monitor interior of a container as described above, plus others, can also be used to allow the trailer or container owner to periodically monitor the use of his property.

Immediately above, monitoring of the interior of the container is described. If the container is idle, there may not the need to frequently monitor the status of the container interior or exterior until some event happens. Thus, all monitoring systems on the container can be placed in the sleep mode until some event such as a motion or vibration of the container takes place. Other wakeup events could include the opening of the doors, the sensing of light or a change in the interior temperature of the container above a reference level, for example. When any of these chosen events occurs, the system can be instructed to change the monitoring rate and to immediately transmit a signal to a satellite or another communication system, or respond to a satellite-initiated signal for some LEO-based, or geocentric systems, for example. Such an event may signal to the container owner that a robbery was in progress either of the interior contents of the container or of the entire container. It also might signal that the contents of the container are in danger of being destroyed through temperature or excessive motion or that the container is being misappropriated for some unauthorized use.

Figure 22:
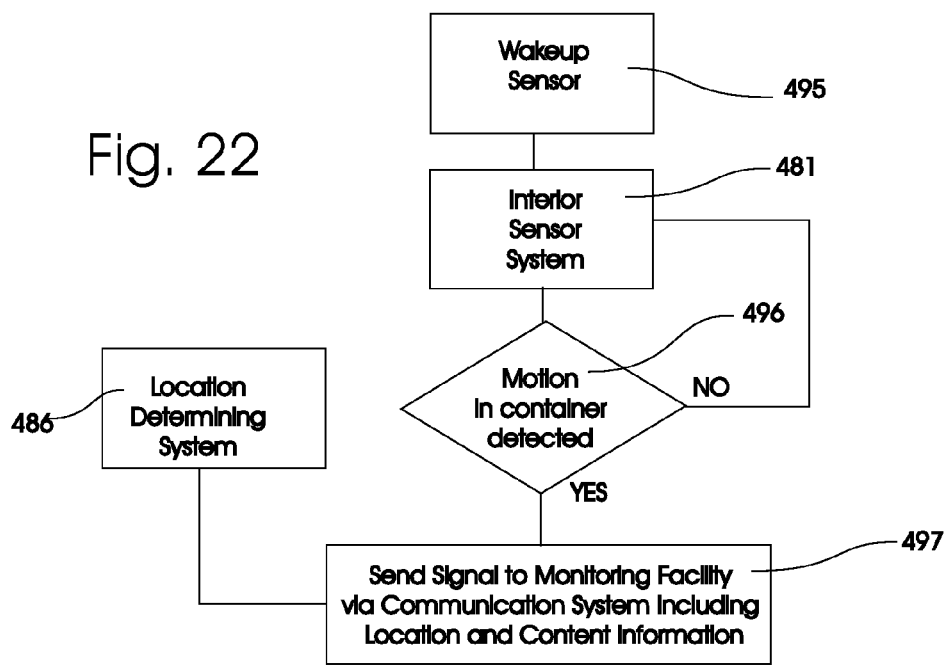
FIG. 22 is a flow chart showing one manner in which a container is monitored in accordance with the invention.

FIG. 22 shows a flowchart of the manner in which container 480 may be monitored by personnel or a computer program at a remote facility for the purpose of detecting unauthorized entry into the container and possible theft of the contents of the container 480. Initially, the wakeup sensor 495 detects motion, sound, light or vibration including motion of the doors 484, or any other change of the condition of the container 480 from a stationary or expected position. The wakeup sensor 495 can be designed to provide a signal indicative of motion only after a fixed time delay, i.e., a period of "sleep". In this manner, the wakeup sensor would not be activated repeatedly in traffic stop and go situations.

The wakeup sensor 495 initiates the interior sensor system 481 to perform the analysis of the contents in the interior of the container, e.g., send waves into the interior, receive waves and then process the received waves. If motion in the interior of the container is not detected at 496, then the interior sensor system 481 may be designed to continue to monitor the interior of the container, for example, by periodically re-sending waves into the interior of the container. If motion is detected at 496, then a signal is sent at 497 to a monitoring facility via the communication system 485 and which includes the location of the container 480 obtained from the location determining system 486 or by the ID for a permanently fixed container or other asset, structure or storage facility. In this manner, if the motion is determined to deviate from the expected handling of the container 480, appropriate law enforcement personnel can be summoned to investigate.

When it is known and expected that the container should be in motion, monitoring of this motion can still be important. An unexpected vibration could signal the start of a failure of the chassis tire, for example, or failure of the attachment to the chassis or the attachment of the chassis to the tractor. Similarly, an unexpected tilt angle of the container may signify a dangerous situation that could lead to a rollover accident and an unexpected shock could indicate an accident has occurred. Various sensors that can be used to monitor the motion of the container include gyroscopes, accelerometers and tilt sensors. An IMU (Inertial Measurement Unit) containing for example three accelerometers and three gyroscopes can be used.

In some cases, the container or the chassis can be provided with weight sensors that measure the total weight of the cargo as well as the distribution of weight. By monitoring changes in the weight distribution as the vehicle is traveling, an indication can result that the contents within the trailer are shifting which could cause damage to the cargo. An alternate method is to put weight sensors in the floor or as a mat on the floor of the vehicle. The mat design can use the bladder principles described above for weighing b vehicle occupants using, in most cases, multiple chambers. Strain gages can also be configured to measure the weight of container contents. An alternate approach is to use inertial sensors such as accelerometers and gyroscopes to measure the motion of the vehicle as it travels. If the characteristics of the input accelerations (linear and angular) are known from a map, for example, or by measuring them on the chassis then the inertial properties of the container can be determined and thus the load that the container contains. This is an alternate method of determining the contents of a container. If several (usually 3) accelerometers and several (usually 3) gyroscopes are used together in a single package then this is known as an inertial measurement unit. If a source of position is also known such as from a GPS system then the errors inherent in the IMU can be corrected using a Kalman filter.

Other container and chassis monitoring can include the attachment of a trailer to a tractor, the attachment of electrical and/or communication connections, and the status of the doors to the container. If the doors are opened when this is not expected, this could be an indication of a criminal activity underway. Several types of security seals are available including reusable seals that indicate when the door is open or closed or if it was ever opened during transit, or single use seals that are destroyed during the process of opening the container.

Figure 23A:
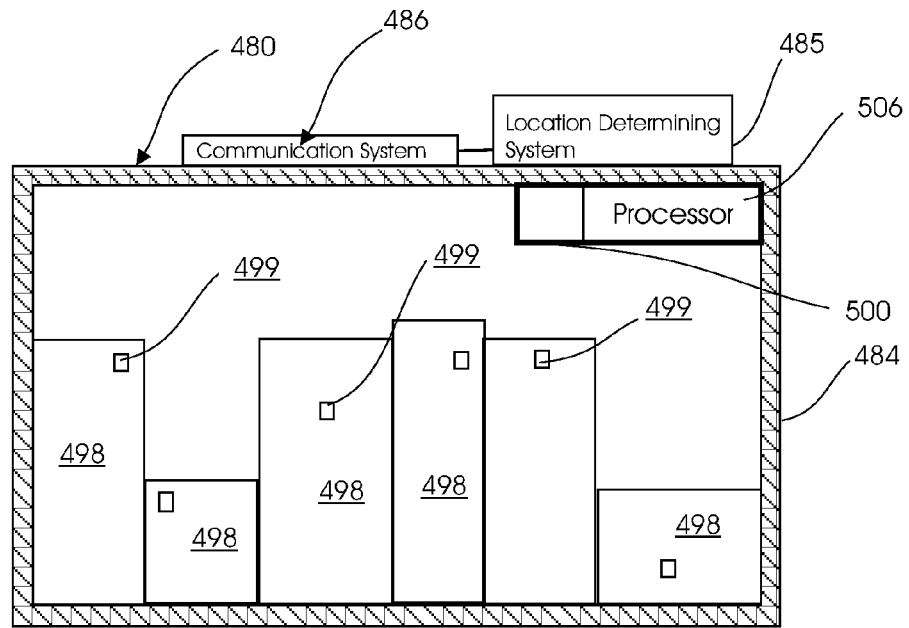
FIG. 23A is a cross-sectional view of a container showing the use of RFID technology in a monitoring system and method in accordance with the invention.
Figure 23B:
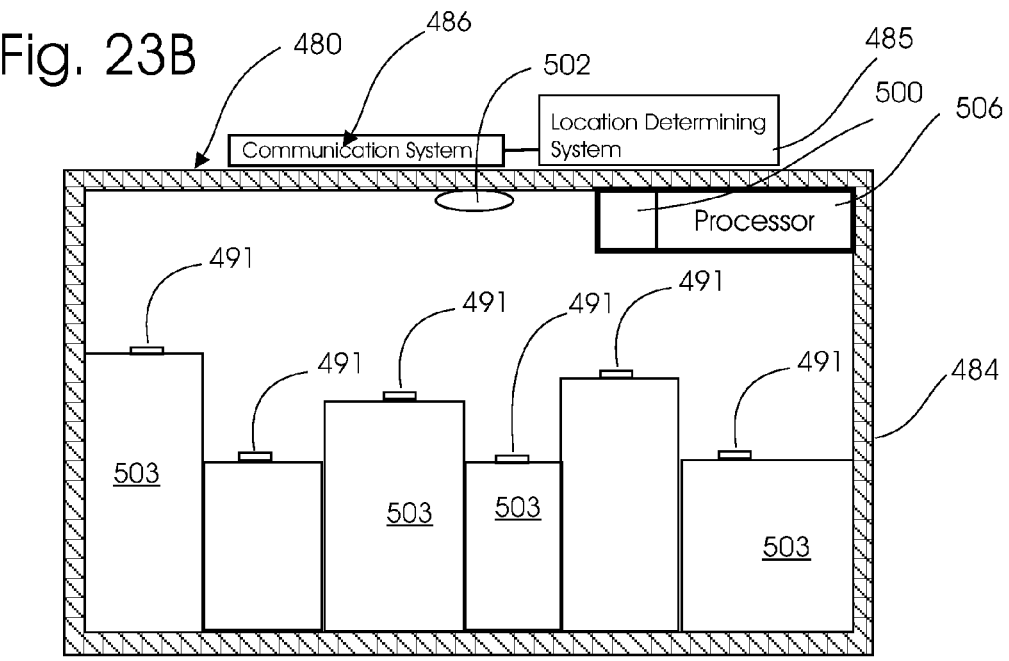
FIG. 23B is a cross-sectional view of a container showing the use of barcode technology in a monitoring system and method in accordance with the invention.
Figure 23C:
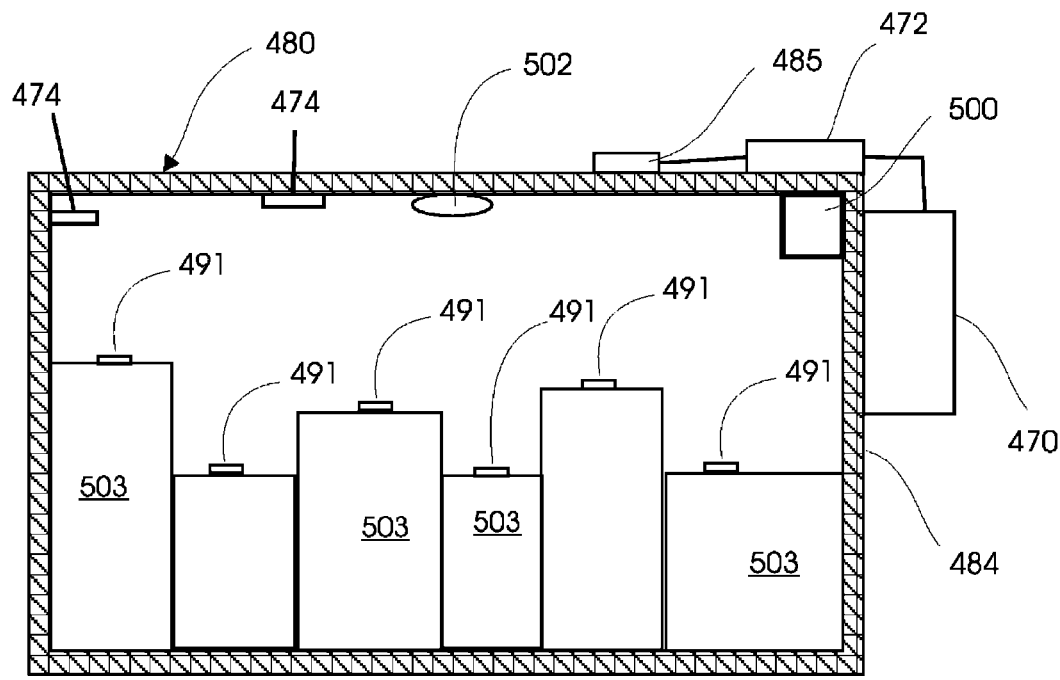
FIG. 23C is a cross-sectional view of a refrigerated container showing the use of a diagnostic module in a monitoring system and method in accordance with the invention.

Referring now to FIG. 23C, another application of monitoring the entire asset would be to incorporate a diagnostic module 472 into the asset. Frequently, the asset may have operating parts, e.g., if it is a refrigerated and contains a refrigeration unit 470. To this end, sensors 474, e.g., temperature sensors, can be installed on the asset and monitored using pattern recognition techniques embodied in a processor of the diagnostic module 472, as disclosed in U.S. Pat. No. 5,809,437 and U.S. Pat. No. 6,175,787. As such, various sensors 474 would be placed on the container 480 and used to determine problems with the container 480 or refrigeration unit 470 which might cause it to operate abnormally, e.g., if the refrigeration unit were about to fail because of a refrigerant leak. Sensors 474 would indicate a higher temperature than expected if the refrigeration unit 470 were not operating normally. In this case, the information about the expected failure of the refrigeration unit 470 could be transmitted to a facility, via a link between the diagnostic module 472 and the communications system 485, and maintenance of the refrigeration unit could be scheduled, e.g., based on the location of the personnel capable of fixed or replacing the refrigeration unit 470 and the location of the asset which is also transmitted by the communications unit 485. Instead of using sensors 474 apart from the refrigeration unit 470, or other operating part whose operating is being diagnosed, to determine abnormal operation, it is also possible to connect the diagnostic module 472 to the refrigeration unit 470 so that it can directly monitor the operation thereof, this connection being represented by a line in FIG. 23C.

It is anticipated that whatever entity is monitoring a plurality of assets could strategically locate personnel capable of fixing or replacing abnormally operating parts of the asset to ensure secure carriage of the goods in the asset, e.g., perishable products. Thus, when the asset provides a signal indicative of abnormal operation and its location to the remote facility, personnel at the remote facility could dispatch the nearest personnel to attend to the asset.

It can also be desirable to detect unauthorized entry into container, which could be by cutting with a torch, or motorized saw, grinding, or blasting through the wall, ceiling, or floor of the container. This event can be detected by one or more of the following methods:

1. A light sensor which measures any part of the visible or infrared part of the spectrum and is calibrated to the ambient light inside the container when the door is closed and which then triggers when light is detected above ambient levels and door is closed.

2. A vibration sensor attached to wall of container which triggers on vibrations of an amplitude and/or frequency signature indicative of forced entry into the container. The duration of signal would also be a factor to consider. The algorithm could be derived from observations and tests or it could use a pattern recognition approach such as Neural Networks.

3. An infrared or carbon dioxide sensor could be used to detect human presence, although a carbon dioxide sensor would probably require a prolonged exposure.

4. Various motion sensors as discussed above can also be used, but would need to be resistant to triggering on motion typical of cargo transport. Thus a trained pattern recognition algorithm might be necessary.

5. The Interior of the container can be flooded with waves (ultrasonic or electromagnetic) and the return signature evaluated by a pattern recognition system such as a neural network trained to recognize changes consistent with the removal of cargo or the presence of a person or people. Alternately the mere fact that the pattern was changing could be indicative of human presence.

As discussed above and below, information from entry/person detector could be sent to communication network to notify interested parties of current status. Additionally, an audible alarm may be sounded and a photo could also be taken to identify the intruder. Additionally, motion sensors such as an accelerometer on a wall or floor of a vehicle such as a container or an ultrasonic or optical based motion detector such as used to turn on residential lights and the like, can also be used to detect intrusion into a vehicle and thus are contemplated herein. Such sensors can be mounted at any of the preferred locations disclosed herein or elsewhere in or on the vehicle. If a container, for example, is closed, a photocell connected to a pattern recognition system such as a neural network, for example can be trained to be sensitive to very minute changes in light such as would occur when an intruder opens a door or cuts a hole in a wall, ceiling or the floor of a vehicle even on a dark night. Even if there are holes in the vehicle that allow light to enter, the rate of change of this illumination can be detected and used as an indication of an intrusion.

It is noteworthy that systems based on the disclosure above can be configured to monitor construction machinery to prevent theft or at least to notify others that a theft is in progress.

The transmission of data obtained from imagers, or other transducers, to another location, requiring the processing of the information, using neural networks for example, to a remote location is an important feature of the inventions disclosed herein. This capability can permit an owner of a cargo container or truck trailer to obtain a picture of the interior of the vehicle at any time via telematics. When coupled with occupant sensing, the driver of a vehicle can be recognized and the result sent by telematics for authorization to minimize the theft or unauthorized operation of a vehicle. The recognition of the driver can either be performed on the vehicle or an image of the driver can be sent to a remote location for recognition at that location.

Generally monitoring of containers, trailers, chassis etc. is accomplished through telecommunications primarily with LEO or geostationary satellites or through terrestrial-based communication systems. These systems are commercially available and will not be discussed here. Expected future systems include communication between the container and the infrastructure to indicate to the monitoring authorities that a container with a particular identification number is passing a particular terrestrial point. If this is expected, then no action would be taken. The container identification number can be part of a national database that contains information as to the contents of the container. Thus, for example, if a container containing hazardous materials approaches a bridge or tunnel that forbids such hazardous materials from passing over the bridge or through the tunnel, then an emergency situation can be signaled and preventive action taken.

It is expected that monitoring of the transportation of cargo containers will dramatically increase as the efforts to reduce terrorist activities also increase. If every container that passes within the borders of the United States has an identification number and that number is in a database that provides the contents of that container, then the use of shipping containers by terrorists or criminals should gradually be eliminated. If these containers are carefully monitored by satellite or another communication system that indicates any unusual activity of a container, an immediate investigation can result and then the cargo transportation system will gradually approach perfection where terrorists or criminals are denied this means of transporting material into and within the United States. If any container is found containing contraband material, then the entire history of how that container entered the United States can be checked to determine the source of the failure. If the failure is found to have occurred at a loading port outside of the United States, then sanctions can be imposed on the host country that could have serious effects on that country's ability to trade worldwide. Just the threat of such an action would be a significant deterrent. Thus, the use of containers to transport hazardous materials or weapons of mass destruction as well as people, narcotics, or other contraband and can be effectively eliminated through the use of the container monitoring system of at least one of the inventions disclosed herein.

Prior to the entry of a container ship into a harbor, a Coast Guard boat from the U.S. Customs Service can approach the container vessel and scan all of the containers thereon to be sure that all such containers are registered and tracked including their contents. Where containers contain dangerous material legally, the seals on those containers can be carefully investigated prior to the ship entering U.S. waters. Obviously, many other security precautions can now be conceived once the ability to track all containers and their contents has been achieved according to the teachings of at least one of the inventions disclosed herein.

Containers that enter the United States through land ports of entry can also be interrogated in a similar fashion. As long as the shipper is known and reputable and the container contents are in the database, which would probably be accessible over the Internet, is properly updated, then all containers will be effectively monitored that enter the United States with the penalty of an error resulting in the disenfranchisement of the shipper, and perhaps sanctions against the country, which for most reputable shippers or shipping companies would be a severe penalty sufficient to cause such shippers or shipping companies to take appropriate action to assure the integrity of the shipping containers. Intelligent selected random inspections guided by the container history would still take place.

Although satellite communication is preferred, communication using cell phones and infrastructure devices placed at appropriate locations along roadways are also possible. Eventually there will be a network linking all vehicles on the highways in a peer-to-peer arrangement (perhaps using Bluetooth, IEEE 802.11 (WI-FI), Wi-Mobile or other local, mesh or ad-hoc network) at which time information relative to container contents etc. can be communicated to the Internet or elsewhere through this peer-to-peer network. It is expected that a pseudo-noise-based or similar communication system such as a code division multiple access (CDMA) system, wherein the identifying code of a vehicle is derived from the vehicle's GPS determined location, will be the technology of choice for this peer-to-peer vehicle network. It is expected that this network will be able to communicate such information to the Internet (with proper security precautions including encryption where necessary or desired) and that all of the important information relative to the contents of moving containers throughout the United States will be available on the Internet on a need-to-know basis. Thus, law enforcement agencies can maintain computer programs that will monitor the contents of containers using information available from the Internet. Similarly, shippers and receivers can monitor the status of their shipments through a connection onto the Internet. Thus, the existence of the Internet or equivalent can be important to the monitoring system described herein.

An alternate method of implementing the invention is to make use of a cell phone or PDA. Cell phones that are now sold contain a GPS-based location system as do many PDAs.

Such a system along with minimal additional apparatus can be used to practice the teachings disclosed herein. In this case, the cell phone, PDA or similar portable device could be mounted through a snap-in attachment system, for example, wherein the portable device is firmly attached to the vehicle. The device can at that point, for example, obtain an ID number from the container through a variety of methods such as a RFID, SAW or hardwired based system. It can also connect to a satellite antenna that would permit the device to communicate to a LEO or GEO satellite system, such as Skybitz as described above. Since the portable device would only operate on a low duty cycle, the battery should last for many days or perhaps longer. Of course, if it is connected to the vehicle power system, its life could be indefinite. When power is waning, this fact can be sent to the satellite or cell phone system to alert the appropriate personnel. Since a cell phone contains a microphone, it could be trained, using an appropriate pattern recognition system, to recognize the sound of an accident or the deployment of an airbag or similar event. It thus becomes a very low cost OnStar® type telematics system.

As an alternative to using a satellite network, the cell phone network can be used in essentially the same manner when a cell phone signal is available. All of the sensors disclosed herein can either be incorporated into the portable device or placed on the vehicle and connected to the portable device when the device is attached to the vehicle. This system has a key advantage of avoiding obsolescence. With technology rapidly changing, the portable device can be exchanged for a later model or upgraded as needed or desired, keeping the overall system at the highest technical state. Existing telematics systems such as OnStar® can of course also be used with this system.

Importantly, an automatic emergency notification system can now be made available to all owners of appropriately configured cell phones, PDAs, or other similar portable devices that can operate on a very low cost basis without the need for a monthly subscription since they can be designed to operate only on an exception basis. Owners would pay only as they use the service. Stolen vehicle location, automatic notification in the event of a crash even with the transmission of a picture for camera-equipped devices is now possible. Automatic door unlocking can also be done by the device since it could transmit a signal to the vehicle, in a similar fashion as a keyless entry system, from either inside or outside the vehicle. The phone can be equipped with a biometric identification system such as fingerprint, voice print, facial or iris recognition etc. thereby giving that capability to vehicles. The device can thus become the general key to the vehicle or house, and can even open the garage door etc. If the cell phone is lost, its whereabouts can be instantly found since it has a GPS receiver and knows where it is. If it is stolen, it will become inoperable without the biometric identification from the owner.

Other communication systems will also frequently be used to connect the container with the chassis and/or the tractor and perhaps the identification of the driver or operator. Thus, information can be available on the Internet showing what tractor, what trailer, what container and what driver is operating at a particular time, at a particular GPS location, on a particular roadway, with what particular container contents. Suitable security will be provided to ensure that this information is not freely available to the general public. Redundancy can be provided to prevent the destruction or any failure of a particular site from failing the system.

This communication between the various elements of the shipping system which are co-located (truck, trailer, container, container contents, driver etc.) can be connected through a wired or wireless bus such as the CAN bus. Also, an electrical system such as disclosed in U.S. Pat. No. 5,809,437, U.S. Pat. No. 6,175,787 and U.S. Pat. No. 6,326,704 can also be used in the invention.

In many cases, it is desirable to obtain and record additional information about the cargo container and its contents. As mentioned above, the weight of the container with its contents and the distribution and changes in this weight distribution could be valuable for a safety authority investigating an accident, for highway authorities monitoring gross vehicle weight, for container owners who charge by the used capacity, and others. The environment that the container and its contents have been subjected to could also be significant information. Such things as whether the container was flooded, exposed to a spill or leakage of a hazardous material, exposed to excessive heat or cold, shocks, vibration etc. can be important historical factors for the container affecting its useful life, establishing liability for damages etc. For example, a continuous monitoring of container interior temperature could be significant for perishable cargo and for establishing liability.

With reference to FIG. 23A, in some cases, the individual cargo items 498 can be tagged with RFID or SAW tags 499 (also representing a general sensor system used to obtain data about the cargo item 498) and the presence of this cargo in the container 480 could be valuable information to the owner of the cargo. One or more sensors on the container that periodically read RFID tags could be required, such as one or more RFID interrogators 500 which periodically send a signal which will cause the RFID tags 499 to generate a responsive signal. The responsive signal generated by the RFID tags 499 will contain information about the cargo item on which the RFID tag 499 is placed. This information may be any property or condition about the contents, such as temperature, presence of one or more chemicals, pressure, a radioactivity sensor, and other types of sensors discussed elsewhere herein.

Multiple interrogators or at least multiple antennas may be required depending on the size of the container. The RFID can be based on a SAW thus providing greater range for a passive system or it can also be provided with an internal battery or ultracapacitor for even greater range. Energy harvesting can also be used if appropriate.

Similarly, for certain types of cargo, a barcode system might acceptable, or another optically readable identification code. The cargo items would have to be placed so that the identification codes are readable, i.e., when a beam of light is directed over the identification codes, a pattern of light is generated which contains information about the cargo item. As shown in FIG. 23B, the cargo items in this case are boxes having an equal height so that a space remains between the top of the boxes 501 and the ceiling of the container 480. One or more optical scanners 502, including a light transmitter and receiver, are arranged on the ceiling of the container and can be arranged to scan the upper surfaces of the boxes 503, possibly by moving the length of the container 480, or through a plurality of such sensors. During such a scan, patterns of light are reflected from the barcodes 501 on the upper surfaces of the boxes 503 and received by the optical scanner 502. The patterns of light contain information about the cargo items in the boxes 503. Receivers can be arranged at multiple locations along the ceiling. Other arrangements to ensure that a light beam traverses a barcode 501 and is received by a receiver can also be applied in accordance with the invention.

As discussed above, other tag technologies can be used if appropriate such as those based of magnetic wires.

By monitoring the data being determined using the sensors on the cargo items 498, this data can be analyzed by a processor on the cargo items 498 themselves, e.g., as part of the sensor system 499, or separate from the cargo items 498, e.g., on the container 480 (see processor 506 in FIG. 59A wherein the processor 506 is close to the RFID interrogator 500), to determine the presence of a condition which has or is likely to affect the status or health of the cargo items 498 has occurred or is forecast to occur. That is, the processor 506 determines whether there is a problem with the cargo items 498 or a potential problem. As an example, one problem is when a motion sensor is part of the sensor system 499 and motion of the cargo item 498 is analyzed relative to motion of the container 480, and the processor 506 determines that the cargo item is moving considerably more than the container 480, which situation could be indicative of the cargo item 498 not being properly restrained and thus liable to fall over and cause damage to the cargo item 498. Analysis of data obtained by the sensor systems 491 to determine the existence or potential for a problem with the cargo item 498 may involve use of pattern recognition technologies, such as a trained neural network.

The communication system 485 may be programmed to transmit a message to a remote facility only when the processor determines the presence of a problem or potential problem with one or more cargo items 498. This would conserve energy. Additionally, or alternatively, the sensor systems 491 could be designed to trigger to obtain data about the cargo item 498 when a door of the asset is closed after having been opened, a change in light in the interior of the container 480 is detected, based on a predetermined or variable initiation time being regulated by an initiation device, motion of the container 480 or change in motion of the container 480 is detected, vibration of the container 480 is detected, and a predetermined internal or external event occurs which warrants obtaining data about the contents in view of the possibility of a change in the status or health of the contents. In one embodiment, the sensor systems 491 on the cargo items 498 can be triggered to obtained data from the remote facility via the communication system 485, or from personnel on or about the vehicle on which the container 480 is situated.

When sensors are placed on each cargo item 498, the sensors are coupled to the communication system 485 and the location determining system 486 using wires or wirelessly or a combination of both. If needed, a peer-to-peer and/or a mesh network can be integrated into the asset, i.e., the frame thereof, to enable all sensors on cargo items 498 arranged in the interior of the asset to communicate with the communication system 485. This would most likely be applicable for large ships, trains and airplanes.

The ability to read barcodes and RFID tags provides the capability of the more closely tracking of packages for such organizations as UPS, Federal Express, the U.S. Postal Service and their customers. Now, in some cases, the company can ascertain that a given package is in fact on a particular truck or cargo transporter and also know the exact location of the transporter.

Frequently, a trailer or container has certain hardware such as racks for automotive parts, for example, that are required to stay with the container. During unloading of the cargo these racks, or other sub-containers, could be removed from the container and not returned. If the container system knows to check for the existence of these racks, then this error can be eliminated. Frequently, the racks are of greater value then the cargo they transport. Using RFID tags and a simple interrogator mounted on the ceiling of the container perhaps near the entrance, enables monitoring of parts that are taken in or are removed from the container and associated with the location of container. By this method, pilferage of valuable or dangerous cargo can at least be tracked.

Containers constructed in accordance with the invention will frequently have a direct method of transmitting information to a satellite. Typically, the contents of the container are more valuable than the truck or chassis for the case of when the container is not a trailer. If the tractor, train, plane or ship that is transporting the container is experiencing difficulties, then this information can be transmitted to the satellite system and thus to the container, carrier, or cargo owner or agent for attention. Information indicating a problem with carrier (railroad, tractor, plane, boat) may be sensed and reported onto a bus such as CAN bus which can be attached either wirelessly or by wires to the container. Alternately, sensors on the container can determine through vibrations etc. that the carrier may be experiencing problems. The reporting of problems with the vehicle can come from dedicated sensors or from a general diagnostic system such as described in U.S. Pat. No. 5,809,437 and U.S. Pat. No. 6,175,787, and herein. Whatever the source of the diagnostic information, especially when valuable or dangerous cargo is involved, this information in coded form can be transmitted to a ground station, LEO or geostationary satellite as discussed above. Other information that can be recorded by container includes the identification of the boat, railroad car, or tractor and operator or driver.

The experiences of the container can be recorded over time as a container history record to help in life cycle analysis to determine when a container needs refurbishing, for example. This history in coded form could reside on a memory that is resident on the container or preferably the information can be stored on a computer file associated with that container in a database. The mere knowledge of where a container has been, for example, may aid law enforcement authorities to determine which containers are most likely to contain illegal contraband.

The pertinent information relative to a container can be stored on a tag that is associated and physically connected to the container. This tag may be of the type that can be interrogated remotely to retrieve its contents. Such a tag, for example, could contain information as to when and where the container was most recently opened and the contents of the container. Thus, as containers enter a port, their tags can each be interrogated to determine their expected contents and also to give a warning for those containers that should be inspected more thoroughly. In most cases, the tag information will not reside on the container but in fact will be on a computer file accessible by those who have an authorization to interrogate the file. Thus, the container need only have a unique identification number that cannot easily be destroyed, changed or otherwise tampered with. These can be visual and painted on the outside of the container or an RFID, barcode or other object identification system can be used. Again, the tags can be based on passive SAW technology to give greater range or could contain a battery or ultracapacitor for even greater range. The tag can be in a sleep mode until receiving a wakeup call to further conserve battery power.

Figure 24:
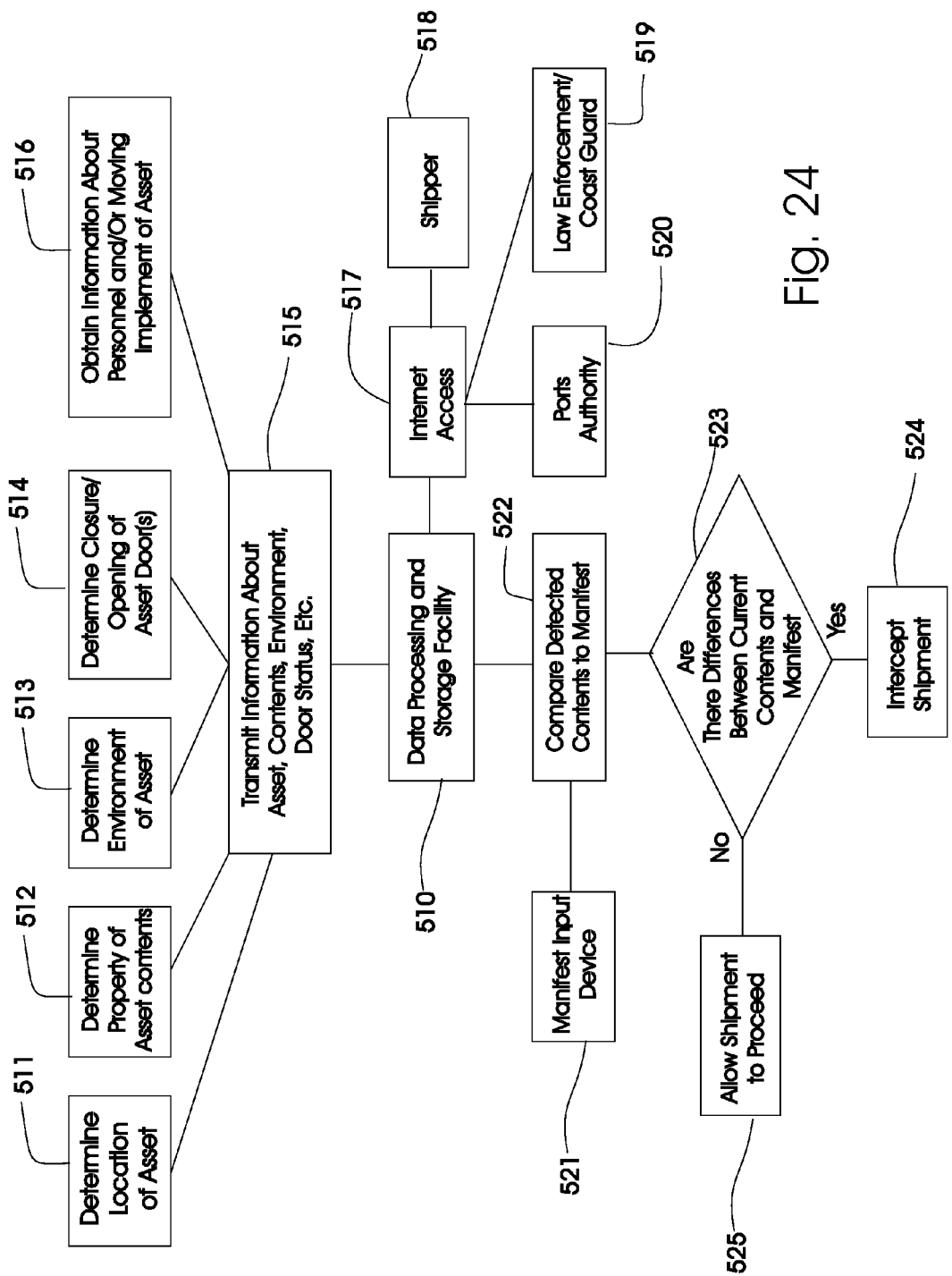
FIG. 24 is a flow chart showing one manner in which multiple assets are monitored in accordance with the invention.

FIG. 24 shows a flow chart of the manner in which multiple assets may be monitored using a data processing and storage facility 510, each asset having a unique identification code. The location of each asset is determined at 511, along with one or more properties or characteristics of the contents of each asset at 512, one or more properties of the environment of each asset at 513, and/or the opening and/or closing of the doors of each asset at 514. This information is transmitted to the data processing and storage facility 510 as represented by 515 with the identification code. Information about the implement being used to transport the asset and the individual(s) or company or companies involved in the transport of the asset can also be transmitted to the facility as represented by 516. This latter information could be entered by an input device attached to the asset.

The data processing and storage facility 510 is connected to the Internet at 517 to enable shippers 518 to check the location and progress of the asset, the contents of the asset, the environment of the asset, whether the doors are being opened and closed impermissibly and the individual and companies handling the asset. The same information, or a subset of this information, can also be accessed by law enforcement personnel at 519 and maritime/port authorities at 520. Different entities can be authorized to access different items of information or subsets of the total information available relating to each asset.

For anti-theft purposes, the shipper enters the manifest of the asset using an input device 521 so that the manifest can be compared to the contents of the asset (at 522). A determination is made at 523 as to whether there are any differences between the current contents of the asset and the manifest. For example, the manifest might indicate the presence of contents whereas the information transmitted by the asset reveals that it does not contain any objects. When such a discrepancy is revealed, the shipment can be intercepted at 524 to ascertain the whereabouts of the cargo. The history of the travels of the asset would also be present in the data facility 510 so that it can be readily ascertained where the cargo disappeared. If no discrepancy is revealed, the asset is allowed to proceed at 525.

Having the ability to transmit coded information to a satellite, or other telematics system, using a low cost device having a battery that lasts for many years opens up many other, previously impractical opportunities. Many of these opportunities are discussed above and below and all are teachings of at least one of the inventions disclosed herein. In this section, opportunities related to monitoring the environment in the vicinity of the container will be discussed. Many types of sensors can be used for the purpose of exterior monitoring including ultrasound, imagers such as cameras both with and without illumination including visual, infrared or ultraviolet imagers, radar, scanners including laser radar and phased array radar, other types of sensors which sense other parts of the electromagnetic spectrum, capacitive sensors, electric or magnetic field sensors, and chemical sensors among others.

Cameras either with or without a source of illumination can be used to record people approaching the container and perhaps stealing the contents of the container. At the appropriate frequencies, (tetra Hertz, for example) the presence of concealed weapons can be ascertained as described in Alien Vision: Exploring the Electromagnetic Spectrum With Imaging Technology (SPIE Monograph Vol. PM104) by Austin Richards. Infrared sensors can be used to detect the presence of animal life including humans in the vicinity of container. Radio frequency sensors can sense the presence of authorized personnel having a keyless entry type transmitter or a SAW, RFID or similar device of the proper design. In this way, the container can be locked as a safe, for example, and only permit an authorized person carrying the proper identification to open the container or other storage facility.

A pattern recognition system can be trained to identify facial or iris patterns, for example, of authorized personnel or ascertain the identity of authorized personnel to prevent theft of the container. Such a pattern recognition system can operate on the images obtained by the cameras. That is, if the pattern recognition system is a neural network, it would be trained to identify or ascertain the identity of authorized personnel based on images of such personnel during a training phase and thus operationally only allow such personnel to open the container, enter the container and/or handle the container.

A wide variety of smart cards, biometric identification systems (such as fingerprints, voice prints and Iris scans) can be used for the same purpose. When an unauthorized person approaches the container, his or her picture can be taken and in particular, if sensors determine that someone is attempting to force entry into the container, that person's picture can be relayed via the communication system to the proper authorities. Cameras with a proper pattern recognition system can also be used to identify if an approaching person is wearing a disguise such as a ski mask or is otherwise acting in a suspicious manner. This determination can provide a critical timely warning and in some cases permit an alarm to be sounded or otherwise notify the proper authorities.

Capacitance sensors or magnetic sensors can be used to ascertain that the container is properly attached to a trailer. An RFID or barcode scanner on the container can be used to record the identification of the tractor, trailer, or other element of the transportation system. These are just a small sampling of the additional sensors that can be used with the container or even mounted on a tractor or chassis to monitor the container. With the teachings of at least one of the inventions disclosed herein, the output of any of these sensors can now be transmitted to a remote facility using a variety of telematics methods including communication via a low power link to a satellite, such as provided by the Skybitz Corporation as described above and others.

Thus, as mentioned above, many new opportunities now exist for applying a wide variety of sensors to a cargo container or other object as discussed above and below. Through a communication system such as a LEO or geostationary or other satellite system, critical information about the environment of container or changes in that environment can be transmitted to the container owner, law enforcement authorities, container contents owner etc. Furthermore, the system is generally low cost and does not require connection to an external source of power. The system generally uses low power from a battery that can last for years without maintenance, Many of the sensor systems described above output data that can best be analyzed using pattern recognition systems such as neural networks, cellular neural networks, fuzzy logic, sensor fusion, modular neural networks, combination neural networks, support vector machines, neural fuzzy systems or other classifiers that convert the pattern data into an output indicative of the class of the object or event being sensed. One interesting method, for example, is the ZISC® chip system of Silicon Recognition Inc., Petaluna, Calif. A general requirement for the low power satellite monitoring system is that the amount of data routinely sent to the satellite be kept to a minimum. For most transmissions, this information will involve the location of the container, for example, plus a few additional bytes of status information determined by the mission of the particular container and its contents. Thus, the pattern recognition algorithms must convert typically a complex image or other data to a few bytes representative of the class of the monitored item or event.

In some instances, the container must send considerably more data and at a more frequent interval than normal. This will generally happen only during an exceptional situation or event and when the added battery drain of this activity is justified. In this case, the system will signal the satellite that an exception situation exists and to prepare to receive additional information.

Many of the sensors on the container and inside the container may also require significant energy and thus should be used sparingly. For example, if the container is known to be empty and the doors closed, there is no need to monitor the interior of the container unless the doors have been reopened. Similarly, if the container is stationary and doors are closed, then continuously monitoring the interior of the container to determine the presence of cargo is unnecessary. Thus, each of the sensors can have a program duty cycle that depends on exterior or other events. In some applications either solar power or other source of power may be available either intermittently to charge the battery or continuously.

If the vehicle such as a container is stationary then usually the monitoring can take place infrequently and the battery is conserved. When the vehicle is in motion then energy is frequently available to charge the battery and thus more frequent monitoring can take place as the battery is charged. The technique in known as "energy harvesting" and involves, for example, the use of a piezoelectric material that is compressed, bent or otherwise flexed thereby creating an electric current that can be used to charge the battery. Other methods include the use of a magnet and coil where the magnet moves relative to the coil under forces caused by the motion of the vehicle.

Since the duty cycle of the sensor system may vary considerably, and since any of the sensors can fail, be sabotaged or otherwise be rendered incapable of performing its intended function either from time, exposure, or intentionally, it is expected that some or all of the sensors will be equipped with a diagnostic capability. The communication system will generally interrogate each sensor or merely expect a transmission from each sensor and if that interrogation or transmission fails or a diagnostic error occurs, this fact will be communicated to the appropriate facility. If, for example, someone attempts to cover the lens of a camera so that a theft would not be detected, the mere fact that the lens was covered could be reported, alerting authorities that something unusual was occurring.

As mentioned previously, there are times when the value of the contents of a container can exceed the value of the tractor, chassis and container itself. Additionally, there are times when the contents of the container can be easily damaged if subjected to unreasonable vibrations, angles, accelerations and shocks. For these situations, an inertial measurement unit (IMU) can be used in conjunction with the container to monitor the accelerations experienced by the container (or the cargo) and to issue a warning if those accelerations are deemed excessive either in magnitude, duration, or frequency or where the integrations of these accelerations indicate an excessive velocity, angular velocity or angular displacement. Note that for some applications in order to minimize the power expended at the sensor installation, the IMU correction calculations based on the GPS can be done at an off sensor location such as the receiving station of the satellite information.

If the vehicle operates on a road that has previously been accurately mapped, to an accuracy of perhaps a few centimeters, then the analysis system can know the input from the road to the vehicle tires and thus to the chassis of the trailer. The IMU can also calculate the velocity of the trailer. By monitoring the motion of the container when subjected to a known stimulus, the road, the inertial properties of the container and chassis system can be estimated. If these inertial properties are known than a safe operating speed limit can be determined such that the probability of rollover, for example, is kept within reasonable bounds. If the driver exceeds that velocity, then a warning can be issued. Similarly, in some cases, the traction of the trailer wheels on the roadway can be estimated based on the tendency of a trailer to skid sideways. This also can be the basis of issuing a warning to the driver and to notify the contents owner especially if the vehicle is being operated in an unsafe manner for the road or weather conditions. Since the information system can also know the weather conditions in the area where the vehicle is operating, this added information can aid in the safe driving and safe speed limit determination. In some cases, the vibrations caused by a failing tire can also be determined. For those cases where radio frequency tire monitors are present, the container can also monitor the tire pressure and determine when a dangerous situation exists. Finally, the vehicle system can input to the overall system when the road is covered with ice or when it encounters a pothole.

Thus, there are many safety related aspects to having sensors mounted on a container and where those sensors can communicate periodically with a LEO or other satellite, or other communication system, and thereafter to the Internet or directly to the appropriate facility. Some of these rely on an accurate IMU. Although low cost IMUs are generally not very accurate, when they are combined using a Kalman filter with the GPS system, which is on the container as part of the tracking system, the accuracy of the IMU can be greatly improved, approaching that of military grade systems.

The discussion above has concentrated on containers that contain cargo where presumably this cargo is shipped from one company or organization to another. This cargo could be automotive parts, animals, furniture, weapons, bulk commodities, machinery, fruits, vegetables, TV sets, or any other commonly shipped product. What has been described above is a monitoring system for tracking this cargo and making measurements to inform the interested parties (owners, law enforcement personnel etc.) of the status of the container, its contents, and the environment. This becomes practical when a satellite system exists such as the Skybitz, for example, LEO or geostationary satellite system coupled with a low cost low power small GPS receiver and communication device capable of sending information periodically to the satellite. Once the satellite has received the position information from the container, for example, this information can be relayed to a computer system wherein the exact location of the container can be ascertained. Additionally, if the container has an RFID reader, the location of all packages having an RFID tag that are located within the container can also be ascertained.

The accuracy of this determination is currently now approximately 20 meters. However, as now disclosed for the first time, the ionosphere caused errors in GPS signals received by container receiver can be determined from a variety of differential GPS systems and that information can be coupled with the information from the container to determine a precise location of the container to perhaps as accurate as a few centimeters. This calculation can be done at any facility that has access to the relevant DGPS corrections and the container location. It need not be done onboard the container. Using accurate digital maps the location of the container on the earth can be extremely precisely determined. This principle can now be used for other location determining purposes. The data processing facility that receives the information from the asset via satellites can also know the DGPS corrections at the asset location and thus can relay to the vehicle its precise location.

Although the discussion above has centered on cargo transportation as an illustrative example, at least one of the inventions disclosed herein is not limited thereto and in fact can be used with any asset whether movable or fixed where monitoring for any of a variety of reasons is desired. These reasons include environmental monitoring, for example, where asset damage can occur if the temperature, humidity, or other atmospheric phenomena exceeds a certain level. Such a device then could transmit to the telecommunications system when this exception situation occurred. It still could transmit to the system periodically, perhaps once a day, just to indicate that all is OK and that an exceptional situation did not occur.

Another example could be the monitoring of a vacation home during the months when the home is not occupied. Of course, any home could be so monitored even when the occupants leave the home unattended for a party, for example. The monitoring system could determine whether the house is on fire, being burglarized, or whether temperature is dropping to the point that pipes could freeze due to a furnace or power failure. Such a system could be less expensive to install and maintain by a homeowner, for example, than systems supplied by ADT, for example. Monitoring of a real estate location could also be applied to industrial, governmental and any other similar sites. Any of the sensors including electromagnetic, cameras, ultrasound, capacitive, chemical, moisture, radiation, biological, temperature, pressure, radiation, etc. could be attached to such a system which would not require any other electrical connection either to a power source or to a communication source such as a telephone line which is currently require by ADT, for example. In fact, most currently installed security and fire systems require both a phone and a power connection. If a power source is available, it can be used to recharge the batteries or as primary power.

Of particular importance, this system and techniques can be applied to general aviation and the marine community for the monitoring of flight and boat routings. For general aviation, this or a similar system can be used for monitoring the unauthorized approach of planes or boats to public utilities, government buildings, bridges or any other structure and thereby warn of possible terrorist activities.

Portable versions of this system can also be used to monitor living objects such as pets, children, animals, cars, and trucks, or any other asset. What is disclosed herein therefore is a truly general asset monitoring system where the type of monitoring is only limited by requirement that the sensors operate under low power and the device does not require connections to a power source, other than the internal battery, or a wired source of communication. The communication link is generally expected to be via a transmitter and a LEO, geostationary or other satellite, however, it need not be the case and communication can be by cell phone, an ad hoc peer-to-peer network, IEEE 801.11, Bluetooth, or any other wireless system. Thus, using the teachings of at least one of the inventions disclosed herein, any asset can be monitored by any of a large variety of sensors and the information communicated wireless to another location which can be a central station, a peer-to-peer network, a link to the owners location, or, preferably, to the Internet.

Additional areas where the principles of the invention can be used for monitoring other objects include the monitoring of electric fields around wires to know when the wires have failed or been cut, the monitoring of vibrations in train rails to know that a train is coming and to enable tracking of the path of trains, the monitoring of vibrations in a road to know that a vehicle is passing, the monitoring of temperature and/or humidity of a road to signal freezing conditions so that a warning could be posted to passing motorists about the conditions of the road, the monitoring of vibrations or flow in a oil pipe to know if the flow of oil has stopped or being diverted so that a determination may be made if the oil is being stolen, the monitoring of infrared or low power (MIR) radar signal monitoring for perimeter security, the monitoring of animals and/or traffic to warn animals that a vehicle is approaching to eliminate car to animal accidents and the monitoring of fluid levels in tanks or reservoirs. It is also possible to monitor grain levels in storage bins, pressure in tanks, chemicals in water or air that could signal a terrorist attack, a pollution spill or the like, carbon monoxide in a garage or tunnel, temperature or vibration of remote equipment as a diagnostic of pending system failure, smoke and fire detectors and radiation. In each case, one or more sensors is provided designed to perform the appropriate, desired sensing, measuring or detecting function and a communications unit is coupled to the sensor(s) to enable transmission of the information obtained by the sensor(s). A processor can be provided to control the sensing function, i.e., to enable only periodic sensing or sensing conditioned on external or internal events. For each of these and many other applications, a signal can be sent to a satellite or other telematics system to send important information to a need-to-know person, monitoring computer program, the Internet etc.

Three other applications of at least one of the inventions disclosed herein need particular mention. Periodically, a boat or barge impacts with the structure of a bridge resulting in the collapse of a road, railroad or highway and usually multiple fatalities. Usually such an event can be sensed prior to the collapse of the structure by monitoring the accelerations, vibrations, displacement, or stresses in the structural members. When such an event is sensed, a message can be sent to a satellite and/or forwarded to the Internet, and thus to the authorities and to a warning sign or signal that has been placed at a location preceding entry onto the bridge. Alternately, the sensing device can send a signal directly to the relevant sign either in addition or instead of to a satellite.

Sometimes the movement of a potentially hazardous cargo in itself is not significantly unless multiple such movements follow a pattern. For example, the shipment of moderate amounts of explosives forwarded to a single location could signify an attack by terrorists. By comparing the motion of containers of hazardous materials and searching for patterns, perhaps using neural networks, fuzzy logic and the like, such concentrations of hazardous material can be forecasted prior to the occurrence of a disastrous event. This information can be gleaned from the total picture of movements of containers throughout a local, state or national area. Similarly, the movement of fuel oil and fertilizer by itself is usually not noteworthy but in combination using different vehicles can signal a potential terrorist attack.

Many automobile owners subscribe to a telematics service such as OnStar®. The majority of these owners when queried say that they subscribe so that if they have an accident and the airbag deploys, the EMS personnel will be promptly alerted. This is the most commonly desired feature by such owners. A second highly desired feature relates to car theft. If a vehicle is stolen, the telematics services can track that vehicle and inform the authorities as to its whereabouts. A third highly desired feature is a method for calling for assistance in any emergency such as the vehicle becomes stalled, is hijacked, runs off the road into a snow bank or other similar event. The biggest negative feature of the telematics services such as OnStar® is the high monthly cost of the service.

The invention described here can provide the three above-mentioned highly desired services without requiring a high monthly fee. A simple device that communicates to a satellite or other telematics system can be provided, as described above, that operates either on its own battery and/or by connecting to the cigarette lighter or similar power source. The device can be provided with a microphone and neural network algorithm that has been trained to recognize the noise signature of an airbag deployment or the information that a crash transpired can be obtained from an accelerometer. Thus, if the vehicle is in an accident, the EMS authorities can be immediately notified of the crash along with the precise location of the vehicle. Similarly, if the vehicle is stolen, its exact whereabouts can be determined through an Internet connection, for example. Finally, a discrete button placed in the vehicle can send a panic signal to the authorities via a telematics system. Thus, instead of a high monthly charge, the vehicle owner would only be charged for each individual transmission, which can be as low as $0.20 or a small surcharge can be added to the price of the device to cover such costs through averaging over many users. Such a system can be readily retrofitted to existing vehicles providing most of advantages of the OnStar® system, for example, at a very small fraction of its cost. The system can reside in a "sleep" mode for many years until some event wakes it up. In the sleep mode, only a few microamperes of current are drawn and the battery can last the life of the vehicle. A wake-up can be achieved when the airbag fires and the microphone emits a current. Similarly, a piezo-generator can be used to wake up the system based on the movement of a mass or diaphragm displacing a piezoelectric device which then outputs some electrical energy that can be sensed by the system electronics. Similarly, the system can be caused to wake up by a clock or the reception of a proper code from an antenna. Such a generator can also be used to charge the system battery extending its useful life. Such an OnStar®-like system can be manufactured for approximately $100, depending on production volume and features.

The invention described above can be used in any of its forms to monitor fluids. For example, sensors can be provided to monitor fuel or oil reservoirs, tanks or pipelines and spills. Sensors can be arranged in, on, within, in connection with or proximate a reservoir, tank or pipeline and powered in the manner discussed above, and coupled to a communication system as discussed above. When a property of characteristic of the environment is detected by the sensor, for example, detection of a fluid where none is supposed to be (which could be indicative of a spill), the sensor can trigger a communication system to transmit information about the detection of the fluid to a remote site which could send response personnel, i.e., clean-up personnel. The sensors can be designed to detect any variables which could provide meaningful information, such as a flow sensor which could detect variations in flow, or a chemical sensor which could detect the presence of a harmful chemical, biological agent or a radiation sensor which could detect the presence of radioactivity. Appropriate action could be taken in response to the detection of chemicals or radioactivity.

Remote water monitoring is also contemplated in the invention since water supplies are potentially subject to sabotage, e.g., by the placement of harmful chemicals or biological agents in the water supply. In this case, sensors would be arranged in, on, within, in connection with or proximate water reservoirs, tanks or pipelines and powered in the manner discussed above, and coupled to a communication system as discussed above. Information provided by the sensors is periodically communicated to a remote site at which it is monitored. If a sensor detects the presence of a harmful chemical or agent, appropriate action can be taken to stop the flow of water from the reservoir to municipal systems.

Even the pollution of the ocean and other large bodies of water especially in the vicinity of a shore can now be monitored for oil spills and other occurrences.

Similarly, remote air monitoring is contemplated within the scope of the invention. Sensors are arranged at sites to monitor the air and detect, for example, the presence of radioactivity and bacteria. The sensors can send the information to a communication system which transmits the information to a remote site for monitoring. Detection of aberrations in the information from the sensors can lead to initiation of an appropriate response, e.g., evacuation in the event of radioactivity detection.

The monitoring of forests for fires is also a possibility with the present invention, although satellite imaging systems are the preferred approach.

An additional application is the monitoring of borders such as the on between the United States and Mexico. Sensors can be placed periodically along such a border at least partially in the ground that are sensitive to vibrations, infrared radiation, sound or other disturbances. Such sensor systems can also contain a pattern recognition system that is trained to recognize characteristic signals indicating the passing of a person or vehicle. When such a disturbance occurs, the system can "wake-up" and receive and analyze the signal and if it is recognized, a transmission to a communication system can occur. Since the transmission would also contain either a location or an identification number of the device, the authorities would know where the border infraction was occurring.

Above, the discussion of the invention has included the use of a location determining signal such as from a GPS or other location determining system such as the use of time of arrival calculations from receptions from a plurality of cell phone antennas. If the device is located in a fixed place where it is unlikely to move, then the location of that place need only be determined once when the sensor system is put in place. The identification number of the device can then be associated with the device location in a database, for example. Thereafter, just the transmission of the device ID can be used to positively identify the device as well as its location. Even for movable cargo containers, for example, if the container has not moved since the last transmission, there is no need to expend energy receiving and processing the GPS or other location determining signals. If the device merely responds with its identification number, the receiving facility knows its location. The GPS processing circuitry can be reactivated if sensors on the asset determine that the asset has moved.

Once the satellite or other communication system has received a message from the sensor system of at least one of the inventions disclosed herein, it can either store the information into a database or, more commonly, it can retransmit or make available the data usually on the Internet where subscribers can retrieve the data and use it for their own purposes. Since such sensor systems are novel to at least one of the inventions disclosed herein, the transmission of the data via the Internet and the business model of providing such data to subscribing customers either on an as-needed bases or on a push basis where the customer receives an alert is also novel. Thus, for example, a customer may receive an urgent automatically-generated e-mail message or even a pop-up message on a particular screen that there is a problem with a particular asset that needs immediate attention. The customer can be a subscriber, a law enforcement facility, or an emergency services facility, among others.

An additional dimension exists with the use of the Skybitz system, for example, where the asset mounted device has further wireless communications with other devices in or on the asset. The fact that certain tagged items within or on the assets can be verified if a local area network exists between the Skybitz device and other objects. Perhaps it is desired to check that a particular piece of test equipment is located within an asset. Further perhaps it is desired to determine that the piece of equipment is operating or operating within certain parameter ranges, or has a particular temperature etc. Perhaps it is desired to determine whether a particular set of keys are in a key box wherein the keys are fitted with an RFID tag and the box with a reader and method of communicating with the Skybitz device. The possibilities are endless for determining the presence or operating parameters of a component of occupying item of a remote asset and to periodically communicate this information to an internet site, for example, using a low power asset monitoring system such as the Skybitz system.

The Skybitz or similar system can be used with cell phones to provide a location determination in satisfaction to US Federal regulations. The advantage of this use of Skybitz is that it is available world wide and does not require special equipment at the cell phone station. This also permits an owner of a cell phone to determine its whereabouts for cases where it was lost or stolen. A similar system can be added to PDAs or other CD players, radios, or any other electronic device that a human may carry. Even non electronic devices such as car keys could be outfitted with a Skybitz type device. It is unlikely that such a device would have a 10 year life but many of them have batteries that are periodically charged and the others could have a very low duty cycle such that they last up to one year without replacement of the battery and then inform the owner that the battery is low. This information process could even involve the sending of an email message to the owner's email stating the location of the device and the fact that the battery needs replacement.

Some of the inventions herein relate generally to telematics and the transmission of information from a vehicle to one or more remote sites which can react to the position or status of the vehicle and/or occupant(s) or contents therein.

Initially, sensing of the occupancy of the vehicle and the optional transmission of this information, which may include images, to remote locations will be discussed. This entails obtaining information from various sensors about the occupants in the passenger compartment of the vehicle, for example, e.g., the number of occupants, their type and their motion, if any. Then, the concept of a low cost automatic crash notification system will be discussed. Next, a diversion into improvements in cell phones will be discussed followed by a discussion of trapped children and how telematics can help save their lives. Finally, the use of telematics with non-automotive vehicles will round out this section.

The use of telematics is included with a discussion of general vehicle diagnostic methods with the diagnosis being transmittable via a communications device to the remote locations is discussed in the parent '363 application. The diagnostics section includes an extensive discussion of various sensors for use on the vehicle to sense different operating parameters and conditions of the vehicle is provided. All of the sensors discussed herein can be coupled to a communications device enabling transmission of data, signals and/or images to the remote locations, and reception of the same from the remote locations. Many transmission modes exist including cellular phone systems, satellite communications and the Internet. The Internet systems can be broken into two types, those that are available only at particular "hot-spots" and the use of ubiquitous internet. The use of ubiquitous internet is believed to be unique to the inventions herein as the inventor may have been the first to recognize that ubiquitous internet would become available and can be counted on to provide the sole system for communication from various vehicles including automobiles, trucks and truck trailers, storage tanks and shipping containers replacing all other communication systems. Their vision is now being realized through such systems as WiMAX.

The cellular phone system, ubiquitous internet, or other telematics communication device, is shown schematically in FIG. 2 of the parent '363 application and outputs to an antenna. The phone system or telematics communication device 34 can be coupled to the vehicle interior monitoring system in accordance with any of the embodiments disclosed herein and serves to establish a communications channel with one or more remote assistance facilities, such as an EMS facility or dispatch facility from which emergency response personnel are dispatched. The telematics system can also be a satellite-based system such as provided by Skybitz.

In the event of an accident, the electronic system associated with the telematics system interrogates the various interior monitoring system memories in processor 20 and can arrive at a count of the number of occupants in the vehicle, if each seat is monitored, and, in more sophisticated systems, even makes a determination as to whether each occupant was wearing a seatbelt and if he or she is moving after the accident, and/or the health state of one or more of the occupants as described above, for example. The telematics communication system then automatically notifies an EMS operator (such as 911, OnStar® or equivalent) and the information obtained from the interior monitoring systems is forwarded so that a determination can be made as to the number of ambulances and other equipment to send to the accident site. Vehicles having the capability of notifying EMS in the event one or more airbags deployed are now in service but are not believed to use any of the innovative interior monitoring systems described herein. Such vehicles will also have a system, such as the global positioning system, which permits the vehicle to determine its location and to forward this information to the EMS operator.

In relation to this aspect, see the discussion above of the schematic shown in FIG. 61 of the parent '363 application.

Once an occupying item has been located in a vehicle, or any object outside of the vehicle, the identification or categorization information along with an image, including an IR or multispectral image, or icon of the object can be sent via a telematics channel to a remote location. A passing vehicle, for example, can send a picture of an accident or a system in a vehicle that has had an accident can send an image of the occupant(s) of the vehicle to aid in injury assessment by the EMS team.

Although in most if not all of the embodiments described above, it has been assumed that the transmission of images or other data from the vehicle to the EMS or other off-vehicle (remote) site is initiated by the vehicle, this may not always be the case and in some embodiments, provision is made for the off-vehicle site to initiate the acquisition and/or transmission of data including images from the vehicle. Thus, for example, once an EMS operator knows that there has been an accident, he or she can send a command to the vehicle to control components in the vehicle to cause the components send images and other data so that the situation can be monitored by the operator or other person. The capability to receive and initiate such transmissions can also be provided in an emergency vehicle such as a police car or ambulance. In this manner, for a stolen vehicle situation, the police officer, for example, can continue to monitor the interior of the stolen vehicle.

FIG. 26 shows a schematic of the integration of the occupant sensing with a telematics link and the vehicle diagnosis with a telematics link. As envisioned, the occupant sensing system 600 includes those components which determine the presence, position, health state, and other information relating to the occupants, for example the transducers discussed with reference to FIGS. 1, 2 and 61 of the parent '363 application and the SAW device discussed with reference to FIG. 62 of the '363 application. Information relating to the occupants includes information as to what the driver is doing, talking on the phone, communicating with OnStar® or other route guidance, listening to the radio, sleeping, drunk, drugged, having a heart attack The occupant sensing system may also be any of those systems and apparatus described in the current assignee's patents and patent applications or any other comparable occupant sensing system which performs any or all of the same functions as they relate to occupant sensing. Examples of sensors which might be installed on a vehicle and constitute the occupant sensing system include heartbeat sensors, motion sensors, weight sensors, microphones and optical sensors.

A crash sensor system 591 is provided and determines when the vehicle experiences a crash. This crash sensor may be part of the occupant restraint system or independent from it. Crash sensor system 591 may include any type of crash sensors, including one or more crash sensors of the same or different types.

Vehicle sensors 592 include sensors which detect the operating conditions of the vehicle such as those sensors discussed with reference to FIGS. 136-141 of the '881 application. Also included are tire sensors such as disclosed in U.S. Pat. No. 6,662,642. Other examples include velocity and acceleration sensors, and angle and angular rate pitch, roll and yaw sensors. Of particular importance are sensors that tell what the car is doing: speed, skidding, sliding, location, communicating with other cars or the infrastructure, etc.

Environment sensors 593 includes sensors which provide data to the operating environment of the vehicle, e.g., the inside and outside temperatures, the time of day, the location of the sun and lights, the locations of other vehicles, rain, snow, sleet, visibility (fog), general road condition information, pot holes, ice, snow cover, road visibility, assessment of traffic, video pictures of an accident, etc. Possible sensors include optical sensors which obtain images of the environment surrounding the vehicle, blind spot detectors which provides data on the blind spot of the driver, automatic cruise control sensors that can provide images of vehicles in front of the host vehicle, various radar devices which provide the position of other vehicles and objects relative to the subject vehicle.

The occupant sensing system 600, crash sensors 591, vehicle sensors 592, environment sensors 593 and all other sensors listed herein can be coupled to a communications device 594 which may contain a memory unit and appropriate electrical hardware to communicate with the sensors, process data from the sensors, and transmit data from the sensors. The memory unit would be useful to store data from the sensors, updated periodically, so that such information could be transmitted at set time intervals.

The communications device 594 can be designed to transmit information to any number of different types of facilities. For example, the communications device 594 would be designed to transmit information to an emergency response facility 595 in the event of an accident involving the vehicle. The transmission of the information could be triggered by a signal from a crash sensor 591 that the vehicle was experiencing a crash or experienced a crash. The information transmitted could come from the occupant sensing system 600 so that the emergency response could be tailored to the status of the occupants. For example, if the vehicle was determined to have ten occupants, multiple ambulances might be sent. Also, if the occupants are determined not be breathing, then a higher priority call with living survivors might receive assistance first. As such, the information from the occupant sensing system 600 would be used to prioritize the duties of the emergency response personnel.

Information from the vehicle sensors 592 and environment sensors 593 can also be transmitted to law enforcement authorities 597 in the event of an accident so that the cause(s) of the accident could be determined. Such information can also include information from the occupant sensing system 600, which might reveal that the driver was talking on the phone, putting on make-up, or another distracting activity, information from the vehicle sensors 592 which might reveal a problem with the vehicle, and information from the environment sensors 593 which might reveal the existence of slippery roads, dense fog and the like.

Information from the occupant sensing system 600, vehicle sensors 592 and environment sensors 593 can also be transmitted to the vehicle manufacturer 598 in the event of an accident so that a determination can be made as to whether failure of a component of the vehicle caused or contributed to the cause of the accident. For example, the vehicle sensors might determine that the tire pressure was too low so that advice can be disseminated to avoid maintaining the tire pressure too low in order to avoid an accident. Information from the vehicle sensors 592 relating to component failure could be transmitted to a dealer/repair facility 596 which could schedule maintenance to correct the problem.

The communications device 594 can be designed to transmit particular information to each site, i.e., only information important to be considered by the personnel at that site. For example, the emergency response personnel have no need for the fact that the tire pressure was too low but such information is important to the law enforcement authorities 597 (for the possible purpose of issuing a recall of the tire and/or vehicle) and the vehicle manufacturer 598.

In one exemplifying use of the system shown in FIG. 26, the operator at the remote facility 595 could be notified when the vehicle experiences a crash, as detected by the crash sensor system 591 and transmitted to the remote facility 595 via the communications device 594. In this case, if the vehicle occupants are unable to, or do not, initiate communications with the remote facility 595, the operator would be able to receive information from the occupant sensing system 600, as well as the vehicle sensors 592 and environmental sensors 593. The operator could then direct the appropriate emergency response personnel to the vehicle. The communications device 594 could thus be designed to automatically establish the communications channel with the remote facility when the crash sensor system 591 determines that the vehicle has experienced a crash.

The communications device 594 can be a cellular phone, OnStar® or other subscriber-based telematics system, a peer-to-peer vehicle communication system that eventually communicates to the infrastructure and then, perhaps, to the Internet with e-mail to the dealer, manufacturer, vehicle owner, law enforcement authorities or others. It can also be a vehicle to LEO or Geostationary satellite system such as Skybitz which can then forward the information to the appropriate facility either directly or through the Internet. It can also be directly to a ubiquitous internet system such as WiMAX.

The communication may need to be secret so as not to violate the privacy of the occupants and thus encrypted communication may in many cases be required. Other innovations described herein include the transmission of any video data from a vehicle to another vehicle or to a facility remote from the vehicle by any means such as a telematics communication system such as OnStar®, a cellular phone system, a communication via GEO, geocentric or other satellite system and any communication that communicates the results of a pattern recognition system analysis. Also, any communication from a vehicle that combines sensor information with location information is anticipated by at least one of the inventions disclosed herein.

When optical sensors are provided as part of the occupant sensing system 600, video conferencing becomes a possibility, whether or not the vehicle experiences a crash. That is, the occupants of the vehicle can engage in a video conference with people at another location 599 via establishment of a communications channel by the communications device 594.

The vehicle diagnostic system described above using a telematics link can transmit information from any type of sensors on the vehicle.

A system for notifying remote personnel, e.g., emergency response personnel, of an accident is described herein.

Using the any of the various communication systems described above, an automatic crash notification system can be built. The crash can be sensed by the airbag crash or rollover sensors or the deployment of the airbag event can be sensed to trigger the communication of the event. The system can be powered by the vehicle power or a battery can be used that has a very long life since the system would draw little current until the event. An advantage of a self-powered system is that it can be more easily retrofitted to existing vehicles. Additionally, a self-powered system would still operate on the loss of vehicle power which can happen during a crash. A small energy harvesting unit based on vibrations or light can be incorporated to overcome battery loss due to leakage and maintain the battery in a charged state for the life of the vehicle. This self-contained system can use a microphone, for example, to sense airbag deployment and thus the only wiring required would be to the communication system which also could be contained within the unit. In some cases, the unit can be on the vehicle safety bus where it could derive both power and crash information. In this latter case, a backup power supply in the form of a capacitor can be provided. The communication system can be any of those mentioned above including a satellite based system such as provided by Sky-Bitz, Inc., the cellular phone system or, preferably, a ubiquitous internet system such as WiMAX. Such a ubiquitous system is not yet in service but the inventor believes that the arguments for such a system are overwhelming and thus it will occur probably in time for the deployment of a universal automatic crash notification system as described herein.

Any or all of the information obtained from occupancy and other onboard sensors can be part of the information sent to the remote location via the communication or telematics system.

When the driver of a vehicle is using a cellular phone, the phone microphone frequently picks up other noise in the vehicle making it difficult for the other party to hear what is being said. This noise can be reduced if a directional microphone is used and directed toward the mouth of the driver. This is difficult to do since the position of driver's mouth varies significantly depending on such things as the size and seating position of the driver. By using the vehicle interior identification and monitoring system of at least one of the inventions disclosed herein, and through appropriate pattern recognition techniques, the location of the driver's head can be determined with sufficient accuracy even with ultrasonics to permit a directional microphone assembly to be sensitized to the direction of the mouth of the driver resulting in a clear reception of his voice. The use of directional speakers in a similar manner also improves the telephone system performance. In the extreme case of directionality, the techniques of hypersonic sound can be used. Such a system can also be used to permit effortless conversations between occupants of the front and rear seats. Such a system is shown in FIG. 40 of the parent '363 application, which is a system similar to that of FIG. 2 only using three ultrasonic transducers to determine the location of the driver's head and control the pointing direction of a microphone. Speaker is shown connected schematically to the phone system 34 completing the system.

One transducer can be placed high in the A-pillar, another transducer on the headliner and yet another transducer on the IP. Other locations are possible as discussed above. The three transducers are placed high in the vehicle passenger compartment so that the first returned signal is from the head. Temporal filtering is used to eliminate signals that are reflections from beyond the head and the determination of the head center location is then found by the approximate centroid of the head-returned signal. That is, once the location of the return signal centroid is found from the three received signals from transducers, the distance to that point is known for each of the transducers based on the time it takes the signal to travel from the head to each transducer. In this manner, by using the three transducers, all of which send and receive, plus an algorithm for finding the coordinates of the head center, using a processor, and through the use of known relationships between the location of the mouth and the head center, an estimate of the mouth location, and the ear locations, can be determined within a circle having a diameter of about five inches (13 cm). This is sufficiently accurate for a directional microphone to cover the mouth while excluding the majority of unwanted noise. Camera-based systems can be used to more accurately locate parts of the body such as the head.

The placement of multiple imagers in the vehicle, the use of a plastic electronics-based display plus telematics permits the occupants of the vehicle to engage in a video conference if desired. Until autonomous vehicles appear, it would be best if the driver did not participate.

The transmission of data obtained from imagers, or other transducers, to another location, requiring the processing of the information, using neural networks for example, to a remote location is an important feature of some of the inventions disclosed herein. This capability can permit an owner of a cargo container, storage tank or truck trailer to obtain a picture of the interior of the vehicle at any time via telematics. When coupled with occupant sensing, the driver of a vehicle can be recognized and the result sent by telematics for authorization to minimize the theft or unauthorized operation of a vehicle. The recognition of the driver can either be performed on the vehicle or an image of the driver can be sent to a remote location for recognition at that location.

Generally monitoring of containers, trailers, chassis etc. is accomplished through telecommunications primarily with LEO or geostationary satellites or through terrestrial-based communication systems. These systems are commercially available and will not be discussed here. Expected future systems include communication between the container and the infrastructure to indicate to the monitoring authorities that a container with a particular identification number is passing a particular terrestrial point. If this is expected, then no action would be taken. The container identification number can be part of a national database that contains information as to the contents of the container. Thus, for example, if a container containing hazardous materials approaches a bridge or tunnel that forbids such hazardous materials from passing over the bridge or through the tunnel, then an emergency situation can be signaled and preventive action taken.

It is expected that monitoring of the transportation of cargo containers will dramatically increase as the efforts to reduce terrorist activities also increase. If every container that passes within the borders of the United States has an identification number and that number is in a database that provides the contents of that container, then the use of shipping containers by terrorists or criminals should gradually be eliminated. If these containers are carefully monitored by satellite or another communication system that indicates any unusual activity of a container, an immediate investigation can result and then the cargo transportation system will gradually approach perfection where terrorists or criminals are denied this means of transporting material into and within the United States. If any container is found containing contraband material, then the entire history of how that container entered the United States can be checked to determine the source of the failure. If the failure is found to have occurred at a loading port outside of the United States, then sanctions can be imposed on the host country that could have serious effects on that country's ability to trade worldwide. Just the threat of such an action would be a significant deterrent. Thus, the use of containers to transport hazardous materials or weapons of mass destruction as well as people, narcotics, or other contraband and can be effectively eliminated through the use of the container monitoring system of at least one of the inventions disclosed herein.

Prior to the entry of a container ship into a harbor, a Coast Guard boat from the U.S. Customs Service can approach the container vessel and scan all of the containers thereon to be sure that all such containers are registered and tracked including their contents. Where containers contain dangerous material legally, the seals on those containers can be carefully investigated prior to the ship entering U.S. waters. Obviously, many other security precautions can now be conceived once the ability to track all containers and their contents has been achieved according to the teachings of at least one of the inventions disclosed herein.

Containers that enter the United States through land ports of entry can also be interrogated in a similar fashion. As long as the shipper is known and reputable and the container contents are in the database, which would probably be accessible over the Internet, is properly updated, then all containers will be effectively monitored that enter the United States with the penalty of an error resulting in the disenfranchisement of the shipper, and perhaps sanctions against the country, which for most reputable shippers or shipping companies would be a severe penalty sufficient to cause such shippers or shipping companies to take appropriate action to assure the integrity of the shipping containers. Intelligent selected random inspections guided by the container history would still take place.

Although satellite communication is preferred, communication using cell phones and infrastructure devices placed at appropriate locations along roadways are also possible. Eventually there will be a network linking all vehicles on the highways in a peer-to-peer arrangement (perhaps using Bluetooth, IEEE 802.11 (WI-FI), Wi-Mobile or other local, mesh or ad-hoc network) at which time information relative to container contents etc. can be communicated to the Internet or elsewhere through this peer-to-peer network. It is expected that a pseudo-noise-based or similar communication system such as a code division multiple access (CDMA) system, wherein the identifying code of a vehicle is derived from the vehicle's GPS determined location, will be the technology of choice for this peer-to-peer vehicle network. It is expected that this network will be able to communicate such information to the Internet (with proper security precautions including encryption where necessary or desired) and that all of the important information relative to the contents of moving containers throughout the United States will be available on the Internet on a need-to-know basis. Thus, law enforcement agencies can maintain computer programs that will monitor the contents of containers using information available from the Internet. Similarly, shippers and receivers can monitor the status of their shipments through a connection onto the Internet. Thus, the existence of the Internet or equivalent can be important to the monitoring system described herein. The implementation of a ubiquitous internet service would greatly facilitate this type of container tracking through the infrastructure and information transfer into appropriate databases.

Referring now to FIG. 25, an alternate method of implementing the invention is to make use of a cell phone or PDA. Cell phones that are now sold contain a GPS-based location system as do many PDAs. Such a system along with minimal additional apparatus can be used to practice the teachings disclosed herein. In this case, the cell phone, PDA or similar portable device 100 could be mounted through a snap-in attachment system 102, for example, wherein the portable device 100 is firmly attached to the vehicle 104. The vehicle monitoring device 106 can at that point, for example, obtain an ID number from the container through a variety of methods such as a RFID, SAW or hardwired based system. It can also connect to a satellite antenna that would permit the device to communicate to a LEO or GEO satellite system, such as Skybitz as described above. Since the portable device 100 would only operate on a low duty cycle, the battery should last for many days or perhaps longer. Of course, if it is connected to the vehicle power system, or to an energy harvesting system 110, its life could be indefinite. When power is waning, this fact can be sent to the satellite or cell phone system to alert the appropriate personnel at a remote facility 108. Since a cell phone 100 contains a microphone, it could be trained, using an appropriate pattern recognition system, to recognize the sound of an accident or the deployment of an airbag or similar event. It thus becomes a very low cost OnStar® type telematics system. The cell phone or PDA could be programmed to transmit a signal when it detects any of these noises, i.e., to a remote monitoring facility or emergency response facility 108. The remote facility 108 could then direct aid to the vehicle 104 once the position of the vehicle 104 is determined.

The cell phone or PDA 100 could also be used to provide information to enable an off-site computer, e.g., at a remote location, to determine the position of the cell phone and thus the vehicle 104 or other asset in which it is arranged. The cell phone would provide data about reception of signals, e.g., from satellites and/or other wireless beacons, and this data would be transmitted via the communications function of the cell phone or PDA 100 to the remote site. At the remote site, the position or location of the cell phone or PDA 100 (and vehicle 104) would be determined by performing, e.g., DGPS calculations.

As an alternative to using a satellite network, the cell phone network can be used in essentially the same manner when a cell phone signal is available. All of the sensors disclosed herein can either be incorporated into the portable device or placed on the vehicle and connected to the portable device when the device is attached to the vehicle. This system has a key advantage of avoiding obsolescence. With technology rapidly changing, the portable device can be exchanged for a later model or upgraded as needed or desired, keeping the overall system at the highest technical state. Existing telematics systems such as OnStar® can of course also be used with this system.

Importantly, an automatic emergency notification system can now be made available to all owners of appropriately configured cell phones, PDAs, or other similar portable devices that can operate on a very low cost basis without the need for a monthly subscription since they can be designed to operate only on an exception basis. Owners would pay only as they use the service. Stolen vehicle location, automatic notification in the event of a crash even with the transmission of a picture for camera-equipped devices is now possible. Automatic door unlocking can also be done by the device since it could transmit a signal to the vehicle, in a similar fashion as a keyless entry system, from either inside or outside the vehicle. The phone can be equipped with a biometric identification system such as fingerprint, voice print, facial or iris recognition etc. thereby giving that capability to vehicles. The device can thus become the general key to the vehicle or house, and can even open the garage door etc. If the cell phone is lost, its whereabouts can be instantly found since it has a GPS receiver and knows where it is. If it is stolen, it will become inoperable without the biometric identification from the owner.

Applying this embodiment of the invention, the cell phone or PDA can be used as an environment monitoring system for monitoring the environment in the vehicle, e.g., in the passenger compartment or interior space of a container. It could check for chemicals in the air in the passenger compartment or container. An energy harvesting system may be arranged in connection with the cell phone or PDA to generate energy to power the cell phone or PDA, or various sensors associated therewith, during movement of the vehicle. The information provided by the cell phone or PDA may be information about a person carrying the cell phone or PDA, derived from contact or proximity of the person to the sensor of the cell phone or PDA. Sensors arranged in association with the cell phone or PDA may be one or more of a temperature sensor, radiation sensor, optical sensor, flow sensor, current sensor, voltage sensor, magnetic field sensor, electric field sensor, force sensor, charge sensor, viscosity sensor, density sensor, electrical resistance sensor, electrical impedance sensor, electrical capacitance sensor, electrical inductance sensor, humidity sensor, chemical sensor, biochemical sensor, biological sensor, acceleration sensor, velocity sensors, displacement sensor, location sensor, vibration sensor, acoustic sensor and pressure sensor.

Other communication systems will also frequently be used to connect the container with the chassis and/or the tractor and perhaps the identification of the driver or operator. Thus, information can be available on the Internet showing what tractor, what trailer, what container and what driver is operating at a particular time, at a particular GPS location, on a particular roadway, with what particular container contents. Suitable security will be provided to ensure that this information is not freely available to the general public. Redundancy can be provided to prevent the destruction or any failure of a particular site from failing the system.

This communication between the various elements of the shipping system which are co-located (truck, trailer, container, container contents, driver etc.) can be connected through a wired or wireless bus such as the CAN bus. Also, an electrical system such as disclosed in U.S. Pat. No. 5,809,437, U.S. Pat. No. 6,175,787 and U.S. Pat. No. 6,326,704 can also be used in the invention.

Although several preferred embodiments are illustrated and described above, there are possible combinations using other geometries, sensors, materials and different dimensions for the components that perform the same functions. At least one of the inventions disclosed herein is not limited to the above embodiments and should be determined by the following claims. There are also numerous additional applications in addition to those described above. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

The invention claimed is:

1. A method of determining a location of a cell phone or PDA at a location apart from the cell phone or PDA, comprising:
    obtaining information at the cell phone or PDA relating to reception of signals by the cell phone or PDA;
    transmitting the obtained information from the cell phone or PDA to a remote facility situated separate and apart from the cell phone or PDA;
    monitoring received sounds at the cell phone or PDA via a microphone of the cell phone or PDA;
    programming the cell phone or PDA to analyze the received sounds, the programming step comprising training the cell phone or PDA to recognize the sounds of accidents involving a vehicle;
    transmitting an accident indication signal to the remote facility when a sound of an accident involving the vehicle is recognized from the monitored received sounds; and
    determining, at the remote facility, the location of the cell phone or PDA from the information transmitted from the cell phone or PDA when the accident indication signal is received.

2. The method of claim 1, wherein the information includes information about an environment around the cell phone or PDA.

3. The method of claim 1, wherein the cell phone or PDA includes a chemical sensor and the obtained information includes information about chemicals around the cell phone or PDA.

4. The method of claim 1, further comprising arranging an energy harvesting system in connection with the cell phone or PDA to generate energy to power the cell phone or PDA during movement of the vehicle.

5. The method of claim 1, wherein the information includes information about a person carrying the cell phone or PDA.

6. The method of claim 1, further comprising arranging at least one additional sensor in association with the cell phone or PDA selected from a group of a temperature sensor, radiation sensor, optical sensor, humidity sensor, biochemical sensor, biological sensor, acceleration sensor, velocity sensors, displacement sensor, location sensor, vibration sensor, acoustic sensor and pressure sensor.

7. A system in a vehicle, comprising:
    a cell phone or PDA arranged to generate information based on signal reception and transmit the signal reception information to a remote facility to enable the remote facility to determine the location of the cell phone or PDA,
    the cell phone or PDA including a microphone and being arranged to monitor received sounds by the microphone, recognize the sounds of accidents involving the vehicle, and transmit an accident indication signal indicative of recognition of the sounds of an accident involving the vehicle to the remote facility, the remote facility being arranged to analyze the signal reception information in order to determine the location of the cell phone or PDA when the accident indication signal is received.

8. The system of claim 7, wherein the information includes information about a person carrying the cell phone or PDA.

9. The system of claim 7, wherein the cell phone or PDA further includes an environment sensor or a chemical sensor and the information includes information about the environment or chemicals around the cell phone or PDA.

10. The system of claim 7, further comprising an energy harvesting system in connection with the cell phone or PDA to generate energy to power the cell phone or PDA during movement of the vehicle.

11. The system of claim 7, wherein the cell phone or PDA further includes at least one additional sensor selected from a group of a temperature sensor, radiation sensor, optical sensor, humidity sensor, biochemical sensor, biological sensor, acceleration sensor, velocity sensors, displacement sensor, location sensor, vibration sensor, acoustic sensor and pressure sensor.

12. The method of claim 1, further comprising arranging at least one additional sensor in association with the cell phone or PDA selected from a group of a radiation sensor, optical sensor, humidity sensor, biochemical sensor, biological sensor, acceleration sensor, velocity sensors, displacement sensor, location sensor, vibration sensor, acoustic sensor and pressure sensor.

13. The method of claim 1, further comprising:
providing the cell phone or PDA with a chemical sensor; and
obtaining information about chemicals around the cell phone or PDA by means of the chemical sensor.

14. The system of claim 7, wherein the cell phone or PDA further includes at least one additional sensor selected from a group of a radiation sensor, optical sensor, humidity sensor, biochemical sensor, biological sensor, acceleration sensor, velocity sensors, displacement sensor, location sensor, vibration sensor, acoustic sensor and pressure sensor.

15. The system of claim 7, wherein the cell phone or PDA further includes a chemical sensor that detects presence of a chemical and being arranged to transmit information about chemicals around the cell phone or PDA detected by the chemical sensor.

16. The method of claim 1, further comprising determining, at the remote facility, DGPS correction information when the accident indication signal is received and using the DGPS correction information when determining the location of the cell phone or PDA.

17. The system of claim 7, wherein the remote facility is arranged to analyze DGPS correction information when determining the location of the cell phone or PDA when the accident indication signal is received.

* * * * *